(12) United States Patent
Shima et al.

(10) Patent No.: US 7,552,324 B2
(45) Date of Patent: Jun. 23, 2009

(54) PRINTER AND PRINT SYSTEM, AND DATA RECEIVING DEVICE AND DATA TRANSMITTING AND RECEIVING SYSTEM

(75) Inventors: Toshihiro Shima, Nagano-Ken (JP); Kazuhito Gassho, Nagano-Ken (JP); Teruhito Kojima, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 716 days.

(21) Appl. No.: 10/512,235

(22) PCT Filed: Jul. 22, 2003

(86) PCT No.: PCT/JP03/09280

§ 371 (c)(1), (2), (4) Date: Oct. 22, 2004

(87) PCT Pub. No.: WO2004/022350

PCT Pub. Date: Mar. 18, 2004

(65) Prior Publication Data

US 2005/0163549 A1    Jul. 28, 2005

(30) Foreign Application Priority Data

| Aug. 30, 2002 | (JP) | ............................. 2002-253378 |
| Aug. 30, 2002 | (JP) | ............................. 2002-253410 |
| Sep. 24, 2002 | (JP) | ............................. 2002-277384 |
| Sep. 24, 2002 | (JP) | ............................. 2002-277499 |

(51) Int. Cl.
    *H04L 9/00*    (2006.01)
(52) U.S. Cl. ........................ 713/161; 380/51; 380/258
(58) Field of Classification Search .................. 380/51, 380/258; 358/1.15; 702/150; 713/171, 194; 709/203; 235/380
See application file for complete search history.

(56) References Cited

U.S. PATENT DOCUMENTS 6,362,893 B1 *    3/2002    Francis et al. .............. 358/1.14
(Continued)

FOREIGN PATENT DOCUMENTS

EP         1 233 331        8/2002
(Continued)

OTHER PUBLICATIONS

Abstract of Japanese Patent Publication No. 11-331144, Pub. Date: Nov. 30, 1999, Patent Abstracts of Japan.

*Primary Examiner*—Gilberto Barron, Jr.
*Assistant Examiner*—Hadi Armouche
(74) *Attorney, Agent, or Firm*—Martine Penilla & Gencarella, LLP

(57) ABSTRACT

A printer generates a public key with a passphrase containing at least printer position information and a random number by a public key cryptography, and holds this random number. A print client previously acquires the public key from the printer. When transmitting print data to the printer, the print client encrypts the print data in advance with the acquired public key and transmits the encrypted print data as print transmitting data. The printer which has received the print transmitting data generates a private key with a passphrase containing at least printer position information and the held random number by the public key cryptography. The printer then decrypts the received print transmitting data with the private key. Consequently, the security of the print data transmitted from the print client to the printer via a network is ensured.

18 Claims, 44 Drawing Sheets

U.S. PATENT DOCUMENTS

| | | | |
|---|---|---|---|
| 6,681,214 B1 * | 1/2004 | Doljack | 705/75 |
| 6,772,945 B2 * | 8/2004 | Mahoney et al. | 235/380 |
| 7,177,426 B1 | 2/2007 | Dube | |
| 7,231,044 B2 | 6/2007 | Dube | |
| 2002/0016921 A1 * | 2/2002 | Olsen et al. | 713/200 |
| 2002/0064280 A1 | 5/2002 | Gassho | |
| 2002/0161547 A1 * | 10/2002 | Fidler | 702/150 |
| 2003/0044009 A1 * | 3/2003 | Dathathraya | 380/55 |
| 2003/0065923 A1 * | 4/2003 | Parry | 713/176 |
| 2003/0105963 A1 * | 6/2003 | Slick et al. | 713/171 |
| 2003/0169443 A1 * | 9/2003 | Ando | 358/1.14 |
| 2004/0075861 A1 * | 4/2004 | Shima et al. | 358/1.15 |

FOREIGN PATENT DOCUMENTS

| | | |
|---|---|---|
| JP | 11-331144 | 11/1999 |
| WO | WO 02/37222 A2 | 5/2002 |

* cited by examiner

TB10: PUBLIC KEY TABLE

| PRINTER (TD10) | PUBLIC KEY (TD11) |
|---|---|
| 192.168.1.10 | PKEY1 |
| 192.168.1.11 | PKEY2 |
| ⋮ | ⋮ |

TB20: RANDOM NUMBER TABLE

| PRINT CLIENT ID | RANDOM NUMBER |
|---|---|
| ABC00001 | RANDM1 |
| ABC00002 | RANDM2 |
| ⋮ | ⋮ |

TB210: PUBLIC KEY TABLE

| PRINTER | PUBLIC KEY | RANDOM NUMBER |
|---|---|---|
| 192.168.1.10 | PKEY1 | RAND1 |
| 192.168.1.11 | PKEY2 | RAND2 |
| ⋮ | ⋮ | ⋮ |

PRINTER AND PRINT SYSTEM, AND DATA RECEIVING DEVICE AND DATA TRANSMITTING AND RECEIVING SYSTEM

TECHNICAL FIELD

The present invention relates to a printer and a print system, and a data receiving device and a data transmitting and receiving system, and particularly relates to a printer and a print system, and a data receiving device and a data transmitting and receiving system which ensure security of data transmitted to the printer and the data receiving device.

BACKGROUND ART

These days, a print system in which a printer is shared using a network has been increasingly used. Namely, by connecting plural computers as print clients to one network and connecting, for example, one printer to this network, the one printer can accept print data from the plural print clients and print the print data.

In such a print system using the network, various users can transmit print data from their respective print clients to the printer and perform printing operations.

However, if the print data transmitted from the print clients is printed by the printer unconditionally, a print operation is executed even by the printer which is not installed in a place where the users intend to perform the printing operation. In particular, in the printer which is moved from one place where the printer has been heretofore used to another place, an IP address or the like which is an address on the network sometimes remains unchanged, and hence the transmitted print data may be printed by the printer moved to another place. The above situation is undesirable for users who want to ensure the security of print data.

Moreover, if the print data transmitted from the print clients is printed by the printer unconditionally, even print data transmitted from the print clients which are not duly authorized to perform printing with the printer is printed by the printer. In this case, print clients able to perform printing with the printer cannot be restricted, which is undesirable as well. Especially when the possibility of the existence of users who transmit a large amount of print data with dishonest intention is considered, it is necessary to provide some print restriction.

Further, in some cases, a printer which has been used in one department of a company is moved to another department and used there. In such a case, even print clients which have heretofore had the authority of perform printing with this printer are not sometimes wanted to be given the authority to perform printing with this printer after the printer has been moved. In the above situation, there are needs for technology which prevents print data from the print clients from being printed on the printer side (See Japanese Patent Application Laid-open No. Hei 11-331144).

Furthermore, it can be assumed that by manipulating path information on the network to install the same printer in a different position and using the same network address, another printer disguises itself as a true printer.

Moreover, there exists a printer into which a certificate to authenticate the printer itself is incorporated, and when this printer is discarded, it is necessary to certainly delete the certificate incorporated into the printer. However, if a printer becomes unable to execute a print operation by only changing the installation place of the printer, the printer can be discarded more safely.

Hence, the present invention is made in view of the aforementioned problems, and one object of the present invention is to provide a print system which ensures security of print data and a printer by restricting print data which can be printed based on information on a position where the printer is installed. Another object is to provide a data transmitting and receiving system which ensures security of transmitted data and a data receiving device by restricting data which can be processed based on information on a position where the data receiving device is installed.

DISCLOSURE OF INVENTION

In order to accomplish the aforementioned and other objects, according to one aspect of the present invention, a printer which processes print data, comprises:

a printer position information acquisition which acquires printer position information to specify a place where the printer is installed;

a first printer position information acquisition which acquires printer position information from the printer position information acquisition, this printer position information being regarded as first printer position information;

a public key generator which generates a public key with a passphrase containing at least the first printer position information and a given number;

a print data receiver which receives print data encrypted with the public key;

a second printer position information acquisition which acquires printer position information from the printer position information acquisition when the print data has been received, this printer position information being regarded as second printer position information;

a private key generator which generates a private key with a passphrase containing at least the second printer position information and the given number; and a decrypter which decrypts the print data received by the print data receiver with the private key.

According to another aspect of the present invention, a control method of a printer which processes print data, comprises the steps of:

acquiring printer position information to specify a place where the printer is installed from a printer position information acquisition, this printer position information being regarded as first printer position information;

generating a public key with a passphrase containing at least the first printer position information and a given number;

receiving print data from a print client;

acquiring printer position information from the printer position information acquisition when the print data has been received, this printer position information being regarded as second printer position information;

generating a private key with a passphrase containing at least the second printer position information and the given number; and decrypting the received print data with the private key.

According to another aspect of the present invention, a print system includes at least one printer and at least one print client connected to the printer via a network, wherein the printer comprises:

a printer position information acquisition which acquires printer position information to specify a place where the printer is installed;

a first printer position information acquisition which acquires printer position information from the printer position information acquisition, this printer position information being regarded as first printer position information; and a public key generator which generates a public key with a passphrase containing at least the first printer position information and a given number, the print client comprises:

a print data generator which generates print data to be printed by the printer; and a print data transmitter which encrypts the print data with the public key and transmits the encrypted print data to the printer, and the printer further comprises:

a print data receiver which receives the print data encrypted with the public key and transmitted from the print client;

a second printer position information acquisition which acquires printer position information from the printer position information acquisition when the print data has been received, this printer position information being regarded as second printer position information;

a private key generator which generates a private key with a passphrase containing at least the second printer position information and the given number; and a decrypter which decrypts the print data received by the print data receiver with the private key.

According to another aspect of the present invention, a data receiving device which processes data, comprises:

a data receiving device position information acquisition which acquires data receiving device position information to specify a place where the data receiving device is installed;

a first data receiving device position information acquisition which acquires data receiving device position information from the data receiving device position information acquisition, this data receiving device position information being regarded as first data receiving device position information;

a public key generator which generates a public key with a passphrase containing at least the first data receiving device position information and a given number;

a data receiver which receives data encrypted with the public key;

a second data receiving device position information acquisition which acquires data receiving device position information from the data receiving device position information acquisition when the data has been received, this data receiving device position information being regarded as second data receiving device position information;

a private key generator which generates a private key with a passphrase containing at least the second data receiving device position information and the given number; and a decrypter which decrypts the data received by the data receiver with the private key.

According to another aspect of the present invention, a data transmitting and receiving system includes at least one data receiving device and at least one data transmitting device connected to the data receiving device via a network, wherein the data receiving device comprises:

a data receiving device position information acquisition which acquires data receiving device position information to specify a place where the data receiving device is installed;

a first data receiving device position information acquisition which acquires data receiving device position information from the data receiving device position information acquisition, this data receiving device position information being regarded as first data receiving device position information; and a public key generator which generates a public key with a passphrase containing at least the first data receiving device position information and a given number, the data transmitting device comprises:

a data generator which generates data to be processed by the data receiving device; and a data transmitter which encrypts the data with the public key and transmits the encrypted data to the data receiving device, and the data receiving device further comprises:

a data receiver which receives the data encrypted with the public key and transmitted from the data transmitting device;

a second data receiving device position information acquisition which acquires data receiving device position information from the data receiving device position information acquisition when the data has been received, this data receiving device position information being regarded as second data receiving device position information;

a private key generator which generates a private key with a passphrase containing at least the second data receiving device position information and the given number; and a decrypter which decrypts the data received by the data receiver with the private key.

BRIEF DESCRIPTION OF THE DRAWINGS

FIG. 31 is a diagram showing an example of the structure of a public key table included in the print client according to the fifth embodiment of the present invention;

PREFERRED EMBODIMENTS

First Embodiment

In a print system according to the first embodiment of the present invention, a public key is generated with at least printer position information indicating a position where a printer is installed, a print client acquires this public key, and when the print client transmits print data to the printer, the print data is transmitted as print transmitting data which is generated by encrypting the print data with the acquired public key. The printer which has received the print transmitting data generates a private key again with at least printer position information at this point in time at the time of reception and executes a print operation only when the print transmitting data has been decrypted with this private key. Moreover, generally, in a public key cryptography, a random number is used when a public key and a private key are generated, and in this embodiment, a random number is previously registered with the printer, and thereby a random number used when the public key to be transmitted to the print client is generated and a random number used when the private key is generated to decrypt the print transmitting data are made the same, which makes it possible to obtain the same private key if the printer position information is unchanged. Further details will be given below.

Figure 1:
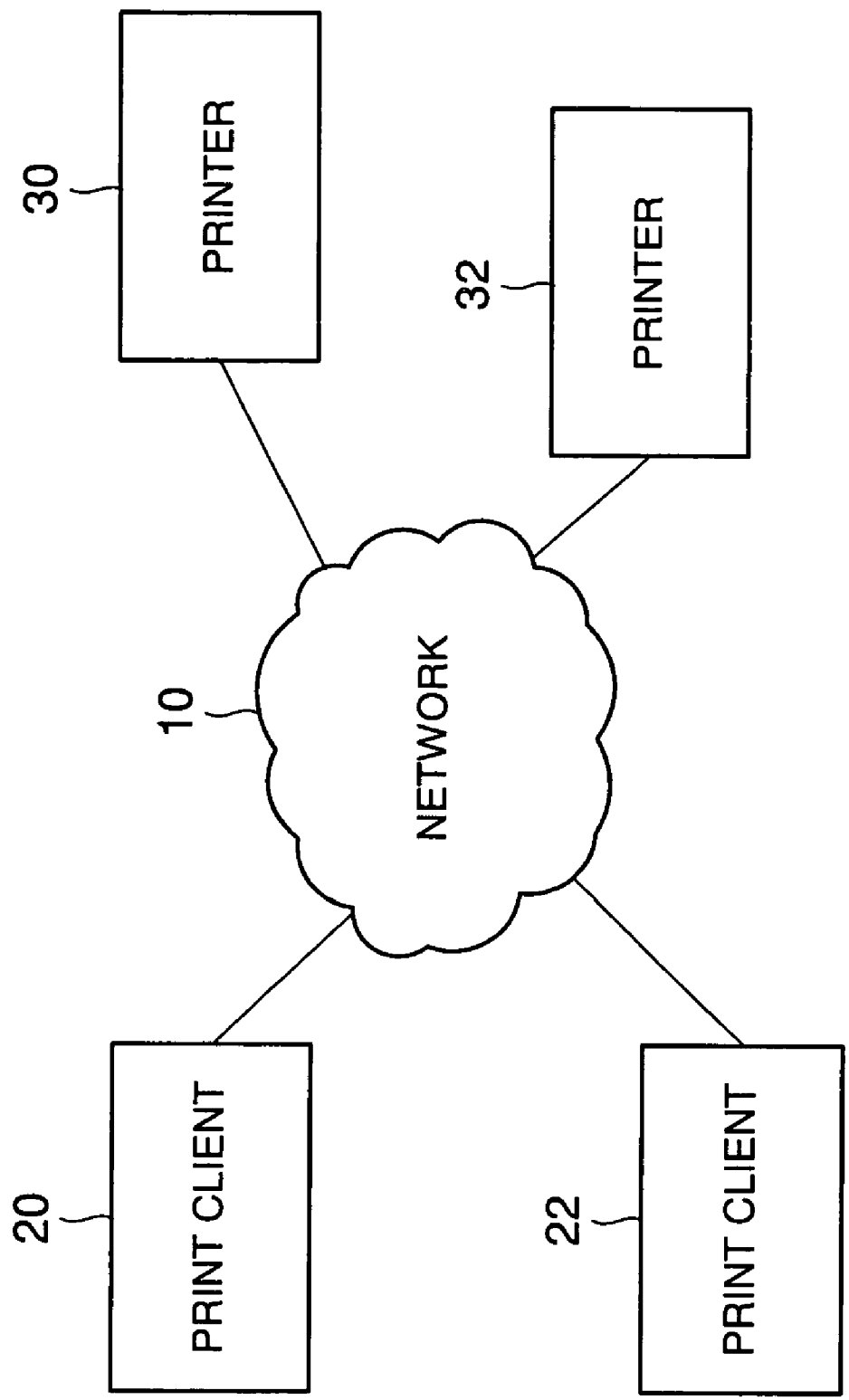
FIG. 1 is a diagram showing an example of the configuration of a print system according to a first embodiment of the present invention.

First, the configuration of the print system according to this embodiment will be explained based on FIG. 1. FIG. 1 is a block diagram showing the hardware configuration of the print system according to this embodiment.

As shown in FIG. 1, the print system according to this embodiment includes print clients 20, 22 connected to a network 10 and printers 30, 32 also connected to the network 10.

In this embodiment, the network 10 is constituted by the Internet using TCP/IP (transmission control protocol/internet protocol). However, the form of the network 10 is not limited to the Internet, and, for example, it may be constituted by a LAN such as Ethernet (registered trademark) or by mixing the Internet and the LAN.

The print clients 20, 22 are each composed of any of various kinds of computers, for example, called a host computer and a personal computer. In this embodiment, in particular, the print clients 20, 22 generate print transmitting data by encrypting print data with a public key and transmit this print transmitting data to the printer 30 and/or the printer 32 via the network 10. The number of print clients connected to the network 10 is optional, and it may be one or more than one. Moreover, the print client is not limited to a computer, and, for example, it may be a digital camera with a necessity to print a taken image, a content server in which print image data is stored as contents, or the like.

Further, in this embodiment, the printers 30, 32 are so-called network printers. In this embodiment, particularly, the printers 30, 32 receive print transmitting data from the print client 20 and/or the print client 22 and decrypt this print transmitting data with a private key which is generated with a passphrase containing at least printer position information and a random number held in the printers 30, 32. When the print transmitting data has been decrypted, a print operation based on the print transmitting data is executed, and when the print transmitting data has not been decrypted, the print operation based on the print transmitting data is not executed.

In this embodiment, the printers 30, 32 are directly connected to the network 10, and each of the printers 30, 32 has its own peculiar network address. Accordingly, the print clients 20, 22 can transmit the print transmitting data to the printer 30 or the printer 32 by designating its network address.

Incidentally, the printers 30, 32 are directly connected to the network 10 in FIG. 1, but the printers 30, 32 may be connected thereto via a printer server. Moreover, the number of printers connected to the network 10 is optional, and it may be one or more than one.

Figure 2:
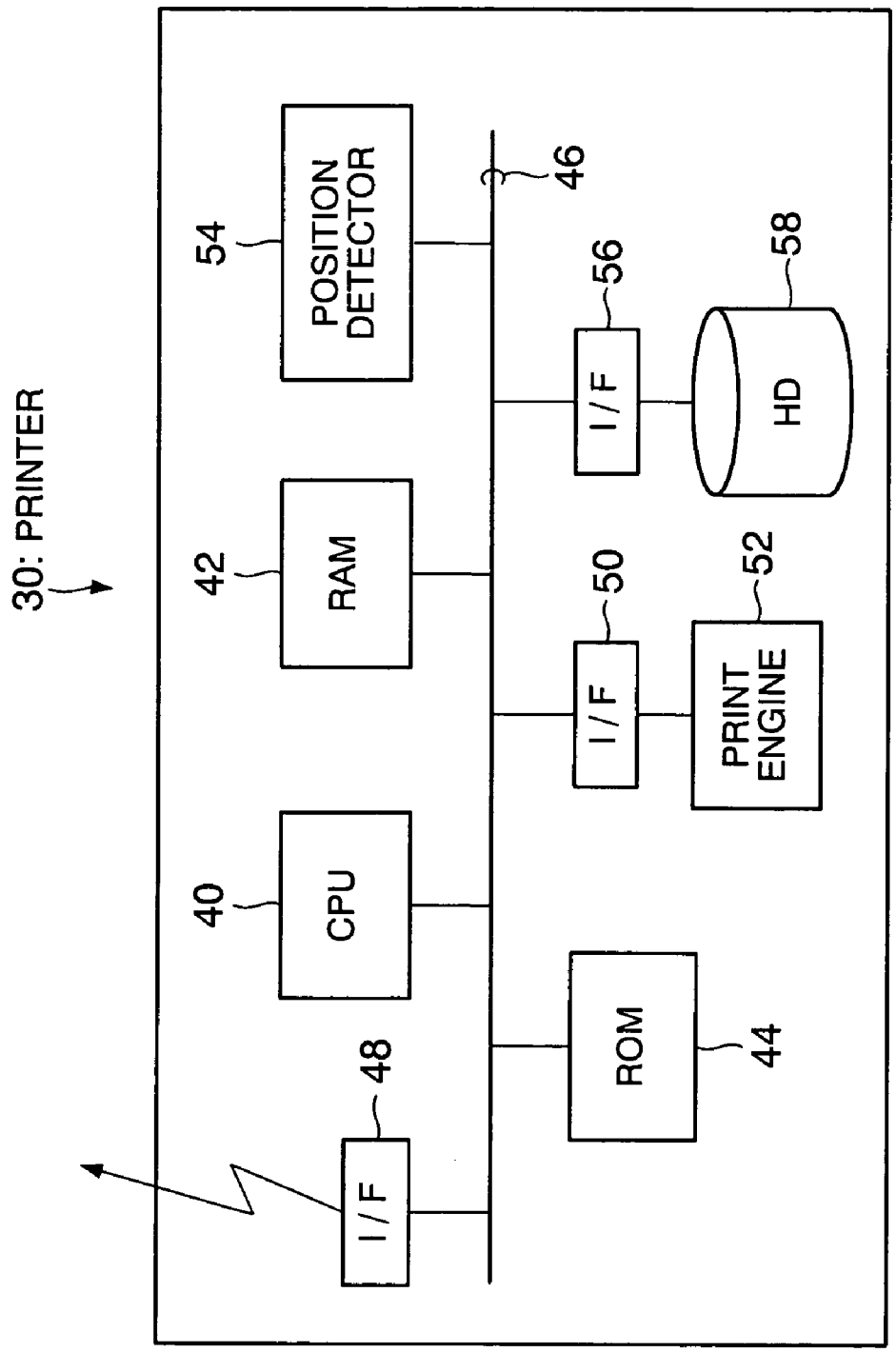
FIG. 2 is a diagram showing an example of the hardware configuration of a printer according to the first embodiment of the present invention.

FIG. 2 is a block diagram explaining the internal configuration of the printer 30. It should be mentioned that the internal configuration of the printer 32 is the same as that of the printer 30.

As shown in FIG. 2, the printer 30 includes a CPU (Central Processing Unit) 40, a RAM (Random Access Memory) 42, and a ROM (Read Only Memory) 44, and they are connected to each other via an internal bus 46. A communication interface 48 is connected to the internal bus 46, and the printer 30 is connected to the aforementioned network 10 via the communication interface 48. In addition, an interface 50 is connected to the internal bus 46, and a print engine 52 is connected to the interface 50.

Moreover, a position detector 54 is connected to the internal bus 46. This position detector 54 has a function of specifying a position where the printer 30 is installed. In this embodiment, the position detector 54 is constituted, for example, by a GPS (global positioning system), and the latitude, longitude, and altitude of the position where the printer 30 is installed can be specified. It is said that the accuracy of the GPS at the present time is approximately ±10 m in the latitude, the longitude, and the altitude, respectively.

However, the constitution of the position detector 54 is not limited to the constitution using the GPS, and, for example, when the printer 30 is connected to the network 10 by a wireless LAN, the position of the printer 30 may be specified based on a wireless base station which accommodates the printer 30. Alternatively, the position of the printer 30 may be specified by using mobile communication technology including the PHS (Personal Handyphone System).

Further, a hard disk 58 is connected to the internal bus 46 via an interface 56. In this embodiment, the hard disk 58 functions as a rewritable nonvolatile memory device.

Figure 3:
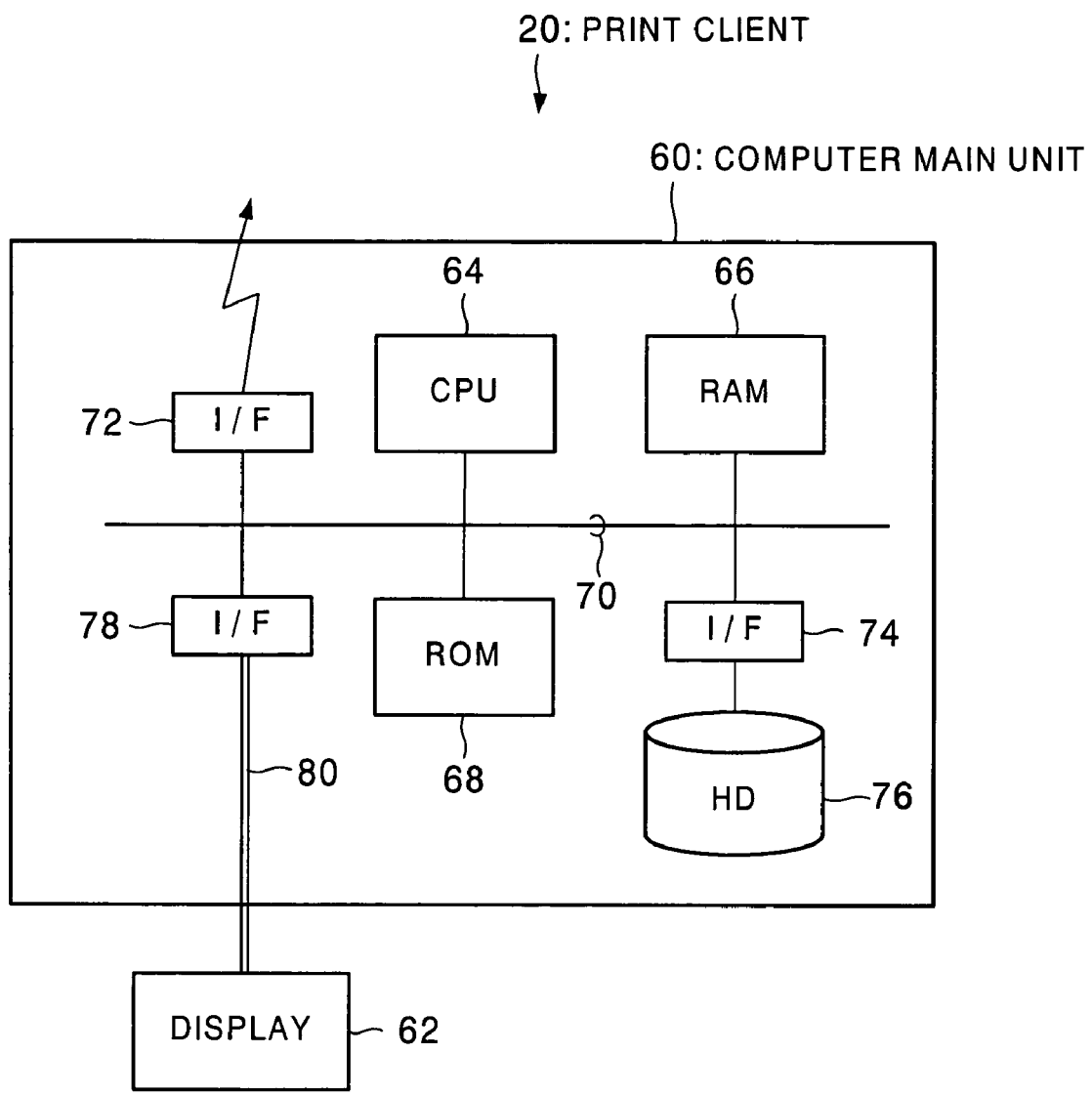
FIG. 3 is diagram showing an example of the configuration of a print client according to the first embodiment of the present invention.

FIG. 3 is a block diagram for explaining the internal configuration of the print client 20. It should be mentioned that the internal configuration of the print client 22 is the same as that of the print client 20 in this embodiment.

As shown in FIG. 3, the print client 20 according to this embodiment includes a computer main unit 60 and a display 62.

The computer main unit 60 includes a CPU 64, a RAM 66, and a ROM 68, and they are connected to each other via an internal bus 70. A communication interface 72 is connected to the internal bus 70, and the print client 20 is connected to the aforementioned network 10 via the communication interface 72.

In addition, an interface 74 is connected to the internal bus 70, and a hard disk 76 which is a large capacity storage is connected to the interface 74. In this embodiment, this hard disk 76 functions as a rewritable nonvolatile memory device. Moreover, an interface 78 is connected to the internal bus 70, and the aforementioned display 62 is connected via a cable 80 which extends from the interface 78.

Next, a brief explanation of a process, for example, when the print client 20 performs printing with the printer 30 in the print system according to this embodiment will be given.

In this case, the print client 20 previously acquires, for example, from the printer 30 a public key of this printer 30. In this embodiment, the public key is acquired via the network 10. Namely, the printer 30 confirms whether the print client 20 which requests the transmission of the public key has rightful authority, and only when the print client has rightful authority, the printer 30 notifies the print client of its public key. The printer 30 generates this public key with a passphrase containing at least printer position information indicating a position where the printer 30 is installed and a random number generated and held in the printer 30 by a public key cryptography. In other words, the printer has a function of holding the random number to be used by the public key cryptography.

Incidentally, at this time, a generated private key is deleted. Namely, in the general public key cryptography, a public key and a private key are generated at the same time. Therefore, in this embodiment, even if a private key is generated concomitantly with the generation of a public key, the private key is deleted. Consequently, when the installation position of the printer 30 has been moved, print transmitting data encrypted with a public key generated before the movement cannot be decrypted by the printer 30 after the movement.

However, the printer 30 need not necessarily notify the print client 20 of the public key of the printer 30 via the network 10. For example, if a user of the print client 20 has rightful authority, he or she can go to the installation place of the printer 30 and operate the printer 30, whereby it is also possible that the user operates a control panel of the printer 30 and acquires the public key of the printer 30. In this case, it is also possible that the user records the public key of the printer 30 on a record medium such as a flexible disk and makes the print client 20 read this public key.

Figure 4:
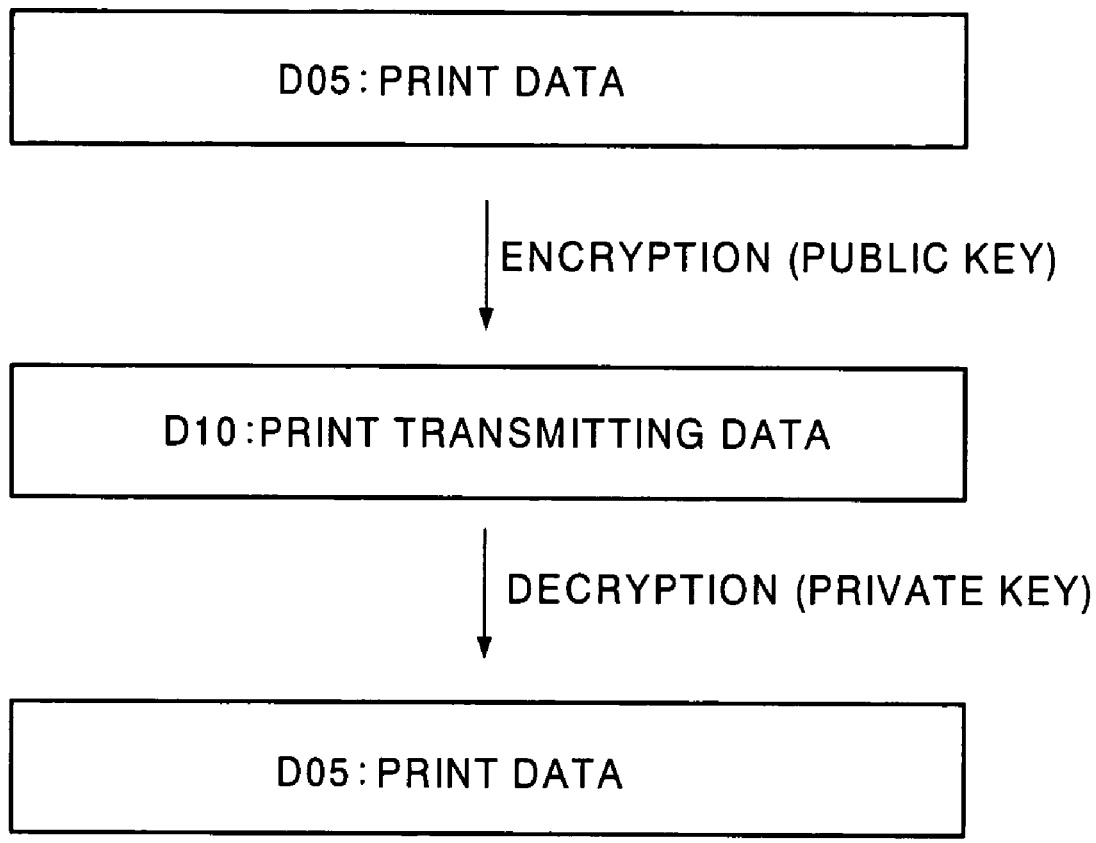
FIG. 4 is a conceptual diagram explaining encryption and decryption of print data with a public key and a private key in the first embodiment of the present invention.

Then, as shown in FIG. 4, the user of the print client 20 generates print data D05 which is data to be printed, designates the printer 30 for the print client 20, and instructs a print operation.

The print client 20 encrypts the print data D05 with the previously acquired public key of the printer 30 to generate print transmitting data D10. Here, the print data D05 means original print data needed for a print operation executed by driving the print engine 52 in the printer 30. Incidentally, the print transmitting data D10 may contain data other than the print data D05 shown in FIG. 4.

The printer 30 which has received the print transmitting data D10 temporarily stores the received print transmitting data D10 in the RAM 42 as shown in FIG. 2. The printer 30 then decrypts the encrypted print transmitting data D10 with a private key. Namely, the printer 30 generates the private key using a passphrase containing at least printer position information and the random number generated and held in the printer 30 by the public key cryptography.

Subsequently, the printer 30 judges whether the print transmitting data D10 has been decrypted. The printer 30 executes a print operation based on the print data D05 acquired by decrypting the print transmitting data D10 when the print transmitting data D10 has been decrypted, and does not execute the print operation when the print transmitting data D10 has not been decrypted.

Next, the contents of the aforementioned process will be explained in detail using flowcharts. First, processes in the print clients 20, 22 and the printers 30, 32 when the print clients 20, 22 each acquire a public key will be explained.

Figure 5:
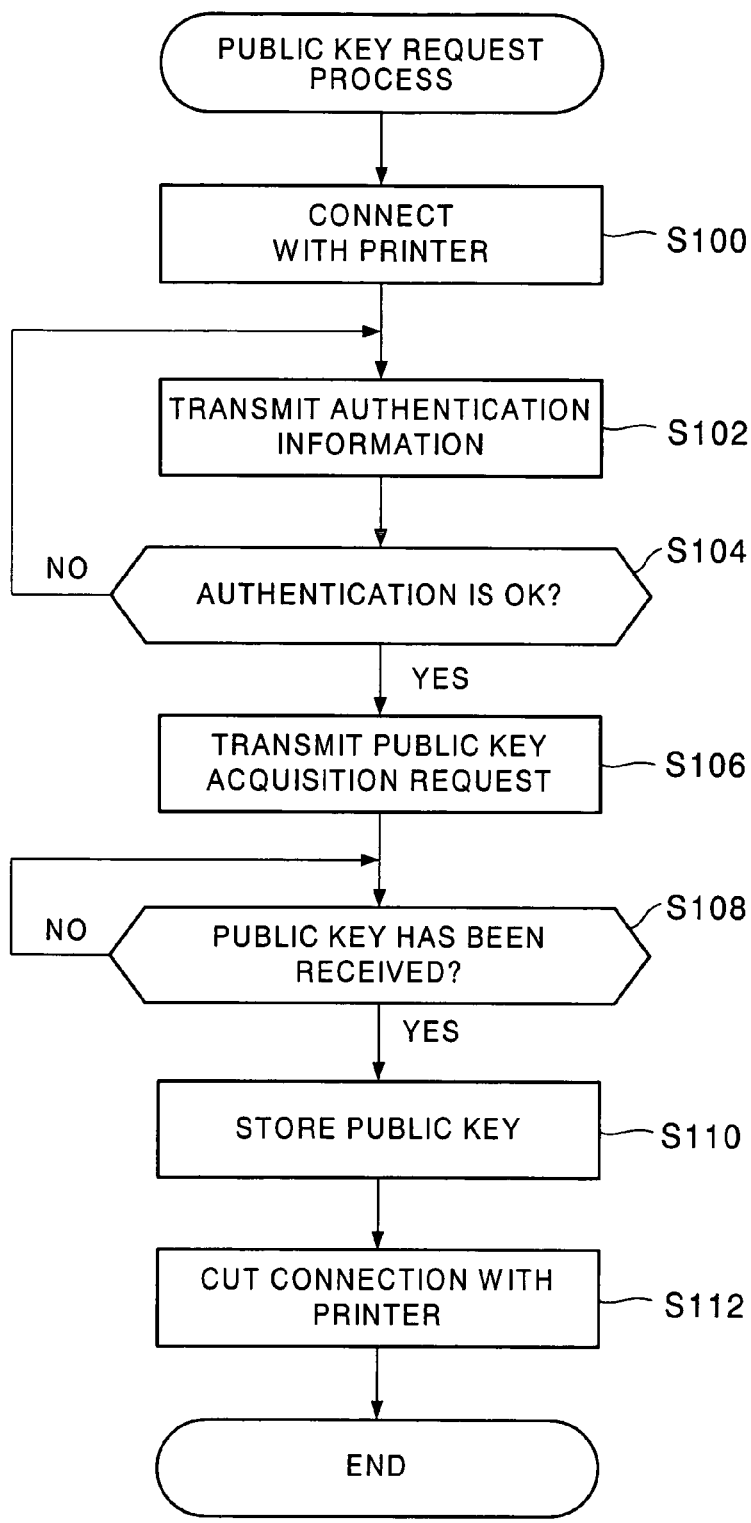
FIG. 5 is a flowchart explaining a public key request process executed by the print client according to the first embodiment of the present invention.

FIG. 5 is a flowchart explaining a public key request process executed in the print clients 20, 22. This public key request process is realized by making the CPU 64 read and execute a public key request program stored in the ROM 68 or the hard disk 76 of the print client. In this embodiment, this public key request process is started and executed when the user inputs an instruction to start a process of making a request for a public key to the print client.

Incidentally, hereinafter, assuming a case where the print client 20 makes a request for a public key to the printer 30, the process will be explained.

As shown in FIG. 5, in the public key request process, the print client 20 first connects with the printer 30 (step S100). In this embodiment, the print client 20 establishes a connection between the print client 20 and the printer 30 by designating the network address of the printer 30. Moreover, in this embodiment, the connection between the print client 20 and the printer 30 is established after security is ensured by SSL (Secure Socket Layer) communication or the like.

Thereafter, the print client 20 transmits authentication information to the printer 30 (step S102). In this embodiment, a combination of a print client ID to specify the print client and a password is used as the authentication information. Accordingly, the print client 20 transmits the print client ID and the password to the printer 30.

Subsequently, the print client 20 receives an authentication result indicating whether authentication has been accepted from the printer 30, and judges whether the authentication has been accepted by the printer 30 based on the authentication result (step S104). When the authentication has not been accepted (step S104: No), the print client 20 repeats the aforementioned process from step S102.

On the other hand, when the authentication has been accepted (step S104: Yes), the print client 20 transmits a public key acquisition request to the printer 30 (step S106). Then, the print client 20 judges whether a public key has been received from the printer 30 (step S108). When the public key has not been received from the printer 30 (step S108: No), the print client 20 stands by while repeating step S108.

On the other hand, when the public key has been received from the printer 30 (step S108: Yes), the public key is stored (step S110). In this embodiment, the print client 20 is provided with a public key table TB10 on the hard disk 76, and the acquired public key is stored and held in this public key table TB10.

Figure 6:
FIG. 6 is a diagram showing an example of the structure of a public key table included in the print client according to the first embodiment of the present invention.

FIG. 6 is a diagram showing an example of the structure of the public key table TB10. As shown in FIG. 6, the public key table TB10 includes an item TD10 which stores information to specify printers and an item TD11 which stores acquired public keys in a one-to-one correspondence with the printers. As just described, the public key table TB10 can hold public keys concerning plural printers on a printer-by-printer basis. Moreover, by storing the public keys in the public key table TB10 on the hard disk 76 in this manner, even when the print client 20 is powered off and then powered on again, the public keys acquired before the power-on can be read from the hard disk 76 and used as they are.

As shown in FIG. 5, the print client 20 then cuts the connection with the printer 30 (step S112). Thus, the public key request process shown in FIG. 5 is completed.

Figure 7:
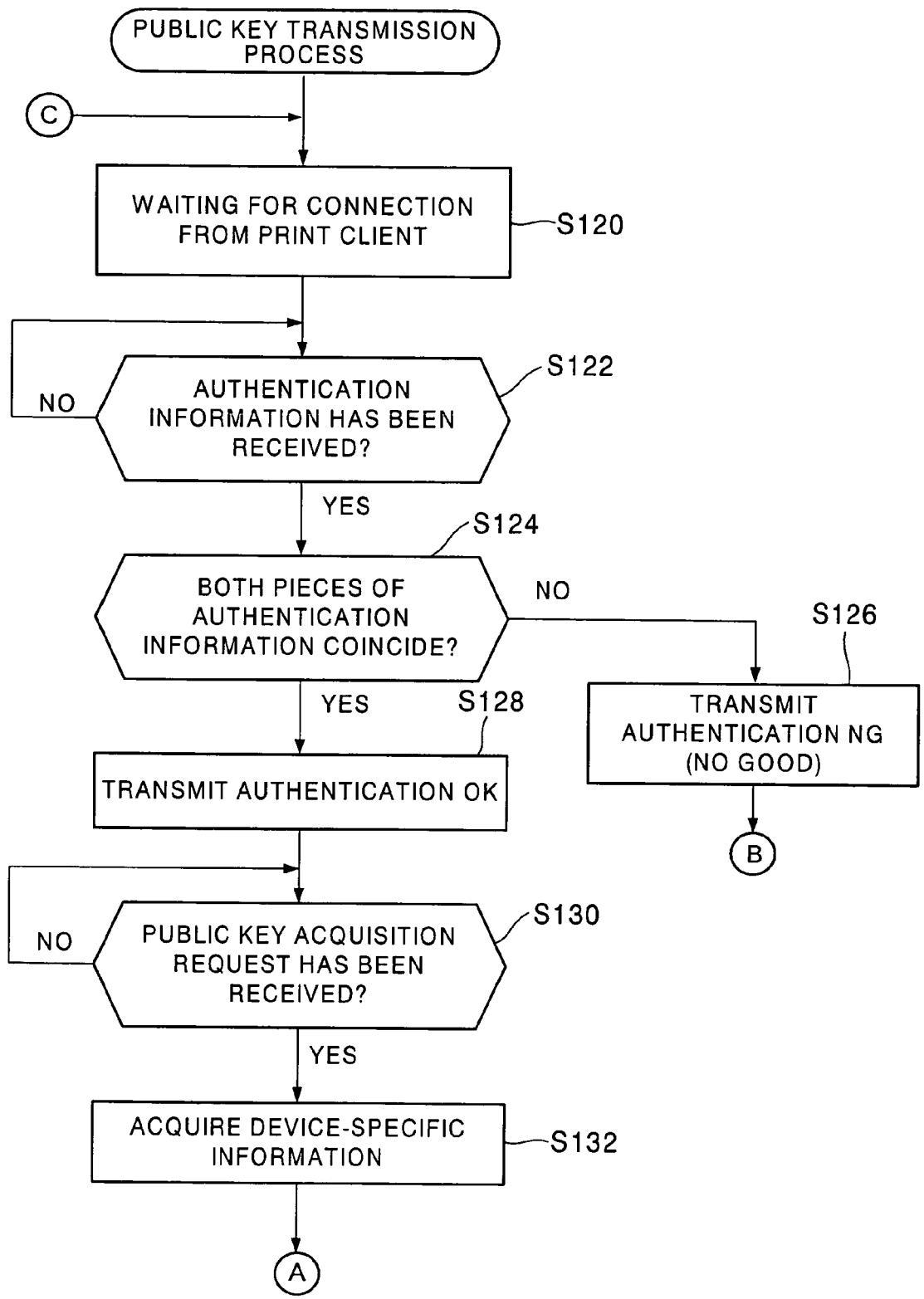
FIG. 7 is a part of a flowchart explaining a public key transmission process executed by the printer according to the first embodiment of the present invention (First part)
Figure 8:
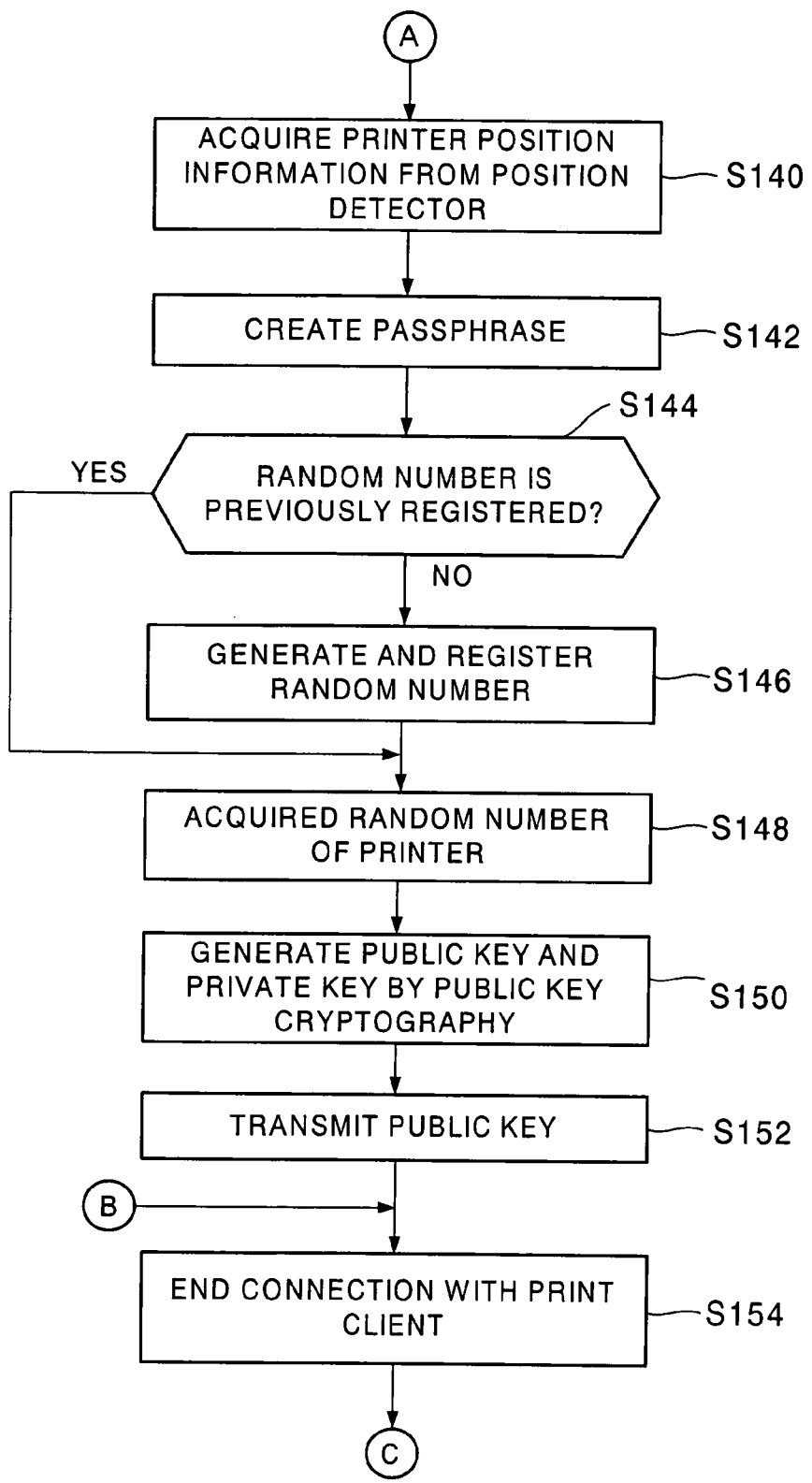
FIG. 8 is a part of the flowchart explaining the public key transmission process executed by the printer according to the first embodiment of the present invention (Second part)

Next, a public key transmission process executed in the printers 30, 32 corresponding to the public key request process in the print clients 20, 22 will be explained based on FIG. 7 and FIG. 8. FIG. 7 and FIG. 8 are flowcharts explaining the public key transmission process executed in the printers 30, 32. The public key transmission process is realized by making the CPU 40 read and execute a public key transmission program stored in the ROM 44 or the hard disk 58 of the printer. Moreover, this public key transmission process is started corresponding to the aforementioned public key request process.

Also here, similarly to the above, assuming the case where the print client 20 makes the request for the public key to the printer 30, the following explanation is given.

As shown in FIG. 7, first, the printer 30 is waiting for a connection from the print client 20, and establishes a connection with the print client 20 when the connection is requested from the print client 20 (step S120). This corresponds to the aforementioned step S100 on the print client 20 side. Namely, the connection is established after security is ensured by the SSL communication or the like. Subsequently, the printer 30 judges whether the authentication information has been received from the print client 20 (step S122). When the authentication information has not been received (step S122: No), the printer 30 stands by while repeating the process in step S122.

On the other hand, when the authentication information has been received from the print client 20 (step S122: Yes), the printer 30 judges whether this authentication information coincides with authentication information which is previously registered with the printer 30 (step S124). More specifically, since the print client ID and the password are transmitted as the authentication information from the print client 20 as described above, the printer 30 judges whether these client ID and password coincide with a print client ID and a password which are previously registered with the printer 30.

When these two pieces of authentication information do not coincide (step S124: No), the printer 30 transmits the authentication result indicating that the authentication has not been accepted to the print client 20 (step S126), and in step S154 in FIG. 8 described later, the connection with the print client 20 is ended. On the other hand, when these two pieces of authentication information coincide (step S124: Yes), the printer 30 transmits the authentication result indicating that the authentication has been accepted to the print client 20 (step S128).

Thereafter, the printer 30 judges whether the public key acquisition request has been received from the print client 20 (step S130). When the public key acquisition request has not been received (step S130: No), the printer 30 stands by while repeating the process in step S130.

On the other hand, when the public key acquisition request has been received from the print client 20 (step S130: Yes), the printer 30 acquires device-specific information on the printer 30 (step S132). Here, the device-specific information is identification information specifically assigned to the printer 30, and it is, for example, a manufacturer's serial number, a MAC address, or the like of the printer 30.

Then, as shown in FIG. 8, the printer 30 acquires printer position information on the printer 30 at this point in time from the position detector 54 (step S140). The reason why the printer position information is acquired from the position detector 54 each time as described just above is in order that, when the printer 30 has been moved to a different place, a public key is generated with position information after the movement.

Subsequently, the printer 30 creates a passphrase with the device-specific information and the printer position information (step S142). There are various methods of creating the passphrase, and in this embodiment, the passphrase is created by simply joining the printer position information after the device-specific information. Incidentally, the passphrase may contain data other than these device-specific information and printer position information.

Thereafter, the printer 30 judges whether a random number of the printer 30 is previously registered (step S144). When no random number is registered (step S144: No), the printer 30 generates one random number and registers this random number on the hard disk 58 (step S146). Namely, in this embodiment, each printer generates a random number only once and registers and holds the random number on the hard disk 58. The generation of the random number is performed when the printer 30 performs this public key transmission process for the first time. Moreover, since the printer 30 holds the random number on the hard disk 58, the random number is held in a nonvolatile manner even when the printer 30 is powered off. Therefore, even when the printer 30 is powered on again, the hitherto used random number is effectively held. Incidentally, the aforementioned generation of the random number of the printer 30 need not be necessarily performed in the public key transmission process, and may be performed in some other process. For example, when the printer 30 is shipped from a factory, the random number may be previously generated, and registered and held on the hard disk 58.

On the other hand, when the random number is held on the hard disk 58 (step S144: Yes), the process in step S146 is bypassed.

Then, the printer 30 reads and acquires the random number of this printer 30 from the hard disk 58 (step S148).

Thereafter, the printer 30 generates a public key and a private key with the passphrase created in step S142 and the random number acquired in step S148 by the public key cryptography (step S150). The public key cryptography has the property that the same public key and private key are generated again if the same passphrase and random number are used. Then, the printer 30 transmits only the public key out of the generated public key and private key to the print client 20 (step S152). Incidentally, the private key is deleted without being saved.

Subsequently, the printer 30 ends the connection with the print client 20 (step S154). Thus, the public key transmission process according to this embodiment is completed.

Next, processes in the print clients 20, 22 and the printers 30, 32 when the print clients 20, 22 want to perform printing and transmit a print request to the printers 30, 32 will be explained in detail.

Figure 9:
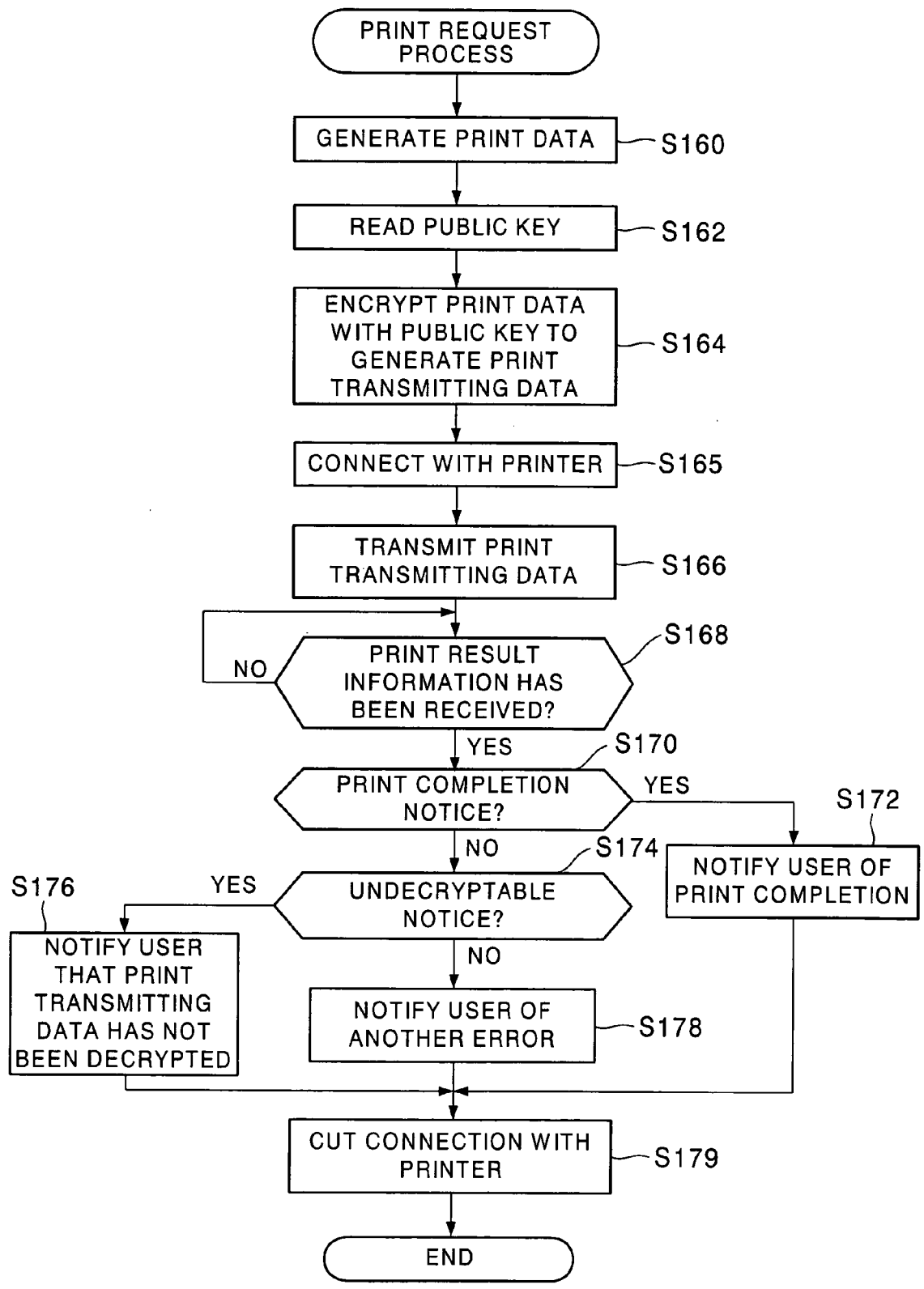
FIG. 9 is a flowchart explaining a print request process executed by the print client according to the first embodiment of the present invention.

FIG. 9 is a flowchart explaining a print request process executed in the print clients 20, 22. This print request process is realized by making the CPU 64 read and execute a print request program stored in the ROM 68 or the hard disk 76 of the print client. In this embodiment, this print request process is started and executed when the user inputs a print instruction to the print client.

Here, assuming a case where the print client 20 makes a print request to the printer 30, the following explanation is given.

As shown in FIG. 9, the print client 20 generates the print data D05 based on a print request from the user (step S160). This print data D05 is data necessary for an actual print operation when the printer 30 is an ordinary printer.

Then, the print client 20 reads the public key of the printer 30 from the public key table TB10 on the hard disk 76 (step S162). Subsequently, the print client 20 encrypts the print data D05 with the public key of the printer 30 to generate the print transmitting data D10 (step S164). Incidentally, the print transmitting data D10 may contain data other than the print data.

Thereafter, the print client 20 establishes a connection with the printer 30 (step S165). Then, the print client 20 transmits the encrypted print transmitting data D10 to the printer 30 (step S166). More specifically, the print client 20 designates the network address of the printer 30 and sends out the print transmitting data D10 to the network 10.

Subsequently, the print client 20 judges whether print result information has been received from the printer 30 (step S168). When the print result information has not been received (step S168: No), the print client 20 stands by while repeating the process in step S168. On the other hand, when the print result information has been received (step S168: Yes), the print client 20 judges whether the print result information is a print completion notice (step S170).

When this print result information is the print completion notice (step S170: Yes), it means that the printer 30 has properly completed the print operation, and hence the print client 20 notifies the user that the printer 30 has completed the print operation (step S172). On the other hand, when the received print result information is not the print completion notice (step S170: No), whether the print result information is an undecryptable notice is judged (step S174).

When the print result information is the undecryptable notice (step S174: Yes), the print client 20 notifies the user that since the print transmitting data D10 has not been decrypted by the printer 30, the print operation has not been executed (step S176). On the other hand, when the print result information is not the undecryptable notice (step S174: No), some other error is thought to occur, and hence the print client 20 gives notice according to the type of the error to the user (step S178).

After the notice in step S172, step S176, or step S178, the print client 20 cuts the connection with the printer 30 (step S179). Thus, the print request process in the print client 20 is completed.

Figure 10:
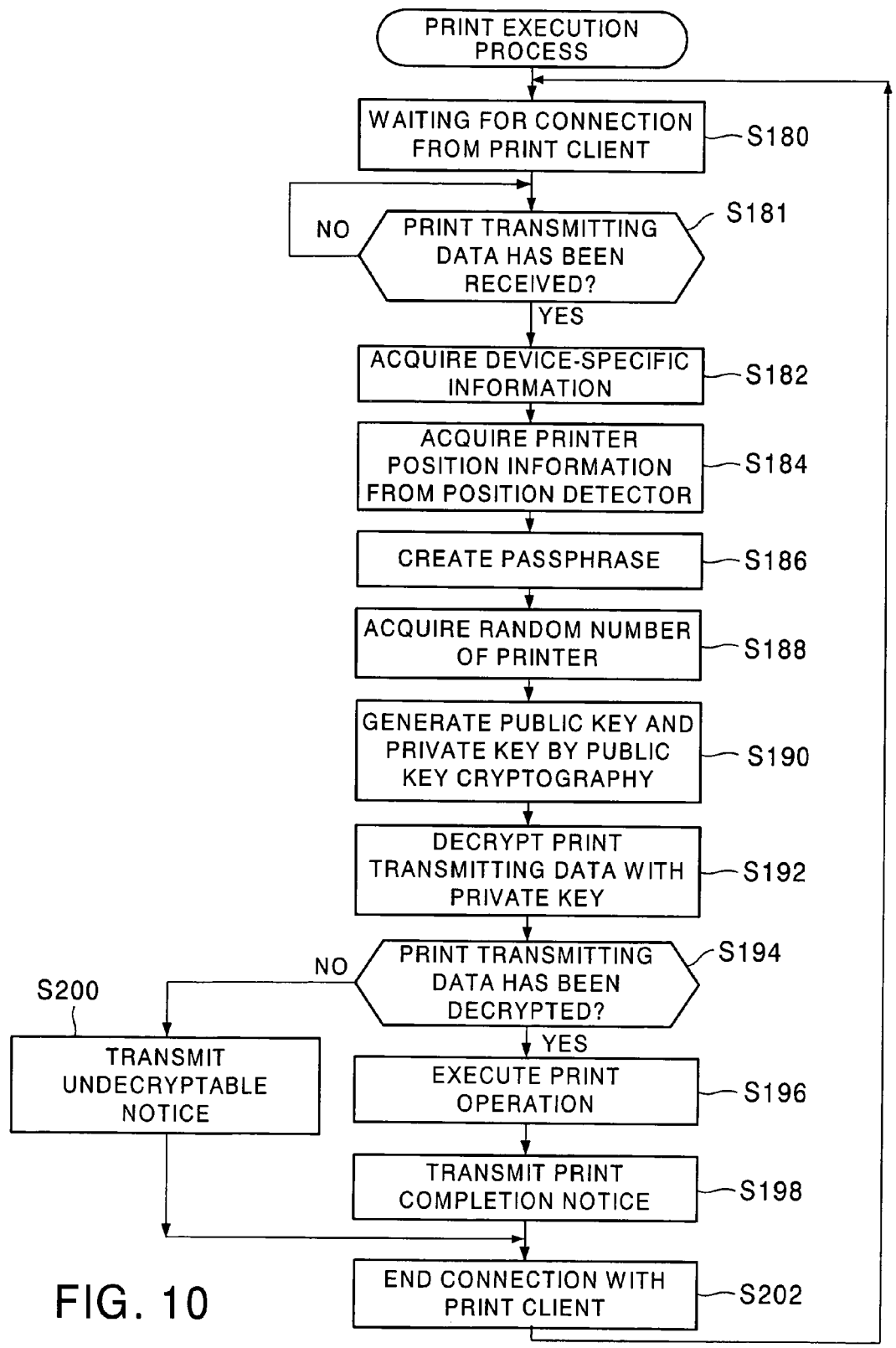
FIG. 10 is a flowchart explaining a print execution process executed by the printer according to the first embodiment of the present invention.

Next, a print execution process executed in the printers 30, 32 corresponding to the print request process in the print clients 20, 22 will be explained based on FIG. 10. FIG. 10 is a flowchart explaining the print execution process executed in the printers 30, 32. This print execution process is realized by making the CPU 40 read and execute a print execution program stored in the ROM 44 or the hard disk 58 of each of the printers 30, 32. In this embodiment, this print execution process is regularly executed at predetermined time intervals.

Also here, similarly to the above, assuming the case where the print client 20 makes the print request to the printer 30, the following explanation is given.

As shown in FIG. 10, the printer 30 is waiting for a connection from the print client 20 and establishes a connection with the print client 20 via the network 10 when the connection is requested from the print client 20 (step S180). After the connection with the print client 20 has been established, the printer 30 judges whether the print transmitting data D10 has been received from the network 10 (step S181). When no print transmitting data D10 has been received (step S181: No), the printer 30 stands by while repeating the process in step S181.

On the other hand, when the print transmitting data D10 has been received (step S181: Yes), the printer 30 acquires its own device-specific information (step S182). Subsequently, the printer 30 acquires printer position information on the printer 30 at this point in time from the position detector 54 (step S184). The reason why the printer position information is acquired from the position detector 54 each time as described just above is that, when the printer 30 has been moved to a different place, there is a possibility that the printer 30 is installed in a place where the user does not intend to perform printing, and in order that, in such a case, the print operation is not executed by the printer 30.

Then, the printer 30 creates a passphrase based on the device-specific information and the printer position information (step S186). The method of creating the passphrase needs to be the same method as in step S142 in the aforementioned public key transmission process. This is because, if the passphrases are different, the print transmitting data encrypted with the public key transmitted to the print client cannot be decrypted with a private key.

Thereafter, the printer 30 reads and acquires the random number of the printer 30 registered and held in the aforementioned step S146 from the hard disk 58 (step S188). Then, the printer 30 generates a public key and a private key with the generated passphrase and the acquired random number by the public key cryptography (step S190). These passphrase and random number used in step S190 are the same as those used in step S150 in the aforementioned public key transmission process if the installation position of the printer 30 has not been moved. Hence, the same public key and private key as generated in step S150 are generated. Subsequently, the printer 30 decrypts the received print transmitting data D10 with the generated private key and acquires the print data D05 (step S192).

Then, the printer 30 judges whether the print transmitting data D10 has been decrypted with the private key (step S194). When the print transmitting data D10 has been decrypted (step S194: Yes), the printer 30 executes the print operation by driving the print engine 52 based on the acquired print data D05 (step S196). More specifically, the printer 30 performs a language interpretation of the print data D05 and generates print request data fitting the print engine 52. Then, by transmitting this print request data to the print engine 52, print sheets or the like are printed by the print engine 52.

As can be seen from the above, in this embodiment, the private key is generated with the passphrase containing at least the printer position information detected by the position detector 54 and the random number registered with the printer 30, and when the print transmitting data D10 has been decrypted with this private key, it is judged that the print transmitting data D10 matches the printer position information.

At a point in time when the print operation has been properly completed, the printer 30 transmits the print completion notice that the print operation has been properly completed as the print result information to the print client 20 (step S198).

Contrary to this, when it is judged in step S194 that the print transmitting data D10 has not been decrypted (step S194: No), the printer 30 transmits the undecryptable notice as the print result information to the print client 20 (step S200). Namely, in this embodiment, when the private key is generated with the passphrase containing at least the printer position information detected by the position detector 54 and the random number registered with the printer 30 but the print transmitting data D10 has not been decrypted with this private key, it is judged that that the print transmitting data D10 does not match the printer position information.

After step S198 or step S200, the printer 30 ends the connection with the print client 20 (step S202). Then, the printer 30 returns to the aforementioned process in step S180.

As described above, according to the print system of this embodiment, the print clients 20, 22 can limit a printer able to print the transmitted encrypted print transmitting data D10 based on printer position information, so that the execution of a print operation by a printer installed in a position where the users of the print clients 20, 22 do not intend to perform printing can be avoided. For example, even if the print transmitting data D10 is transmitted by mistake to the printer 30 from the print client 20 when the printer 30 has been moved to a different place but the network address of the printer 30 in the network 10 remains unchanged, the printer position information is changed in the printer 30, whereby the passphrase created in step S186 is different from that before the movement. Hence, the print transmitting data D10 cannot be decrypted with a private key generated with this passphrase, and thereby the print operation cannot be executed by the printer 30. Consequently, the security of the print data D05 can be enhanced.

On the other hand, also on the printers 30, 32 side, the transmission of print data to the printers 30, 32 by somebody who is not duly authorized to perform printing with the printers 30, 32 and the execution of a large print operation by the printers 30, 32 can be avoided. For example, even if a third party can know the network address of the printer 30 for some reason and tries to transmit the print transmitting data D10 to the printer 30, the third party cannot acquire the public key of the printer 30. Even if this user generates the print transmitting data D10 by encrypting the print data D05 with a different public key or generates the print transmitting data D10 without encryption and transmits the print transmitting data D10 to the printer 30, it is judged in step S194 of the print execution process that the print transmitting data D10 has not been decrypted, and hence it becomes impossible to make the printer 30 execute the print operation. Consequently, the security of the printer 30 itself can be enhanced.

Moreover, in this embodiment, the passphrase contains the device-specific information, and hence even if the third party can know the position of the printer 30 for some reason, the passphrase used in the printer 30 cannot be specified unless the device-specific information on the printer 30 is known. This makes it extremely difficult for the third party to disguise itself as the printer 30 to receive the print transmitting data D10 and decrypt this print transmitting data D10.

Further, in this embodiment, the public key and the private key are generated with the random number in addition to the passphrase, which makes it still more difficult for the third party to disguise itself as the printer 30 to receive the print transmitting data D10 and decrypt this print transmitting data D10.

Furthermore, the random number is generated for each printer, and the generated random number is held in a rewritable nonvolatile memory device such as a hard disk, whereby the same random number as used when the public key is generated can be used when the private key is generated. Therefore, the private key capable of decrypting the print transmitting data D10 which is encrypted with the public key generated using this random number can be generated again.

Second Embodiment

In the second embodiment of the present invention, the printers 30, 32 each generate and hold a random number used when a public key and a private key are generated for each print client, which makes it more difficult for a third party to guess the random number. Further details will be given below.

It should be mentioned that the configuration of a print system according to this embodiment is the same as that in FIG. 1 in the first embodiment, the configurations of the printers 30, 32 are the same as that in FIG. 2 described above, and the configurations of the print clients 20, 22 are the same as that in FIG. 3 described above. Moreover, a public key request process executed in the print clients 20, 22 according to this embodiment is the same as that in the aforementioned first embodiment.

Figure 11:
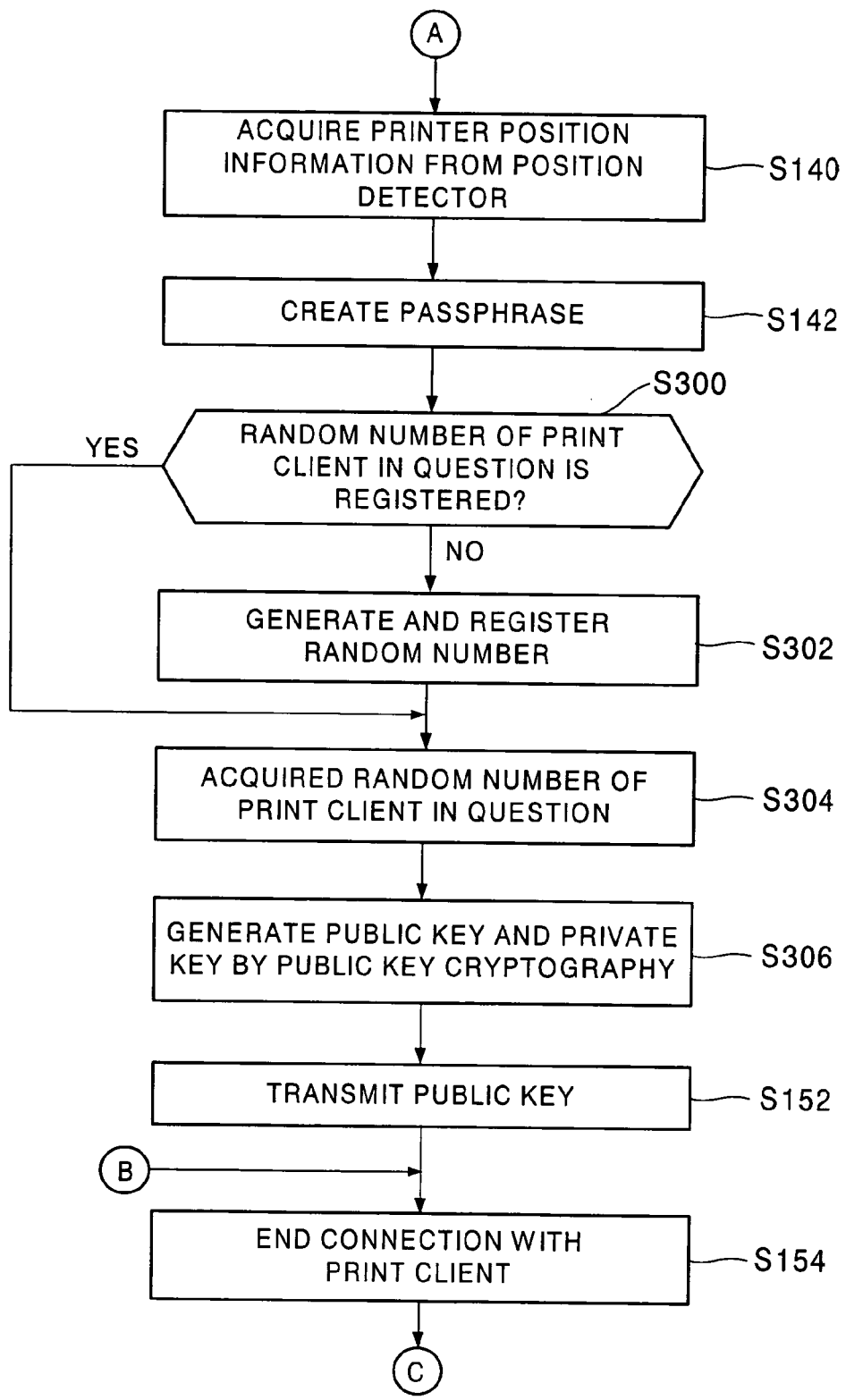
FIG. 11 is a part of a flowchart explaining a public key transmission process executed by a printer according to a second embodiment of the present invention.

FIG. 11 is a flowchart explaining a part of a public key transmission process executed in the printers 30, 32 according to this embodiment and corresponds to FIG. 8 in the aforementioned first embodiment.

As shown in FIG. 11, the public key transmission process according to this embodiment is the same as that in the aforementioned first embodiment until the creation of the passphrase shown in step S142, but different therefrom in the process thereafter. More specifically, after creating the passphrase, the printer 30 judges whether a random number of the print client which requests a public key is registered with this printer 30 (step S300).

Figure 12:
FIG. 12 is a diagram showing an example of the structure of a random number table included in the printer according to the second embodiment of the present invention.

FIG. 12 is a diagram showing an example of the structure of a random number table TB20 in which random numbers are registered for respective print clients held in the printer 30 according to this embodiment. In this embodiment, this random number table TB20 is stored and held on the hard disk 58.

As shown in FIG. 12, the random number table TB20 includes a print client ID DT20 and a random number TD21 as data items. The print client ID TD20 stores print client IDs as information to specify print clients. The random number TD21 stores random numbers in a one-to-one correspondence with the print client IDs in the print client ID TD20.

In this embodiment, as described before in step S122 in the first embodiment, the print client ID and the password as identification information are transmitted from each of the print clients 20, 22 to the printer 30. Therefore, in step S300, it is judged whether the print client ID received from each of the print clients 20, 22 is registered in the random number table TB20 and its random number is held therein.

As shown in FIG. 11, when the random number of the print client in question is not registered with the printer 30 (step S300: No), the printer 30 generates one random number for this print client and registers it in the random number table TB20 (step S302). More specifically, the printer 30 registers the print client ID of the print client and the generated random number in the random number table TB20.

On the other hand, when the random number is registered with the printer 30 (step S300: Yes), the process in step S302 is bypassed.

Then, the printer 30 reads and acquires the random number of the print client which requests the transmission of the public key (step S304).

Thereafter, the printer 30 generates a public key and a private key with the passphrase created in step S142 and the random number acquired in step S304 by the public key cryptography (step S306). Then, similarly to the aforementioned first embodiment, the printer 30 transmits only the public key out of the generated public key and private key to the print client 20 (step S152). Incidentally, the private key is deleted without being saved.

Subsequently, the printer 30 ends the connection with the print client 20 (step S154). Thus, the public key transmission process according to this embodiment is completed.

Figure 13:
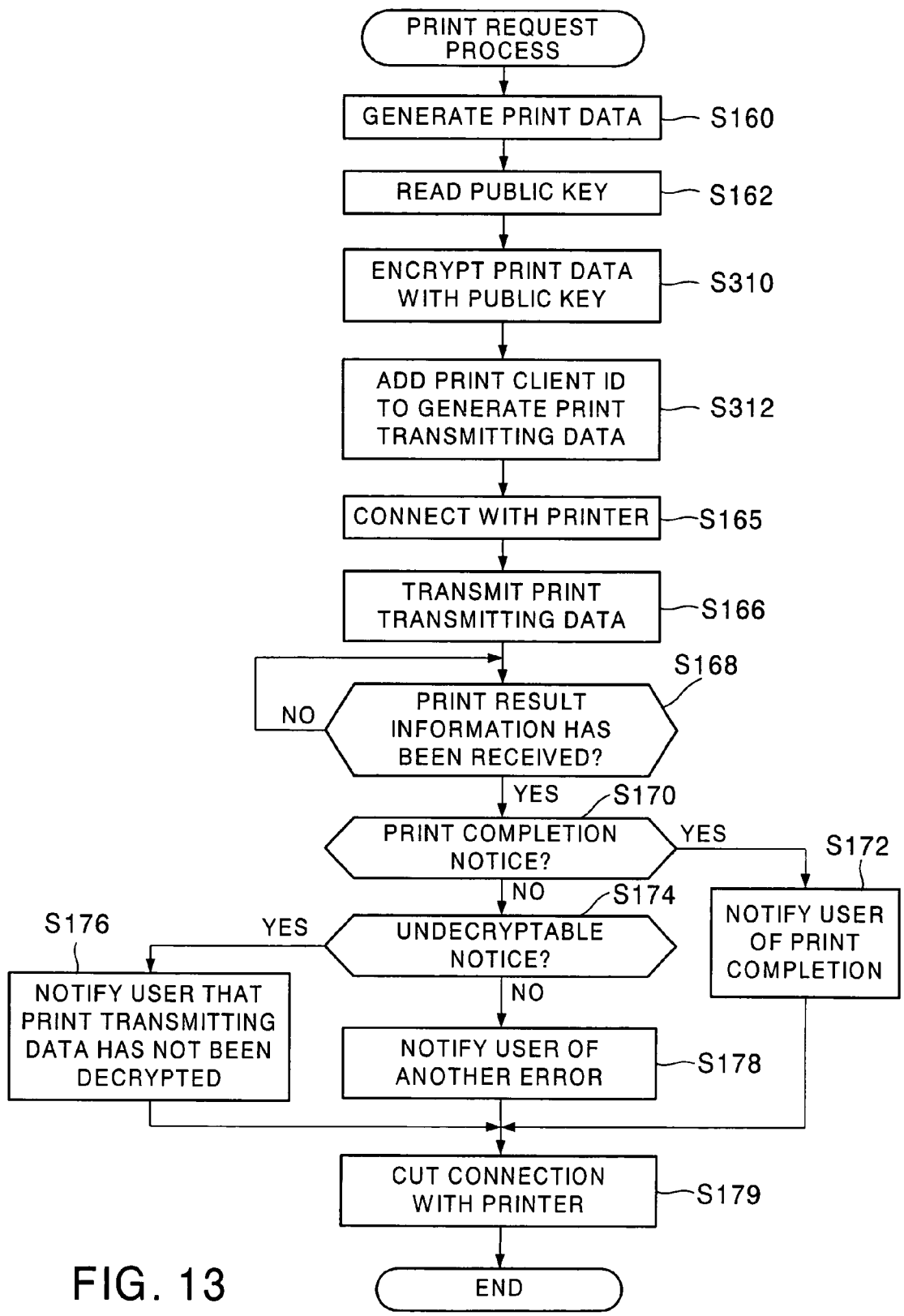
FIG. 13 is a flowchart explaining a print request process executed by a print client according to the second embodiment of the present invention.

Next, a print request process executed in the print clients 20, 22 according to this embodiment will be explained based on FIG. 13. FIG. 13 is a flowchart explaining the print request process executed in the print clients 20, 22 according to this embodiment.

As shown in FIG. 13, the print request process according to this embodiment is different from that according to the aforementioned first embodiment in a process for generating print transmitting data. Namely, after reading the public key in step S162, the print client 20 encrypts the print data D05 with the public key (step S310).

Figure 14:
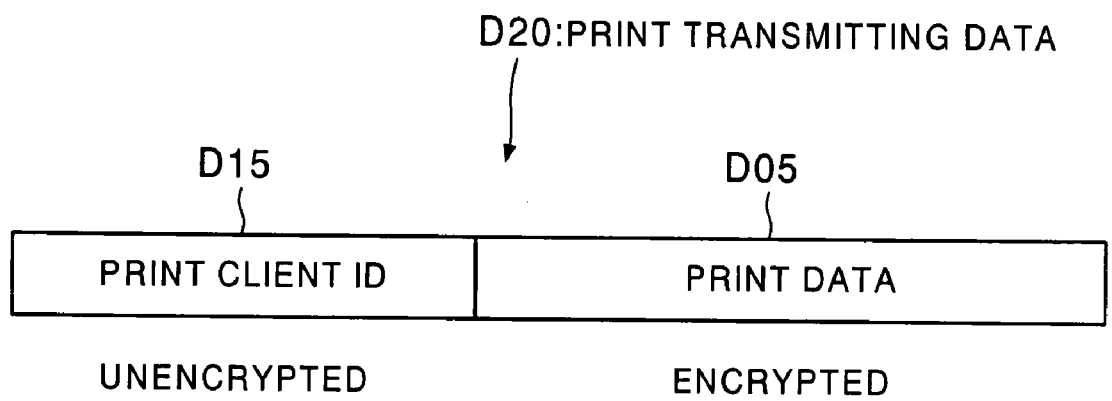
FIG. 14 is a diagram showing an example of the structure of print transmitting data transmitted from the print client to the printer in the second embodiment of the present invention.

Then, the print client 20 adds its own print client ID to the encrypted print data D05 to generate print transmitting data (step S312). FIG. 14 is a diagram showing an example of a format of print transmitting data D20 according to this embodiment. As shown in FIG. 14, the print transmitting data D20 according to this embodiment is structured by adding a print client ID D15 which is not encrypted with the public key read in step S162 to the print data D05 which is encrypted with the public key read in step S162.

The reason why the print client ID D15 is not encrypted with the public key read in step S162 is that since the printer 30 holds different random numbers for respective print clients, a private key cannot be generated if the print client ID D15 cannot be specified. Therefore, it is possible to encrypt the print client ID D15 without using the public key read in step S162 by a different cryptography. Incidentally, the print transmitting data D20 may contain data other than these print client ID D15 and print data D05.

Moreover, in this embodiment, the print client ID D15, together with the print data D05, is transmitted, but the print client ID D15 may be transmitted separately from the print data D05. In this case, the print client ID dl5 may be transmitted before or after the print data D05 if relevance to the print data D05 is maintained.

The process after step S312 is the same as in the aforementioned first embodiment.

Figure 15:
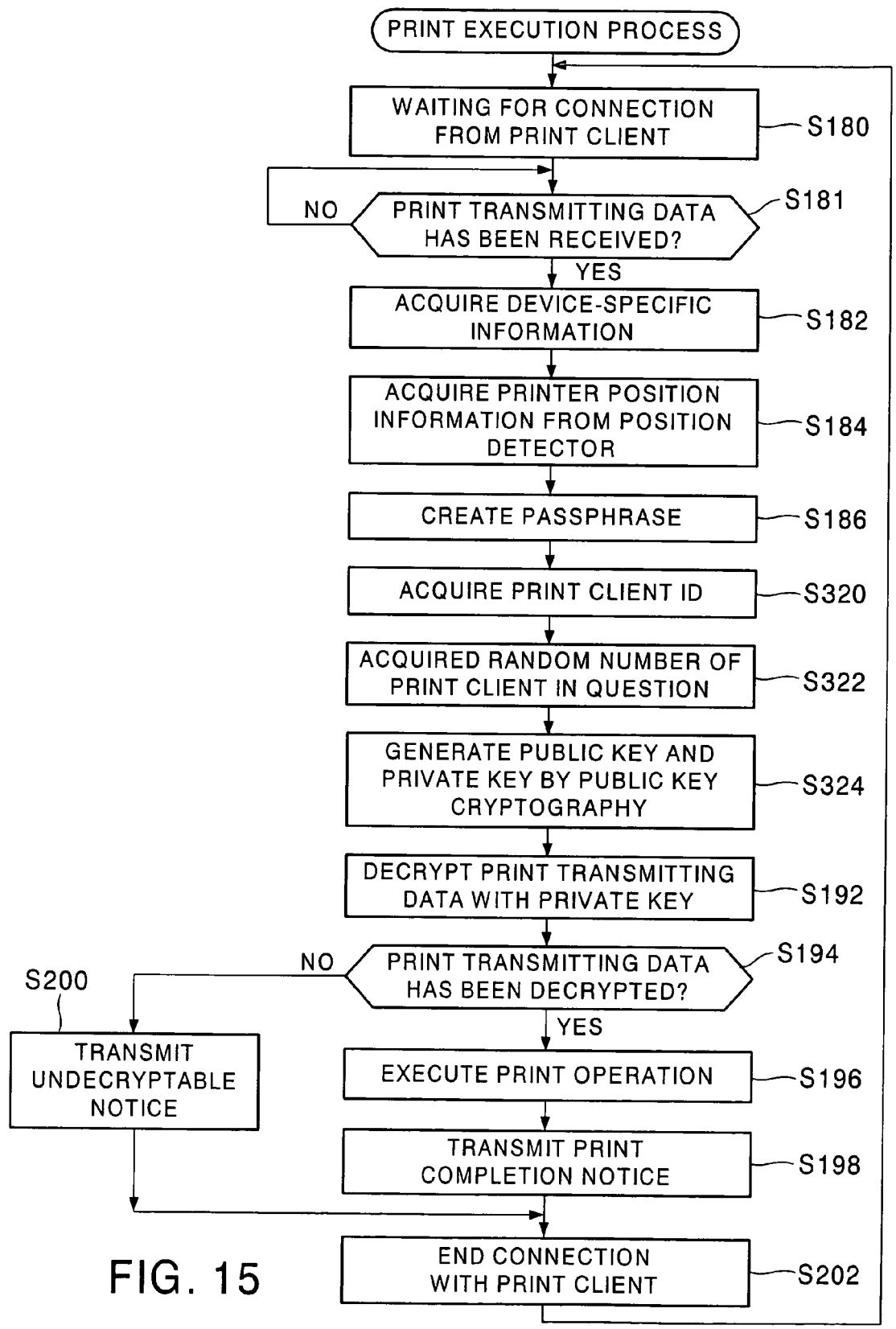
FIG. 15 is a flowchart explaining a print execution process executed by the printer according to the second embodiment of the present invention.

Next, a print execution process executed in the printers 30, 32 according to this embodiment will be explained based on FIG. 15. FIG. 15 is a flowchart explaining the print execution process executed in the printers 30, 32 according to this embodiment.

As shown in FIG. 15, the print execution process according to this embodiment is different from that according to the aforementioned first embodiment in a process of acquiring a random number. Namely, after creating the passphrase in step S186, the printer 30 extracts and acquires the print client ID D15 from the received print transmitting data D20 (step S320).

Then, the printer 30 searches the random number table TB20 using the print client ID as a search key, and reads and acquires a random number of the print client in question from the random table TB20 (step S322). Subsequently, the printer 30 generates a public key and a private key with the passphrase generated in step S186 and the random number acquired in step S322 by the public key cryptography (step S324).

The process after step S324 is the same as in the aforementioned first embodiment.

As described above, the same effect as in the aforementioned first embodiment can be obtained also by the print system according to this embodiment. Moreover, according to the print system of this embodiment, the printers 30, 32 each generate and hold a random number for each of print clients, which can make it extremely difficult for the third party to guess the random number.

Third Embodiment

In the third embodiment of the present invention, the printers 30, 32 each generate and hold a random number used when a public key and a private key are generated for each user, which makes it more difficult for a third party to guess the random number. Further details will be given below.

It should be mentioned that the configuration of a print system according to this embodiment is the same as that in FIG. 1 in the aforementioned first embodiment, the configurations of the printers 30, 32 are the same as that in FIG. 2 described above, and the configurations of the print clients 20, 22 are the same as that in FIG. 3 described above.

Figure 16:
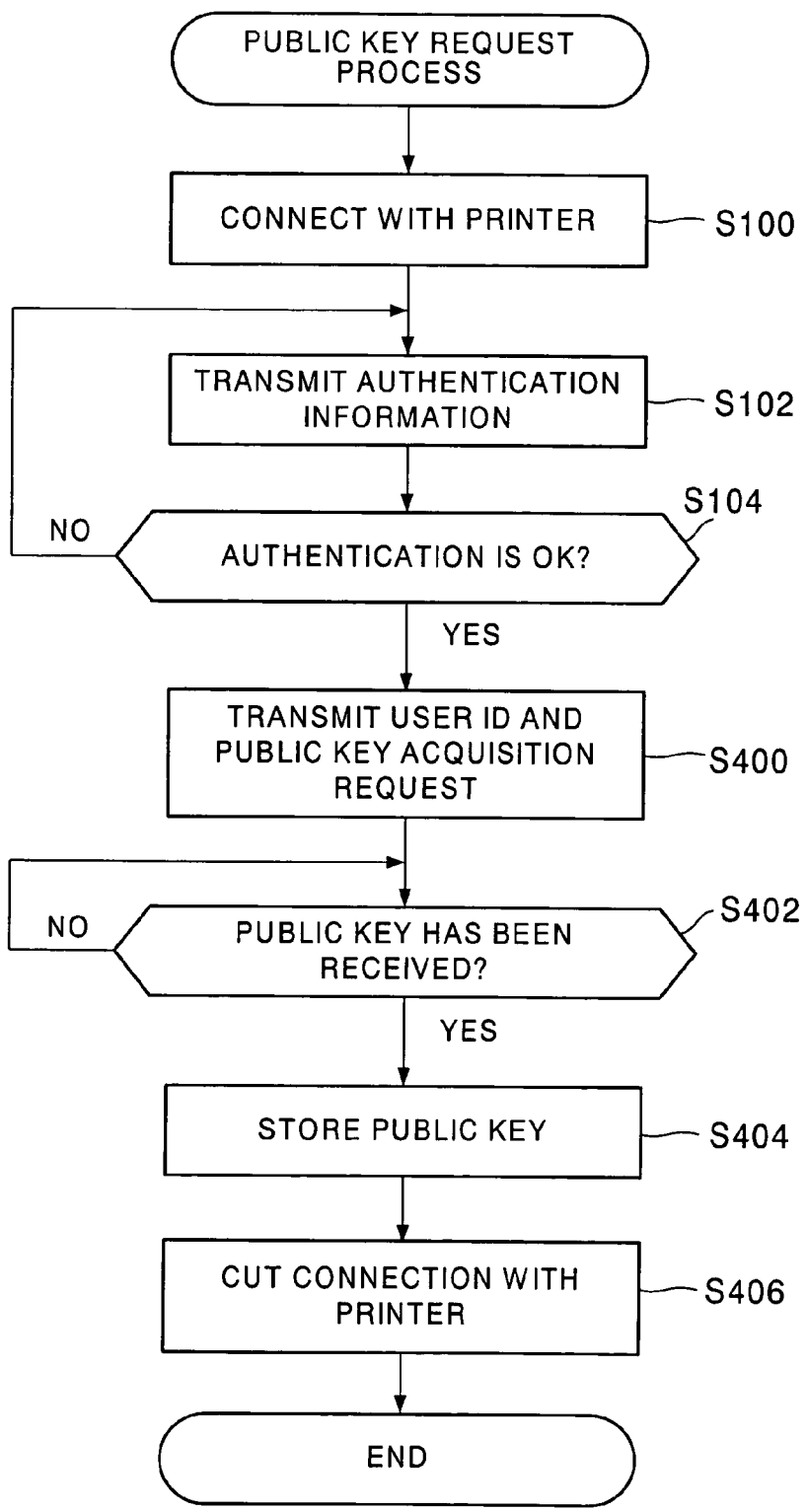
FIG. 16 is a flowchart explaining a public key request process executed by a print client according to a third embodiment of the present invention.

FIG. 16 is a flowchart explaining a part of a public key request process executed in the print clients 20, 22 according to this embodiment, and corresponds to FIG. 5 in the aforementioned first embodiment.

As shown in FIG. 16, the public key request process according to this embodiment is different from that according to the aforementioned first embodiment in the process after the authentication has been accepted in step S104. Namely, when the authentication has been accepted (step S104: Yes), the print client 20 transmits a user ID of a user which requests a public key and a public key acquisition request to the printer 30 (step S400). In this embodiment, the user operates a keyboard or the like to input the user ID to the print client and transmits the inputted user ID to the printer 30.

Then, the print client 20 judges whether the public key has been received from the printer 30 (step S402). When the public key has not been received from the printer 30 (step S402: No), the print client 20 stands by while repeating step S402.

On the other hand, when the public key has been received from the printer 30 (step S402: Yes), the public key is stored (step S404). In this embodiment, the print client 20 is provided with a public key table TB30 on a printer-by-printer basis on the hard disk 76, and the acquired public key is stored and held in this public key table TB30.

Figure 17:
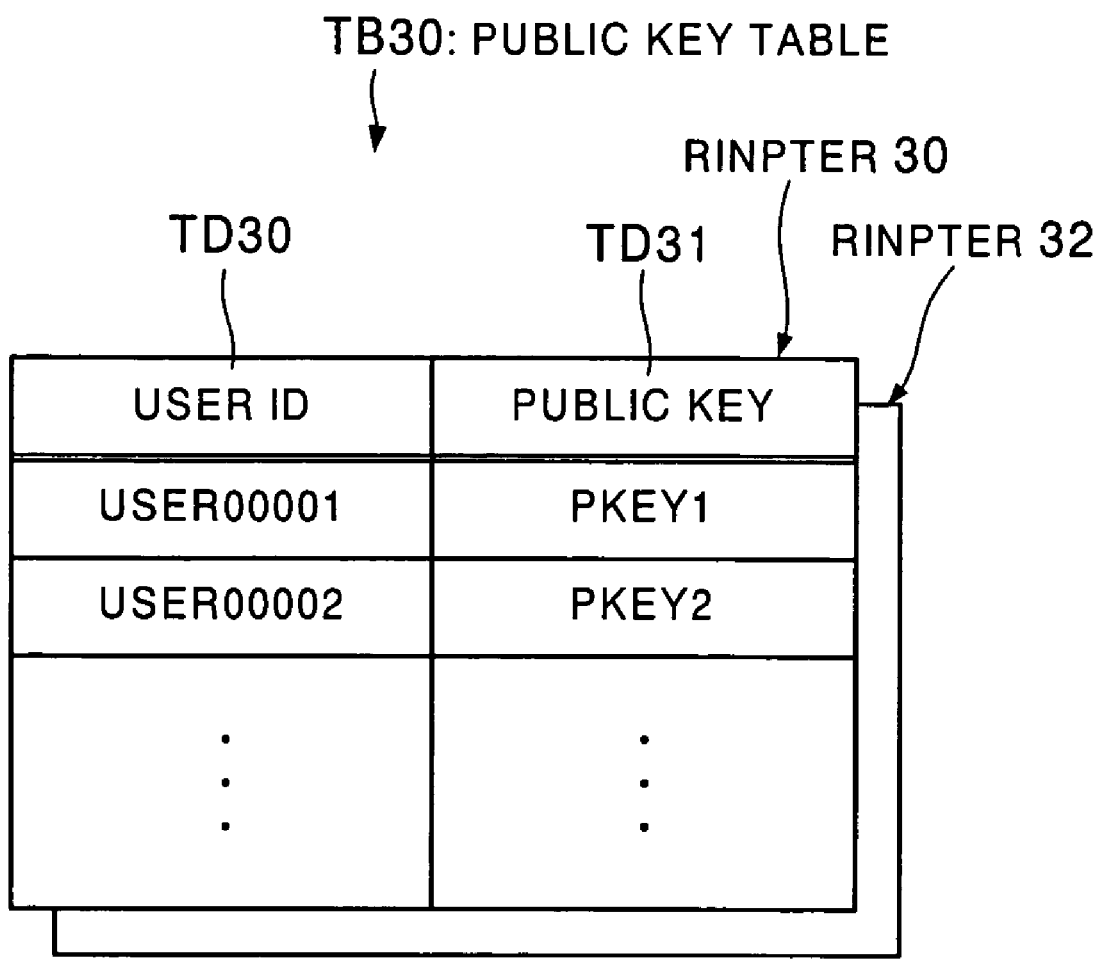
FIG. 17 is a diagram showing an example of the structure of a public key table included in the print client according to the third embodiment of the present invention.

FIG. 17 is a diagram showing an example of the structure of the public key table TB30. As shown in FIG. 17, in the public key table TB30, a table is formed for each of the printers 30, 32, and each table includes an item TD30 which stores information to specify users and an item TD31 which stores acquired public keys in a one-to-one correspondence with the users. As just described, the public key table TB30 can hold public keys concerning plural users on a user-by-user basis and on a printer-by-printer basis. Moreover, by storing the public keys in the public key table TB30 on the hard disk 76 in this manner, even when the print client 20 is powered off and then powered on again, the public keys acquired before the power-on can be read from the hard disk 76 and used as they are.

As shown in FIG. 16, the print client 20 then cuts the connection with the printer 30 (step S406). Thus, the public key request process shown in FIG. 16 is completed.

Figure 18:
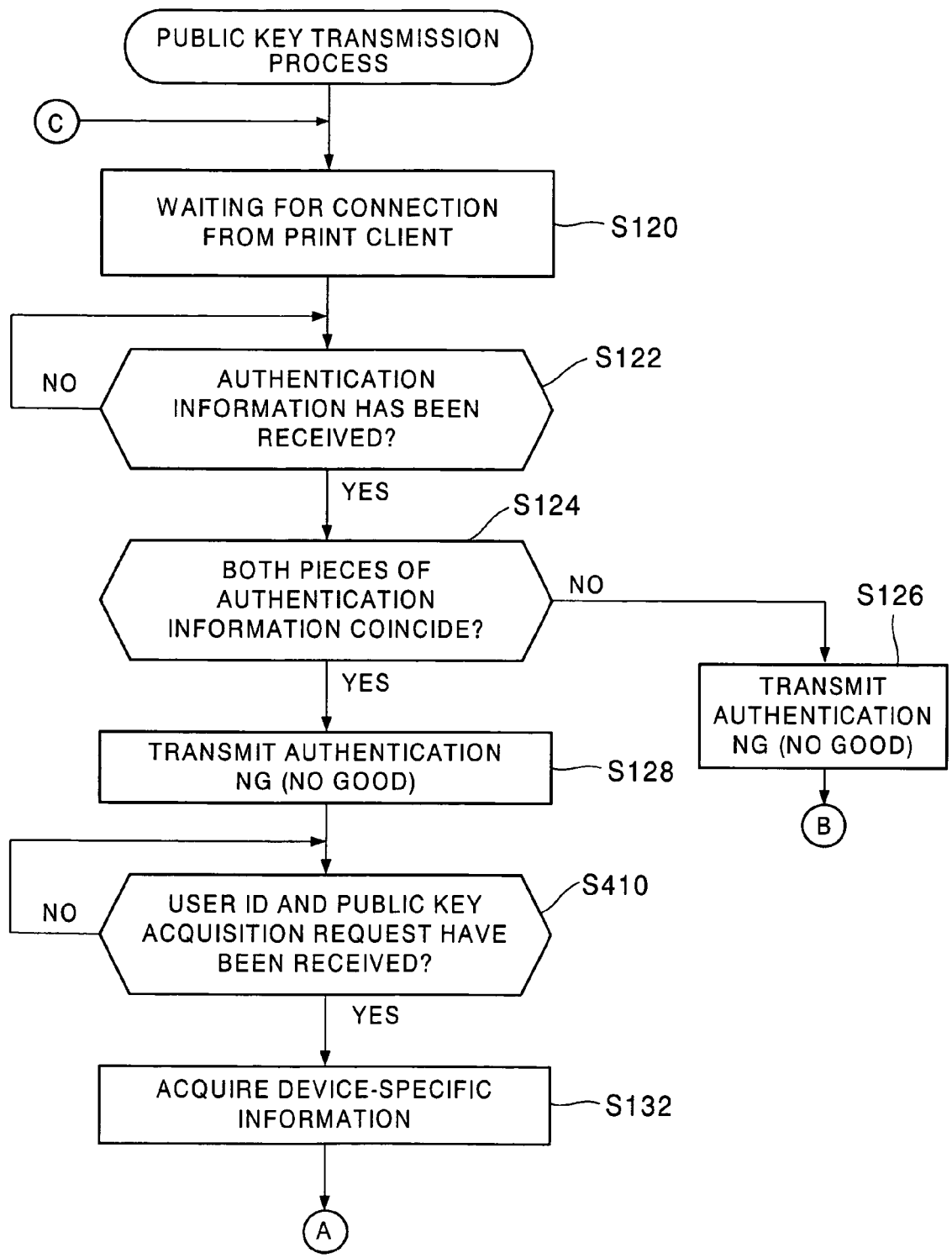
FIG. 18 is a part of a flowchart explaining a public key transmission process executed by a printer according to the third embodiment of the present invention (First part)
Figure 19:
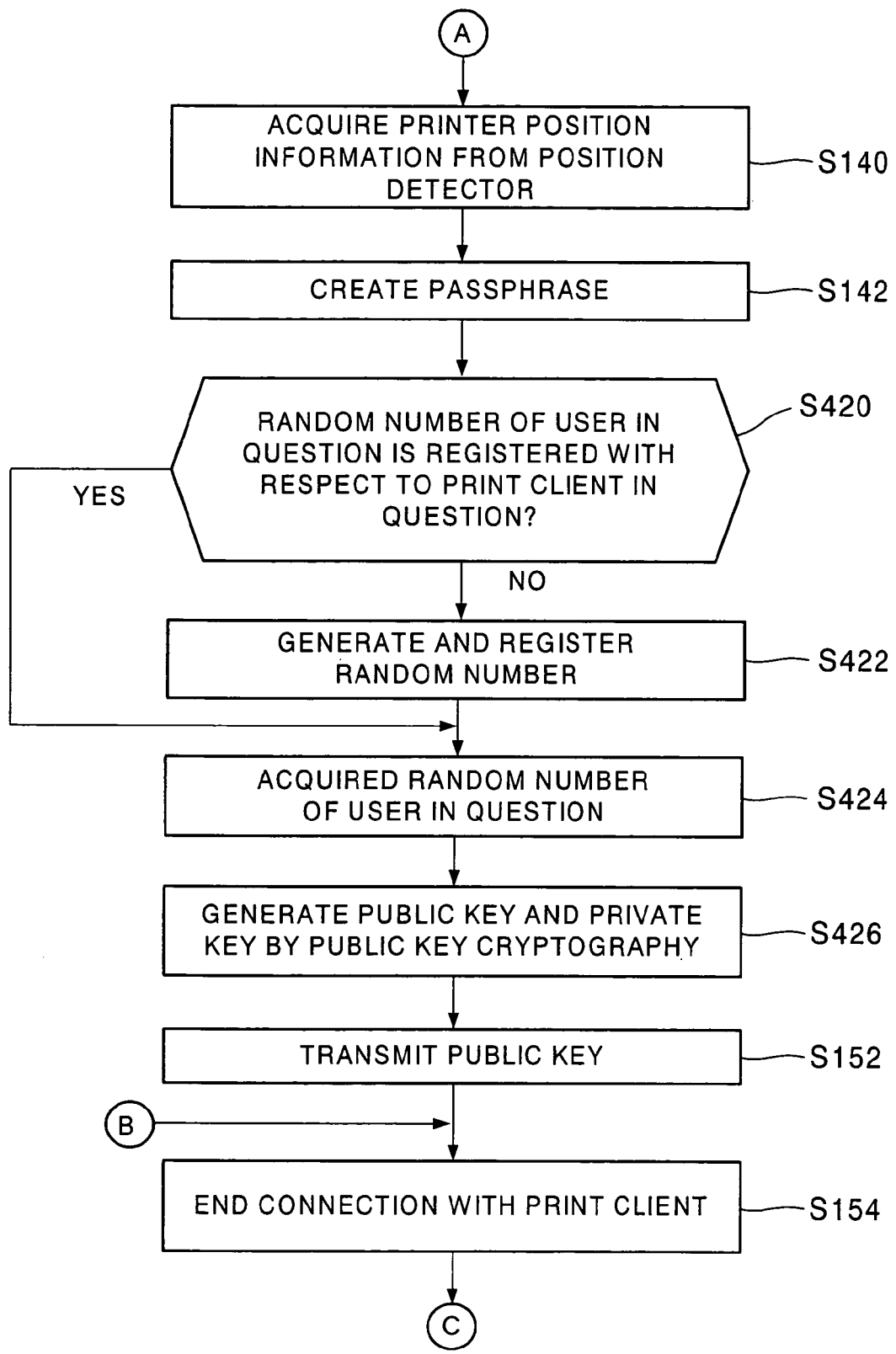
FIG. 19 is a part of the flowchart explaining the public key transmission process executed by the printer according to the third embodiment of the present invention (Second part)

Next, a public key transmission process executed in the printers 30, 32 according to this embodiment will be explained based on FIG. 18 and FIG. 19. FIG. 18 and FIG. 19 are flowcharts explaining the public key transmission process executed in the printers 30, 32, and corresponds to FIG. 7 and FIG. 8 in the aforementioned first embodiment.

First, as shown in FIG. 18, this embodiment is different from the aforementioned first embodiment and second embodiment in that the printer 30 receives the user ID, together with the public key acquisition request, from the print client 20. Namely, after transmitting the authentication result indicating that the authentication has been accepted in step S128, the printer 30 judges whether the user ID and the public key acquisition request have been received (step S410). When either the user ID or the public key acquisition request has not been received (step S410: No), the printer 30 stands by while repeating the process in step S410.

On the other hand, when both the user ID and the public key acquisition request have been received (step S410: Yes), the printer 30 executes the process from step S132 similarly to the aforementioned first embodiment.

Moreover, as shown in FIG. 19, this embodiment is different from the aforementioned first embodiment and second embodiment in a process when the printer 30 acquires a random number. Namely, after generating the passphrase, the printer 30 judges whether a random number of the user who requests the public key is registered with respect to the print client 20 with the printer 30 (step S420).

Figure 20:
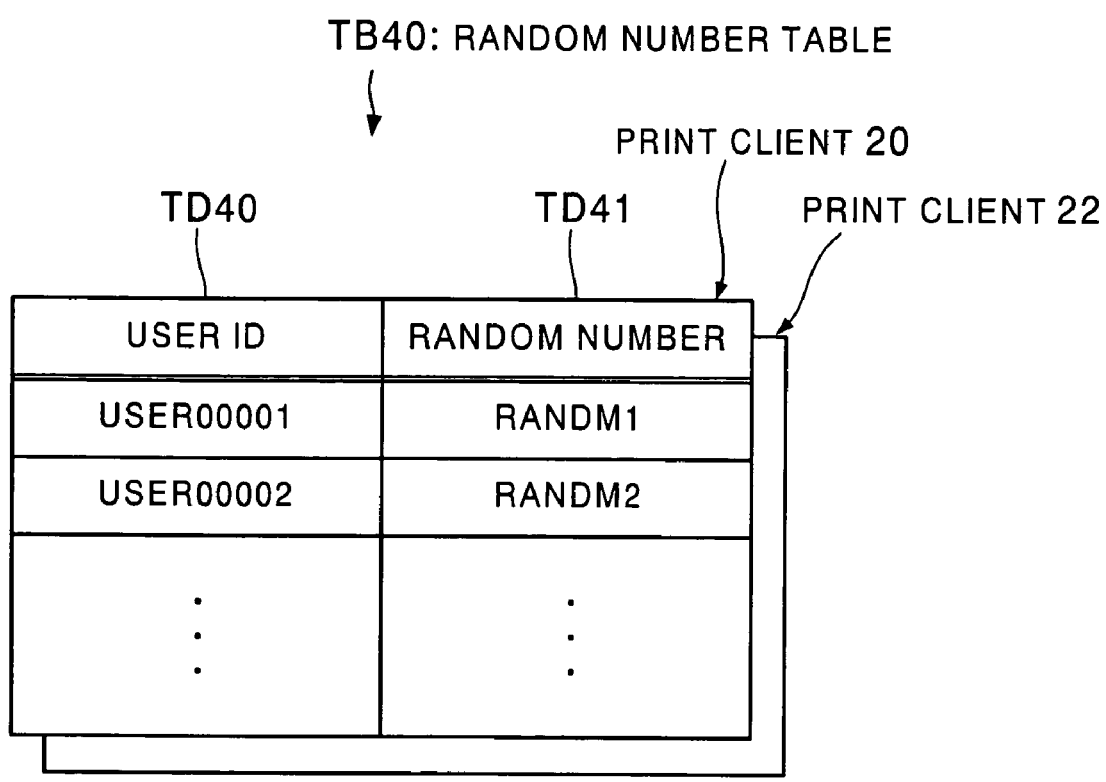
FIG. 20 is a diagram showing an example of the structure of a random number table included in the printer according to the third embodiment of the present invention.

FIG. 20 is a diagram showing an example of the structure of a random number table TB40, in which random numbers are registered on a user-by-user basis, held in the printer 30 according to this embodiment. In this embodiment, in this random number table TB40, a table is formed for each of print clients. This random number table TB40 is stored and held on the hard disk 58.

As shown in FIG. 20, the ransom number table TB40 includes a user ID TD40 and a random number TD41 as data items. The user ID TD40 stores user IDs as information to specify users. The random number TD41 stores random numbers in a one-to-one correspondence with the user IDs in the user ID TD40.

In this embodiment, as described before in step S122, the print client ID and the password as identification information are transmitted from the print client 20 to the printer 30. Therefore, in step S300, the table of the print client 20 in the random number table TB40 can be specified based on the print client ID received from the print client 20. Then, it can be judged whether a random number corresponding to the user is registered in the table of the print client in question based on the user ID received from the print client 20.

As can be seen from the above, in this embodiment, a case where one user uses plural print clients is assumed, and in this case, if different print clients are used even if their users are the same, different random numbers, that is, different public keys and private keys are used.

As shown in FIG. 19, when, regarding the print client in question, the random number of the user in question is not registered with the printer 30 (step S420: No), the printer 30 generates one random number of the user in question with respect to this print client and registers it in the random number table TB40 (step S422). More specifically, the user ID and the generated random number are registered in the table of the print client 20 of the random number table TB40.

On the other hand, when the random number is registered with the printer 30 (step S420: Yes), the process in step S422 is bypassed.

Then, the printer 30 reads and acquires the random number of the user registered with respect to the print client who requests the transmission of the public key from the random number table TB40 (step S424).

Thereafter, the printer 30 generates a public key and a private key with the passphrase created in step S142 and the random number acquired in step 5424 by the public key cryptography (step S426). Then, similarly to the aforementioned first embodiment and second embodiment, the printer 30 transmits only the public key out of the generated public key and private key to the print client 20 (step S152). Incidentally, the private key is deleted without being saved.

Subsequently, the printer 30 ends the connection with the print client 20 (step S154). Thus, the public key transmission process according to this embodiment is completed.

Figure 21:
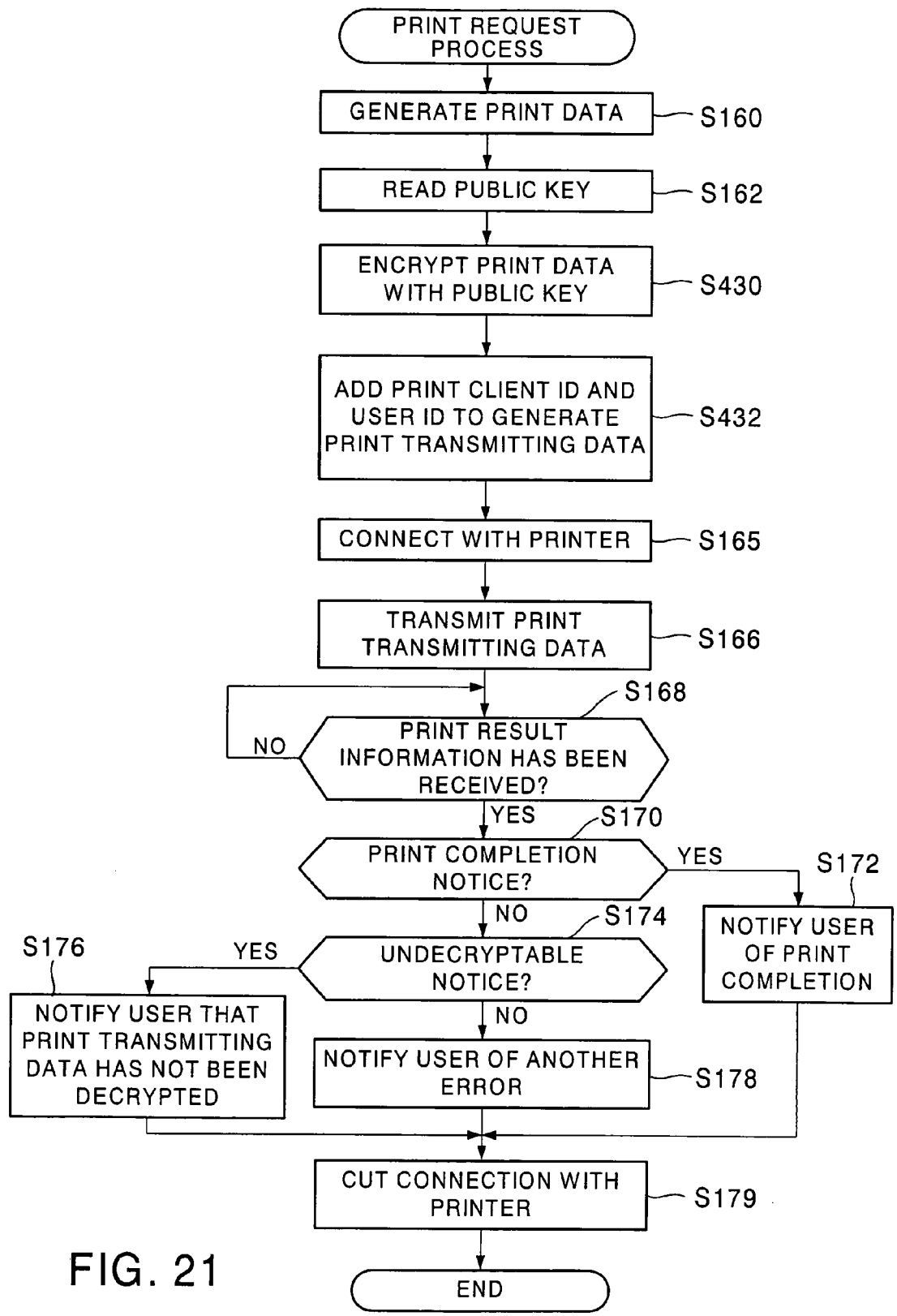
FIG. 21 is a flowchart explaining a print request process executed by the print client according to the third embodiment of the present invention.

Next, a print request process executed in the print clients 20, 22 according to this embodiment will be explained based on FIG. 21. FIG. 21 is a flowchart explaining the print request process executed in the print clients 20, 22 according to this embodiment.

As shown in FIG. 21, the print request process according to this embodiment is different from those according to the aforementioned first embodiment and second embodiment in a process for generating print transmitting data. Namely, after reading the public key of the user in question corresponding to the printer in question from the public key table TB30 in step S162, the print client 20 encrypts the print data D05 with this public key (step S430).

Figure 22:
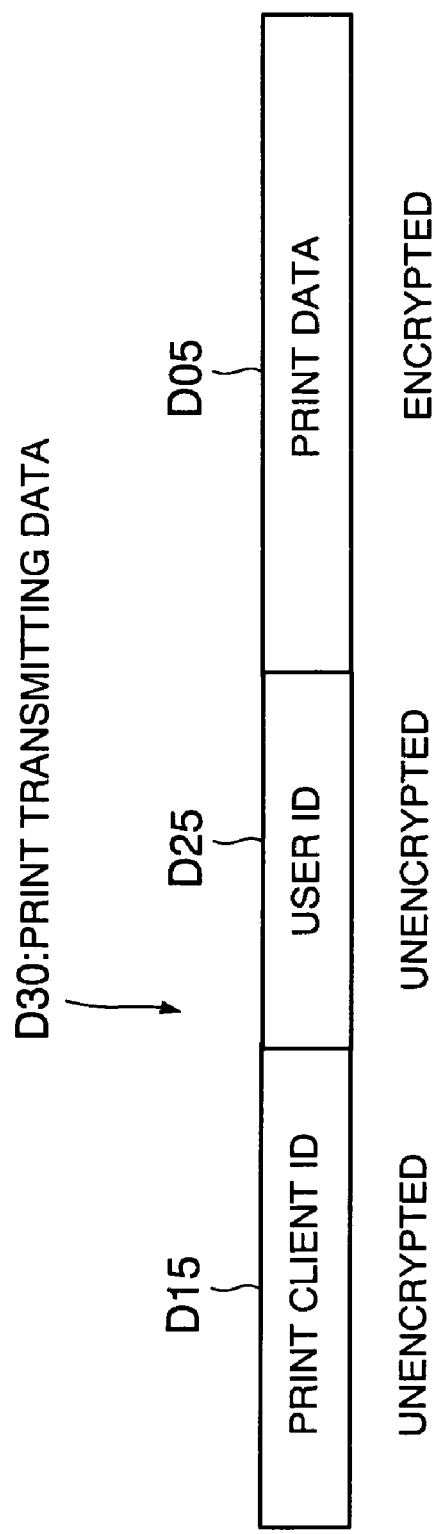
FIG. 22 is a diagram showing an example of the structure of print transmitting data transmitted from the print client to the printer in the third embodiment of the present invention.

Then, the print client 20 adds its own print client ID and user ID to the encrypted print data D05 to generate print transmitting data (step S432). FIG. 22 is a diagram showing an example of a format of print transmitting data D30 according to this embodiment. As shown in FIG. 22, the print transmitting data D30 according to this embodiment is structured by adding the print client ID D15 which is not encrypted with the public key read in step S162 and a user ID D25 which is not encrypted with the public key read in step S162 to the print data D05 which is encrypted with the public key read in step S162.

The reason why the print client ID D15 and the user ID D25 are not encrypted with the public key read in step S162 is that since the printer 30 holds different random numbers for respective print clients and for respective users, a private key cannot be generated if these print client ID D15 and user ID D25 cannot be specified. Therefore, it is possible to encrypt these print client ID D15 and user ID D25 without using the public key read in step S162 by a different cryptography. Incidentally, the print transmitting data D30 may contain data other than these print client ID D15, user ID D25, and print data D05.

Moreover, in this embodiment, the print client ID D15 and the user ID D25, together with the print data D05, are transmitted, but the print client ID D15 and the user ID D25 may be transmitted separately from the print data D05. In this case, the print client ID D15 and the user ID D25 may be transmitted before or after the print data D05 if relevance to the print data D05 is maintained. Further, the print client ID D15 and the user ID D25 may be transmitted separately or together.

The process after step S432 is the same as in the aforementioned first embodiment and second embodiment.

Figure 23:
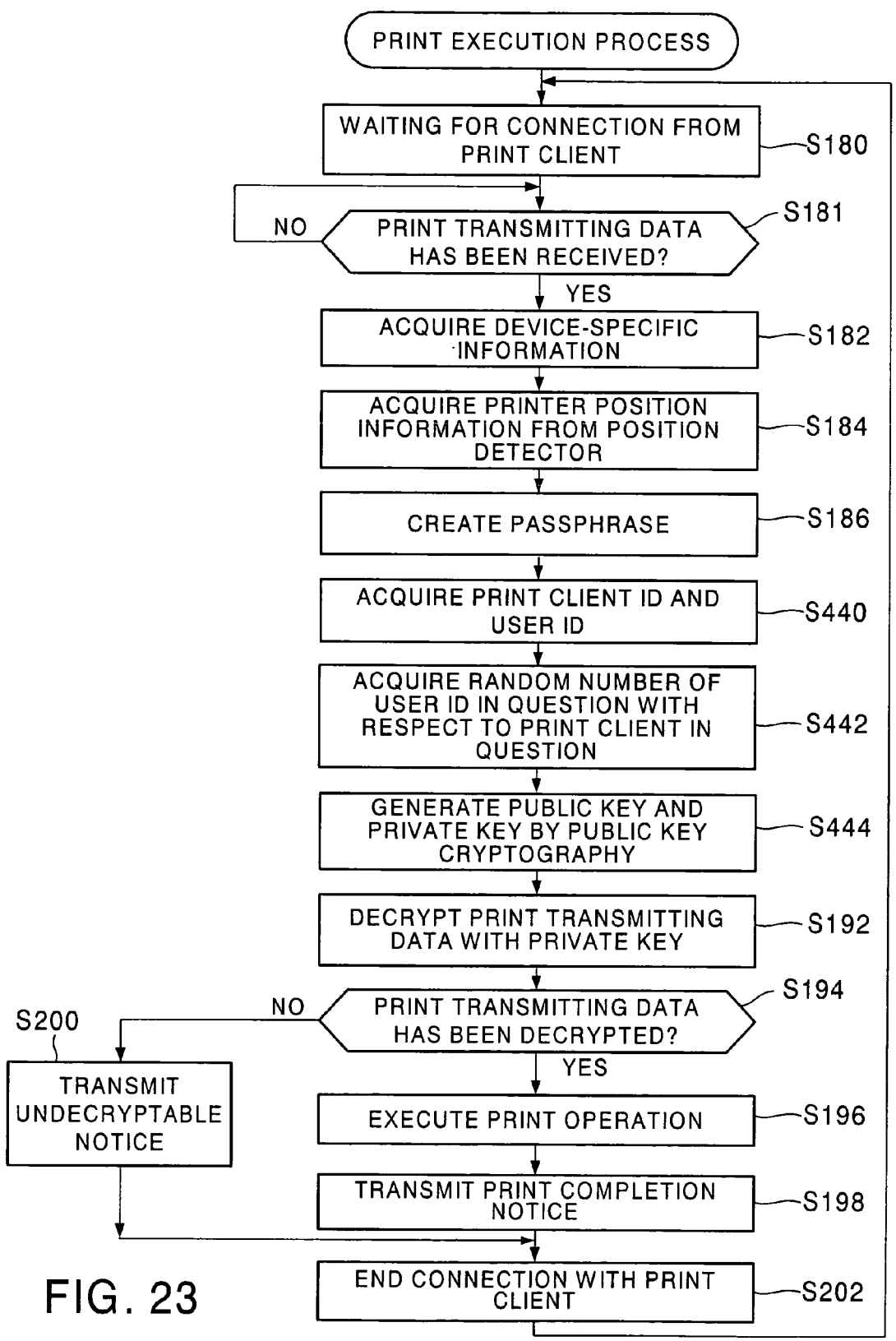
FIG. 23 is a flowchart explaining a print execution process executed by the printer according to the third embodiment of the present invention.

Next, a print execution process executed in the printers 30, 32 according to this embodiment will be explained based on FIG. 23. FIG. 23 is a flowchart explaining the print execution process executed in the printers 30, 32 according to this embodiment.

As shown in FIG. 23, the print execution process according to this embodiment is different from those according to the aforementioned first embodiment and second embodiment in a process for acquiring a random number. Namely, after creating the passphrase in step S186, the printer 30 extracts and acquires the print client ID D15 and the user ID D25 from the received print transmitting data D30 (step S440).

Then, the printer 30 searches the random number table TB40 using the acquired print client ID and user ID as a search key, and reads and acquires a random number of the user registered with respect to the print client in question from the random number table TB40 (step S442). Subsequently, the printer 30 generates a public key and a private key with the passphrase generated in step S186 and the random number acquired in step S442 by the public key cryptography (step S444).

The process after step S444 is the same as in the aforementioned first embodiment and second embodiment.

As described above, the same effect as in the aforementioned first embodiment and second embodiment can be obtained also by the print system according to this embodiment. Moreover, according to the print system of this embodiment, the printers 30, 32 each generate and hold a random number for each of users, which can make it extremely difficult for the third party to guess the random number.

Fourth Embodiment

In a print system according to the fourth embodiment of the present invention, a public key is generated with a passphrase containing at least printer position information indicating a position where a printer is installed for each print job, and transmitted to a print client. The print client transmits print transmitting data generated by encrypting print job data with this public key. The printer which has received this print transmitting data generates a private key again with a passphrase containing at least printer position information at this point in time at the time of reception and executes a print operation only when the print transmitting data has been decrypted with this private key. Generally, in the public key cryptography, a random number is used when a public key and a private key are generated, and in this embodiment, a random number used when a public key to be transmitted to the print client is generated is held and this same random number is used also when a private key is generated to decrypt the print transmitting data, whereby the same private key is obtained if printer position information unchanged. Further details will be given below.

It should be mentioned that the configuration of the print system according to this embodiment is the same as that in FIG. 1 in the aforementioned first embodiment, the configurations of the printers 30, 32 are the same as that in FIG. 2 described above, and the configurations of the print clients 20, 22 are the same as that in FIG. 3 described above.

Next, a brief explanation of a process, for example, when the print client 20 performs printing with the printer 30 in the print system according to this embodiment will be given.

In this case, the print client 20 first acquires from the printer 30 a public key of this printer 30. In this embodiment, a public key is acquired for each print job via the network 10. Namely, the printer 30 confirms whether the print client 20 which requests the transmission of a public key has rightful authority, and only when the print client has rightful authority, the printer 30 transmits its own public key to the print client 20.

The printer 30 generates this public key with a passphrase at least containing printer position information indicating a position where the printer 30 is installed and a random number generated for each print job by the printer 30 by the public key cryptography. The printer 30 holds the random number used when this public key is generated.

Note that at this time, a generated private key is deleted. Namely, in the general public key cryptography, a public key and a private key are generated at the same time. Therefore, in this embodiment, even if a private key is generated concomitantly with the generation of a public key, the private key is deleted. Consequently, the possibility of a leak of the private key generated by the printer 30 can be reduced to a minimum.

Then, as shown in FIG. 4, the user of the print client 20 generates the print job data D05 containing data which becomes necessary to perform printing with the printer 30, designates the printer 30 for the print client 20, and instructs a print operation. The print client 20 encrypts the print job data D05 with the previously acquired public key of the printer 30 to generate the print transmitting data D10. Incidentally, the print transmitting data D10 may contain data other than the print job data D05 shown in FIG. 4.

The printer 30 which has received the print transmitting data D10 temporarily stores the received print transmitting data D10 in the RAM 42 as shown in FIG. 2. The printer 30 then decrypts the encrypted print transmitting data D10 with a private key. Namely, the printer 30 generates the private key using a passphrase containing at least printer position information and a random number generated and held in the printer 30 by the public key cryptography. Then, the printer 30 decrypts the print transmitting data D10 with this private key.

Subsequently, the printer 30 judges whether the print transmitting data D10 has been decrypted. The printer 30 executes a print operation based on the print job data D05 acquired by decrypting the print transmitting data D10 when the print transmitting data D10 has been decrypted, and does not execute the print operation when the print transmitting data D10 has not been decrypted. Thereafter, the printer 30 deletes the held random number.

Next, the contents of the aforementioned process will be explained in detail using flowcharts. First, a print request process which is a process when the print clients 20, 22 each make a print request to the printers 30, 32 will be explained.

Figure 24:
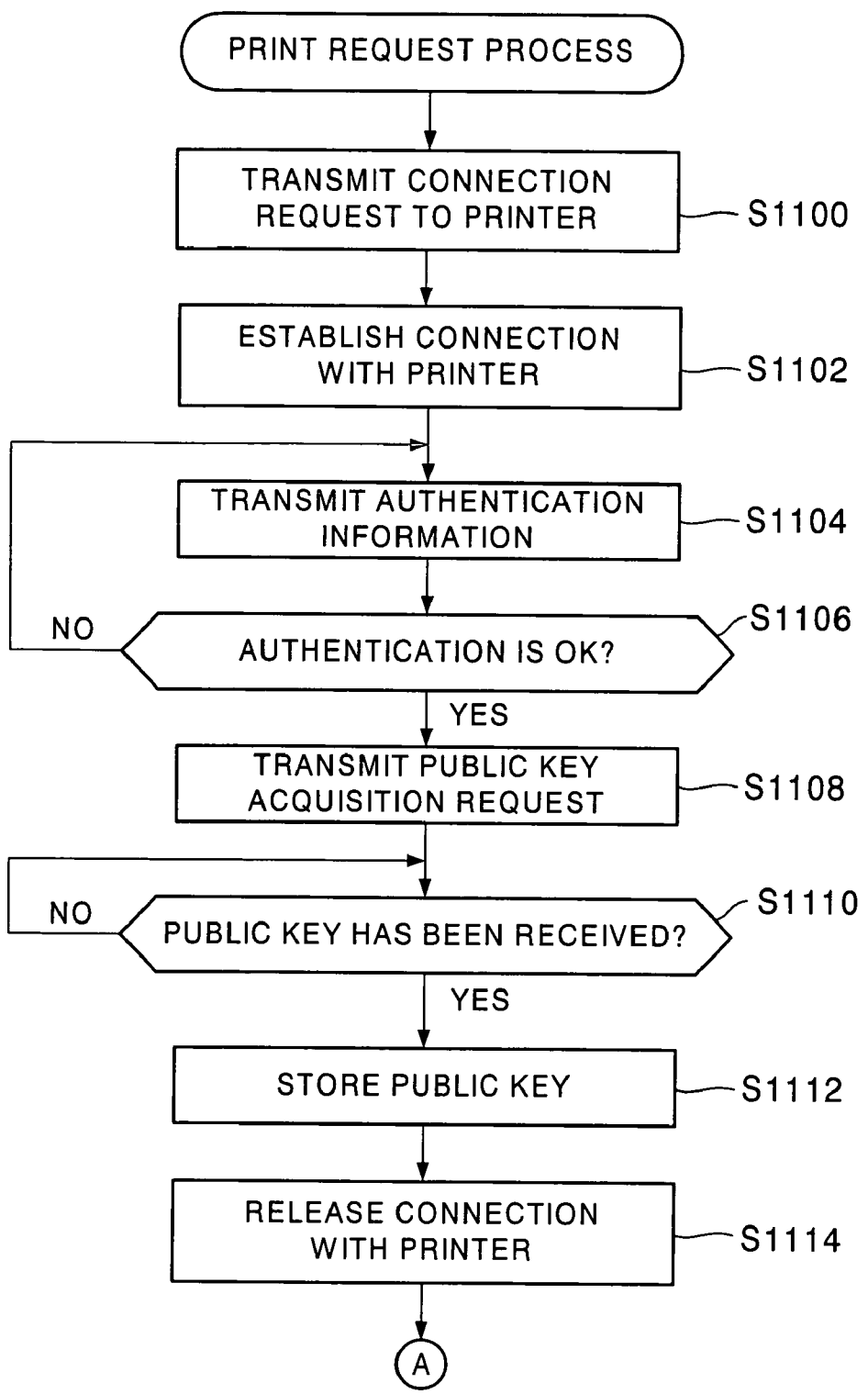
FIG. 24 is a part of a flowchart explaining a print request process executed by a print client according to a fourth embodiment (First part)
Figure 25:
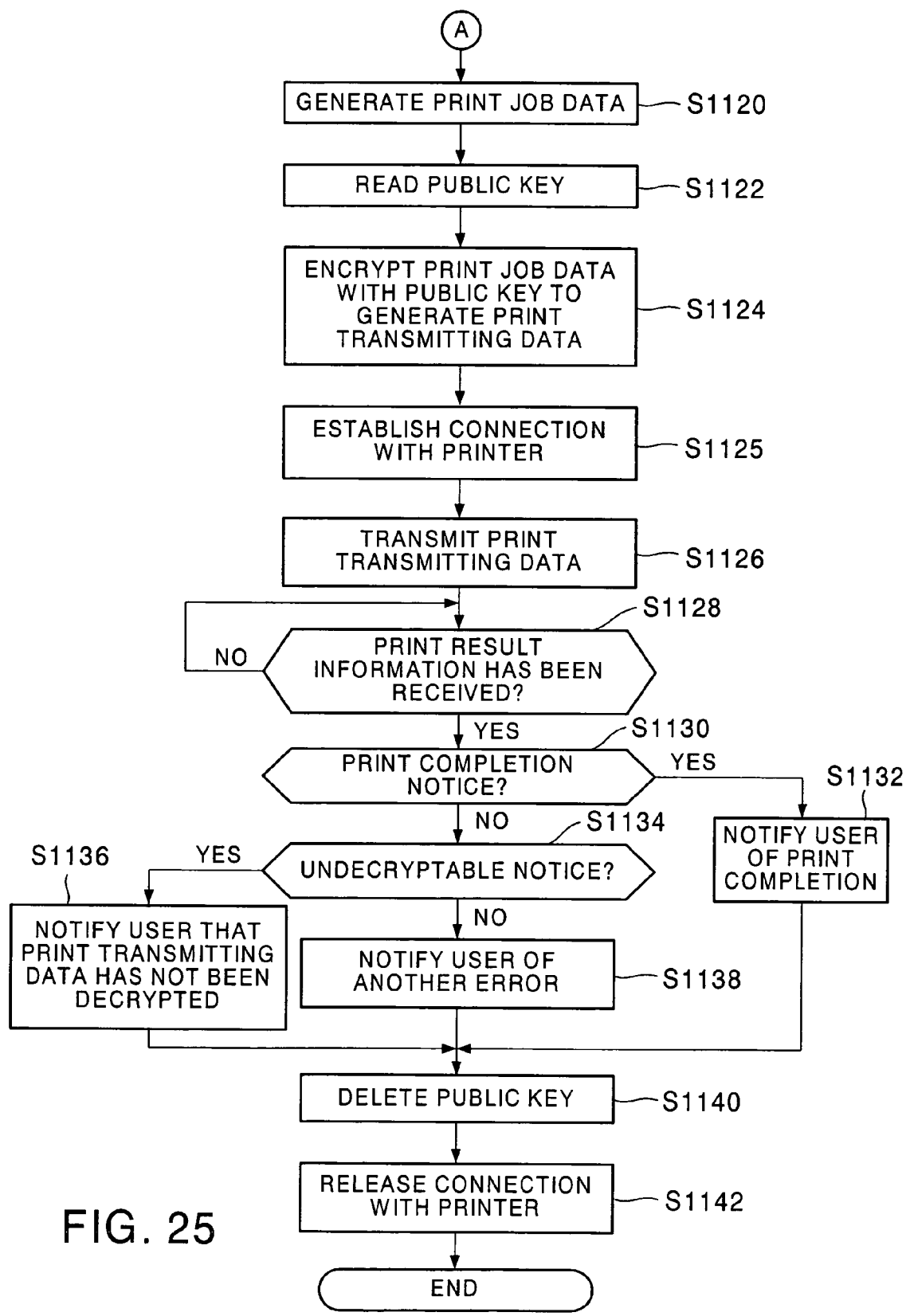
FIG. 25 is a part of the flowchart explaining the print request process executed by the print client according to the fourth embodiment (Second part)

FIG. 24 and FIG. 25 are flowcharts explaining the print request process executed in the print clients 20, 22. This print request process is realized by making the CPU 64 read and execute a print request program stored in the ROM 68 or the hard disk 76 of the print client. In this embodiment, this print request process is started and executed when the user inputs an instruction to execute a print operation to the print clients 20, 22.

Incidentally, hereinafter, assuming a case where the print client 20 makes a print request to the printer 30, the process will be explained.

As shown in FIG. 24, in this print request process, the print client 20 first transmits a connection request to the printer 30 via the network (step S1100). Then, a connection between the print client 20 and the printer 30 is established (step S1102). In this embodiment, the connection between the print client 20 and the printer 30 is established after security is ensured by the SSL (Secure Socket Layer) communication or the like.

Thereafter, the print client 20 transmits authentication information to the printer 30 (step S1104). In this embodiment, a combination of a print client ID to specify the print client and a password is used as the authentication information. Accordingly, the print client 20 transmits the print client ID and the password to the printer 30.

Subsequently, the print client 20 receives an authentication result indicating whether authentication has been accepted from the printer 30, and judges whether the authentication has been accepted by the printer 30 based on the authentication result (step S1106). When the authentication has not been accepted (step S1106: No), the print client 20 repeats the aforementioned process from step S1104.

On the other hand, when the authentication has been accepted (step S1106: Yes), the print client 20 transmits a public key acquisition request to the printer 30 (step S1108). Then, the print client 20 judges whether a public key has been received from the printer 30 (step S1110). When the public key has not been received from the printer 30 (step S1110: No), the print client 20 stands by while repeating step S1110.

On the other hand, when the public key has been received from the printer 30 (step S1110: Yes), the public key is stored (step S1112). In this embodiment, the print client 20 temporarily stores and holds this public key in the RAM 66 (See FIG. 3). By storing the public key in the RAM 66 as just described, the public key is automatically erased when the print client 20 is powered off, which can increase secrecy of the public key.

Then, the print client 20 releases the connection with the printer (step S1114). Namely, the connection established between the print client 20 and the printer 30 while the security is ensured by the SSL communication or the like is released. The release of the connection is not always a necessary process, but the connection is released in this embodiment since the print transmitting data D10 to be transmitted in step S1126 described later is separately encrypted with the public key, and hence the need for ensure the security of the connection itself is small in the process thereafter.

Thereafter, as shown in FIG. 25, the print client 20 generates the print job data D05 based on a print request from the user (step S1120). This print job data D05 is an unencrypted data which becomes necessary for the execution of a print operation by the printer 30.

Then, the print client 20 reads the public key stored in step S1112 from the RAM 66 (step S1122). Subsequently, the print client 20 encrypts the print job data D05 with this public key to generate the print transmitting data D10 (step S1124). Incidentally, the print transmitting data D10 may contain data other than the print job data.

Thereafter, the print client 20 newly establishes a connection with the printer 30 (step S1125). As described above, this connection may not necessarily be a connection whose security is ensured.

Then, the print client 20 transmits the encrypted print transmitting data D10 to the printer 30 (step S1126). More specifically, the print client 20 designates the network address of the printer 30 and sends out the print transmitting data D10 to the network 10.

Subsequently, the print client 20 judges whether print result information has been received from the printer 30 (step S1128). When the print result information has not been received (step S1128: No), the print client 20 stands by while repeating the process in step S1128. On the other hand, when the print result information has been received (step S1128: Yes), the print client 20 judges whether the print result information is a print completion notice (step S1130).

When this print result information is the print completion notice (step S1130: Yes), it means that the printer 30 has properly completed the print operation, and hence the print client 20 notifies the user that the printer 30 has completed the print operation (step S1132). On the other hand, when the received print result information is not the print completion notice (step S1130: No), whether the print result information is an undecryptable notice is judged (step S1134).

When the print result information is the undecryptable notice (step S1134: Yes), the print client 20 notifies the user that since the print transmitting data D10 has not been decrypted by the printer 30, the print operation has not been executed (step S1136). On the other hand, when the print result information is not the undecryptable notice (step S1134: No), some other error is thought to occur, and hence the print client 20 gives notice according to the type of the error to the user (step S1138).

After the notice in step S1132, step S1136, or step S1138, the print client 20 deletes the public key stored in the RAM 66 in step S1112 (step S1140). This process in step S1140 is not always a necessary process, but in this embodiment, to improve the secrecy of the public key, the acquired public key is deleted every time the process of one print job is completed.

Then, the print client 20 releases the connection with the printer 30 (step S1142). Thus, the print request process in the print client 20 is completed.

Figure 26:
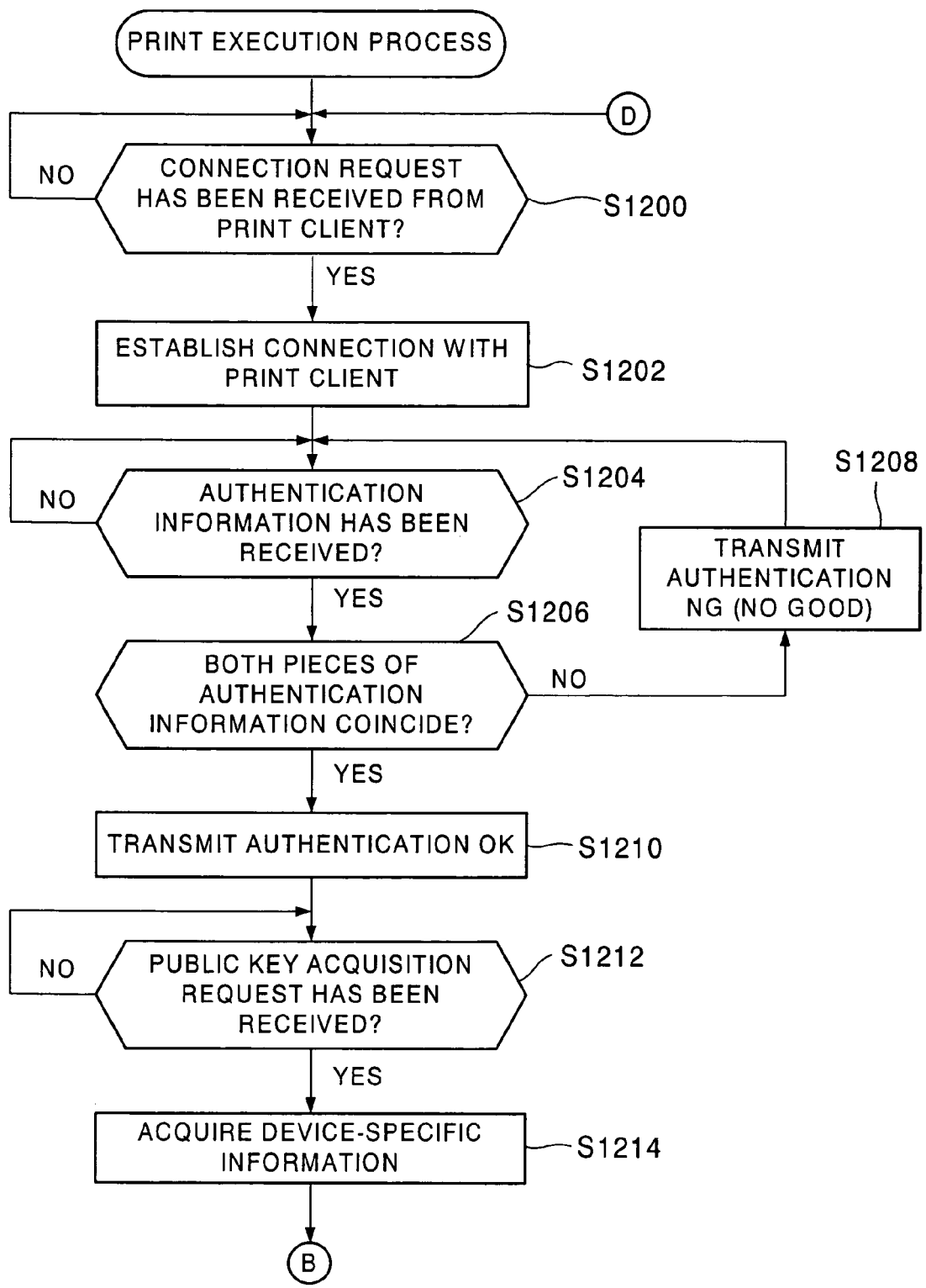
FIG. 26 is a part of a flowchart explaining a print execution process executed by a printer according to the fourth embodiment (First part)
Figure 27:
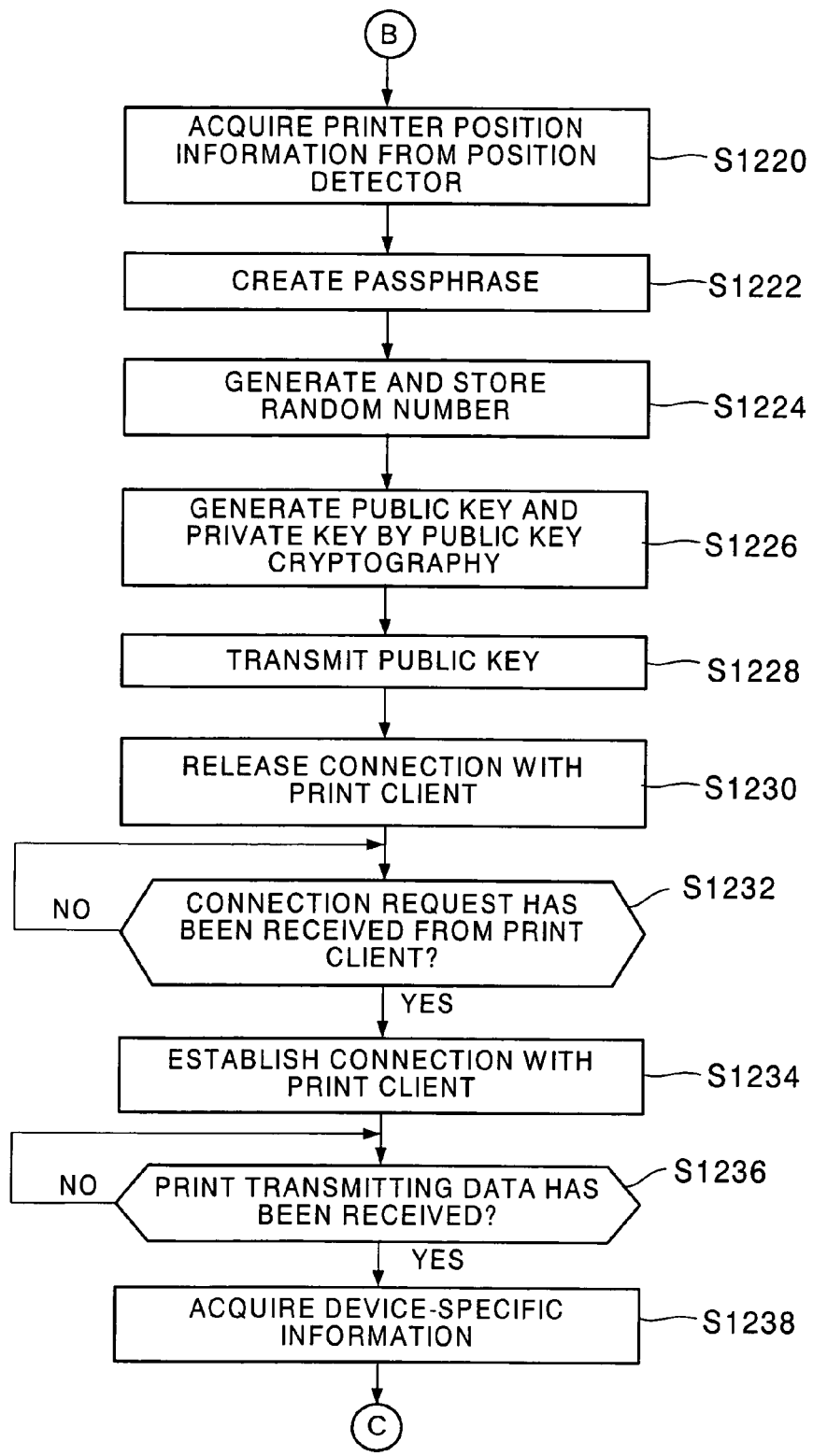
FIG. 27 is a part of the flowchart explaining the print execution process executed by the printer according to the fourth embodiment (Second part)
Figure 28:
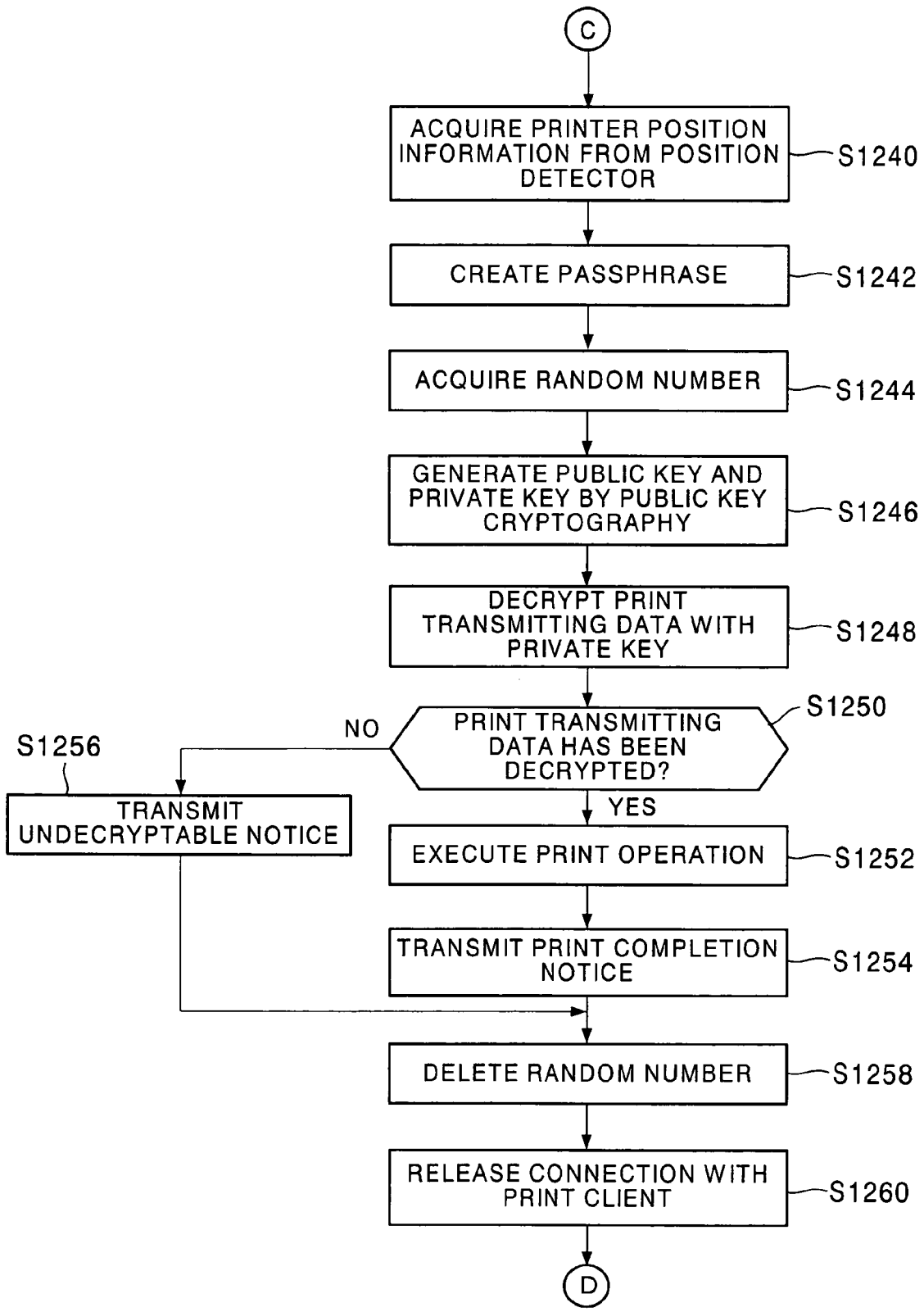
FIG. 28 is a part of the flowchart explaining the print execution process executed by the printer according to the fourth embodiment (Third part)

Next, a print execution process executed in the printers 30, 32 corresponding to the print request process in the print clients 20, 22 will be explained based on FIG. 26 to FIG. 28. FIG. 26 to FIG. 28 are flowcharts explaining the print execution process executed in the printers 30, 32. This print execution process is realized by making the CPU 40 read and execute a print execution program stored in the ROM 44 or the hard disk 58 of the printer. This print execution process is regularly executed at predetermined time intervals.

Also here, similarly to the above, assuming the case where the print client 20 makes the print request to the printer 30, the following explanation is given.

As shown in FIG. 26, the printer 30 first judges whether the connection request has been received from the print client 20 via the network 10 (step S1200). When the connection request has not been received from the print client 20 (step S1200: No), the printer 30 stands by while repeating the process in step S1200. On the other hand, when the connection request has been received from the print client 20 (step S1200: Yes), as described above, after security has been ensured by the SSL communication or the like, the connection between the printer 30 and the print client 20 is established (step S1202).

Then, the printer 30 judges whether the authentication information has been received from the print client 20 (step S1204). When the authentication information has not been received (step S1204: No), the printer 30 stands by while repeating the process in step S1204.

On the other hand, when the authentication information has been received from the print client 20 (step S1204: Yes), the printer 30 judges whether this authentication information coincides with authentication information which is previously registered with the printer 30 (step S1206). More specifically, since the print client ID and the password are transmitted as the authentication information from the print client 20 as described above, the printer 30 judges whether these print client ID and password coincide with a print client ID and a password which are previously registered on the hard disk 58 or the like of the printer 30.

When these two pieces of authentication information do not coincide (step S1206: No), the printer 30 transmits the authentication result indicating that the authentication has not been accepted to the print client 20 (step S1208) and returns to the process in step S1204. On the other hand, when these two pieces of authentication information coincide (step S1206: Yes), the printer 30 transmits the authentication result indicating that the authentication has been accepted to the print client 20 (step S1210).

Thereafter, the printer 30 judges whether the public key acquisition request has been received from the print client 20 (step S1212). When the public key acquisition request has not been received (step S1212: No), the printer 30 stands by while repeating the process in step S1212.

On the other hand, when the public key acquisition request has been received from the print client 20 (step S1212: Yes), the printer 30 acquires device-specific information on the printer 30 (step S1214). Here, the device-specific information is identification information specifically assigned to the printer 30, and it is, for example, a manufacturer's serial number, a MAC address, or the like of the printer 30.

Then, as shown in FIG. 27, the printer 30 acquires printer position information on the printer 30 at this point in time from the position detector 54 (step S1220). The reason why the printer position information is acquired from the position detector 54 each time as just described is in order that, when the printer 30 has been moved to a different place, a public key is generated with position information after the movement.

Subsequently, the printer 30 creates a passphrase with the device-specific information and the printer position information (step S1222). There are various methods of creating the passphrase, and in this embodiment, the passphrase is created by simply joining the printer position information after the device-specific information. Incidentally, the passphrase may contain data other than these device-specific information and printer position information.

Then, the printer 30 generates one random number and stores this random number in the printer 30 (step S1224). In this embodiment, the generated random number is stored in the RAM 42 (See FIG. 2). By storing the random number in the RAM 42 as just described, the random number is automatically erased when the printer 30 is powered off, which can increase the secrecy of the public key and the private key.

Thereafter, the printer 30 generates a public key and a private key with the passphrase created in step S1222 and the random number generated in step S1224 by the public key cryptography (step S1226). The public key cryptography has the property that the same public key and private key are generated again if the same passphrase and random number are used. Then, the printer 30 transmits only the public key out of the generated public key and private key to the print client 20 (step S1228). Incidentally, the private key is deleted without being saved.

Subsequently, the printer 30 releases the connection with the print client 20 (step S1230). This process is a process corresponding to step S1114 in the aforementioned print request process. Moreover, the process in step S1230 is not always a necessary process as described above.

Then, the printer 30 judges whether a connection request has been received from the print client 20 via the network 10 (step s1232). When the connection request has not been received from the print client 20 (step S1232: No), the printer 30 stands by while repeating the process in step S1232. On the other hand, when the connection request has been received from the print client 20 (step S1232: Yes), a connection between the printer 30 and the print client 20 is established (step S1232). In this connection, security may not necessarily be ensured.

Thereafter, the printer 30 judges whether the print transmitting data D10 has been received from the network 10 (step S1236). When no print transmitting data D10 has been received (step S1236: No), the printer 30 stands by while repeating the process in step S1236. On the other hand, when the print transmitting data D10 has been received (step S1236: Yes), the printer 30 acquires its own device-specific information (step S1238).

Subsequently, as shown in FIG. 28, the printer 30 acquires printer position information on the printer 30 at this point in time from the position detector 54 (step S1240). The reason why the printer position information is acquired from the position detector 54 each time as just described is in order that, when the printer 30 has been moved to a different place, a private key is generated with position information after the movement.

Then, the printer 30 creates a passphrase based on the device-specific information and the printer position information (step S1242). The method of creating the passphrase needs to be the same method as in step S1222 described above. This is because, if the passphrases are different, the print transmitting data D10 encrypted with the public key transmitted to the print client cannot be decrypted with a private key.

Thereafter, the printer 30 reads and acquires the random number of the printer 30 generated in step S1224 and held in the RAM 42 (step S1244). Then, the printer 30 generates a public key and a private key with the generated passphrase and the acquired random number by the public key cryptography (step S1246). The passphrase used in step S1246 is the same as that used in step S1226 described above if the installation position of the printer 30 has not been moved between these two steps. The random number is also the same as that in step S1226 described above. Hence, the same public key and private key as generated in step 51226 are generated. Subsequently, the printer 30 decrypts the received print transmitting data D10 with the generated private key (step S1248).

Then, the printer 30 judges whether the print transmitting data D10 has been decrypted with the private key (step S1250). When the print transmitting data D10 has been decrypted (step S1250: Yes), the printer 30 executes a print operation by driving the print engine 52 based on the acquired print job data D05 (step S1252). More specifically, the printer 30 performs a language interpretation of the print job data D05 and generates print request data fitting the print engine 52. Then, by transmitting this print request data to the print engine 52, print sheets or the like are printed by the print engine 52.

As can be seen from the above, in this embodiment, the private key is generated with the passphrase containing at least the printer position information detected by the position detector 54 and the random number held in the RAM 42, and when the print transmitting data D10 has been decrypted with this private key, it is judged that the print transmitting data D10 matches the printer position information.

At a point in time when the print operation has been properly completed, the printer 30 transmits the print completion notice that the print operation has been properly completed as the print result information to the print client 20 (step S1254).

Contrary to this, when it is judged in step S1250 that the print transmitting data D10 has not been decrypted (step S1250: No), the printer 30 transmits the undecryptable notice as the print result information to the print client 20 (step S1256). Namely, in this embodiment, when the private key is generated with the passphrase containing at least the printer position information detected by the position detector 54 and the random number held in the RAM 42 but the print transmitting data D10 has not been decrypted with this private key, it is judged that that the print transmitting data D10 does not match the printer position information.

After the process in step S1254 or step S1256, the printer 30 deletes the random number held in the RAM 42 (step S1258). The process of deleting the random number from the RAM 42 is not always a necessary process, but the security of the random number can be increased by deleting the random number from the RAM 42 every time the process of one print job is completed.

Thereafter, the printer 30 releases the connection with the print client 20 (step S1260). Then, the printer 30 returns to the aforementioned process in step S1200 in FIG. 26.

As described above, according to the print system of this embodiment, the printers 30, 32 each generate a public key and a private key with a different random number for each print job by the public key cryptography and transmit the public key to the print clients 20, 22, which can enhance the security of the public key and the private key.

Moreover, a random number used when the public key is transmitted to the print client 20 is held and the private key is deleted, and hence the security of the private key can be enhanced. Further, since the random number is held, when the print transmitting data D10 encrypted with the public key is decrypted, the same private key can be generated again with the held random number by the public key cryptography and the print transmitting data D10 can be decrypted.

Furthermore, on the printers 30, 32 side, when the print transmitting data D10 has not been decrypted with this private key, a print operation of the received print transmitting data D10 is not executed, which can avoid the execution of the print operation with the printers 30, 32 by a third party with dishonest intention.

Fifth Embodiment

In a print system according to the fifth embodiment of the present invention, a public key is generated with at least print position information indicating a position where a printer is installed, a print client acquires this public key, and when the print client transmits print data to the printer, the print data is transmitted in the form of print transmitting data containing encrypted print data which is generated by encrypting the print data with the acquired public key. The printer which has received the print transmitting data generates a private key again with at least printer position information at this point in time at the time of reception and executes a print operation only when the encrypted print data contained in the print transmitting data has been decrypted with this private key. Moreover, generally, in the public key cryptography, a random number is used when a public key and a private key are generated. In this embodiment, a random number used when the public key is generated is transmitted to the print client and held by the print client. When the print client transmits the encrypted print data to the printer, the random number is also contained in the print transmitting data and transmitted to the printer, and the printer which has received the print transmitting data generates a private key again with the random number contained in the print transmitting data. Thereby, the random number used when the public key is generated and the random number used when the private key is generated to decrypt the encrypted print data become the same, whereby the same private key is obtained if the printer position information is unchanged. Further details will be given below.

It should be mentioned that the configuration of the print system according to this embodiment is the same as that in FIG. 1 in the aforementioned first embodiment, the configurations of the printers 30, 32 are the same as that in FIG. 2 described above, and the configurations of the print clients 20, 22 are the same as that in FIG. 3 described above.

Next, a brief explanation of a process, for example, when the print client 20 performs printing with the printer 30 in the print system according to this embodiment will be given.

In this case, the print client 20 previously acquires, for example, from the printer 30 a public key of this printer 30 and a random number used when this public key is generated. In this embodiment, these public key and random number are acquired via the network 10. Namely, the printer 30 confirms whether the print client 20 which requests the transmission of the public key and the random number has rightful authority, and only when the print client has rightful authority, the printer 30 notifies the print client of its public key and a random number used when this public key is used. The printer 30 generates this public key, with a passphrase containing at least printer position information indicating a position where the printer 30 is installed and the generated random number by the public key cryptography. The print client 20 has a function of holding the public key and the random number used when this public key is generated by the public key cryptography.

Incidentally, at this time, the printer 30 deletes a generated private key. Namely, in the general public key cryptography, a public key and a private key are generated at the same time. Therefore, in this embodiment, even if a private key is generated concomitantly with the generation of a public key, the private key is deleted. Consequently, when the installation position of the printer 30 has been moved, encrypted print data which is generated by encryption with a public key generated before the movement cannot be decrypted by the printer 30 after the movement.

However, the printer 30 need not necessarily notify the print client 20 of the public key of the printer 30 and the used random number via the network 10. For example, if a user of the print client 20 has rightful authority, he or she can go to the installation place of the printer 30 and operate the printer 30, whereby it is also possible that the user operates a control panel of the printer 30 and acquires the public key of the printer 30 and the used random number. In this case, it is also possible that the user records the public key of the printer 30 and the used random number on a record medium such as a flexible disk and makes the print client 20 read these public key and random number.

Figure 29:
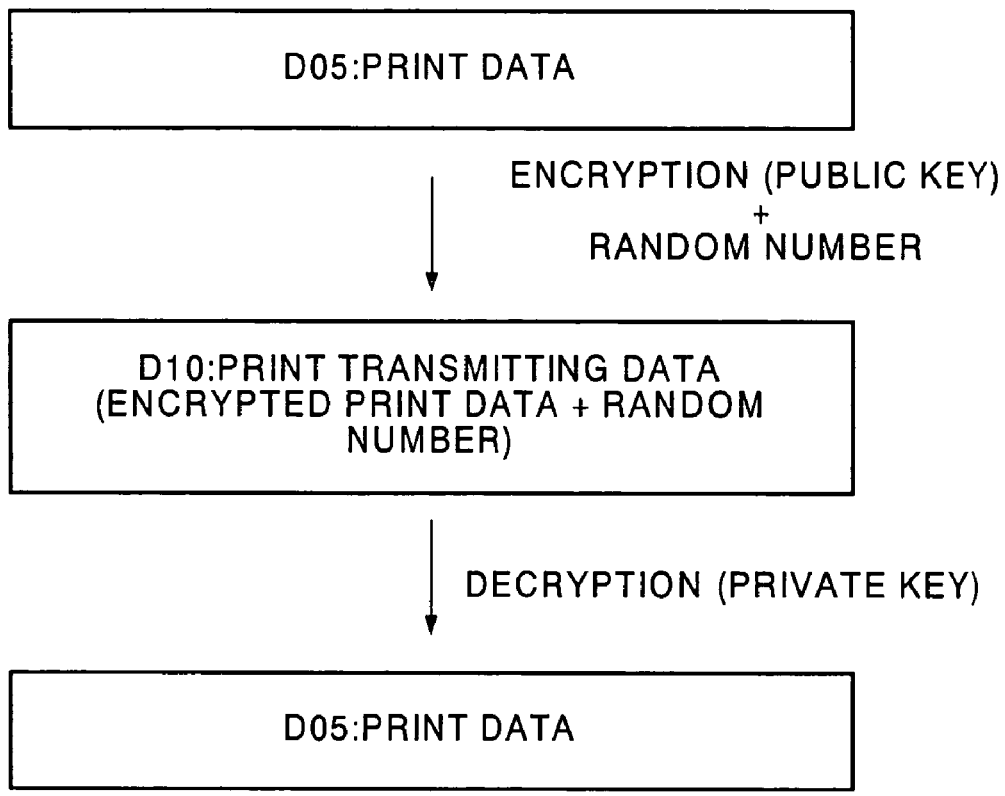
FIG. 29 is a conceptual diagram explaining encryption and decryption of print data with a public key and a private key in a fifth embodiment of the present invention.

Then, as shown in FIG. 29, the user of the print client 20 generates data to be printed, designates the printer 30 for the print client 20, and instructs a print operation. The print client 20 generates the print data D05 based on the data to be printed. Here, the print data D05 means original print data needed for a print operation executed by driving the print engine 52 in the printer 30.

The print client 20 encrypts the print data D05 with the public key acquired from the printer 30 to generate encrypted print data. Then, the print client 20 adds the random number acquired also from the printer 30 to the encrypted print data to generate the print transmitting data D10. Incidentally, the print transmitting data D10 may contain data other than the encrypted print data and the random number shown in FIG. 29.

The printer 30 which has received the print transmitting data D10 temporarily stores the received print transmitting data D10 in the RAM 42 as shown in FIG. 2. The printer 30 then decrypts the encrypted print data contained in the print transmitting data D10 with a private key. Namely, the printer 30 generates the private key using a passphrase containing at least printer position information and the random number contained in the print transmitting data D10 by the public key cryptography.

Subsequently, the printer 30 judges whether the encrypted print data has been decrypted. The printer 30 executes a print operation based on the print data D05 acquired by decrypting the encrypted print data when the encrypted print data has been decrypted, and does not execute the print operation when the encrypted print data has not been decrypted.

Next, the contents of the aforementioned process will be explained in detail using flowcharts. First, processes in the print clients 20, 22 and the printers 30, 32 when the print clients 20, 22 each acquire a public key and a random number will be explained.

Figure 30:
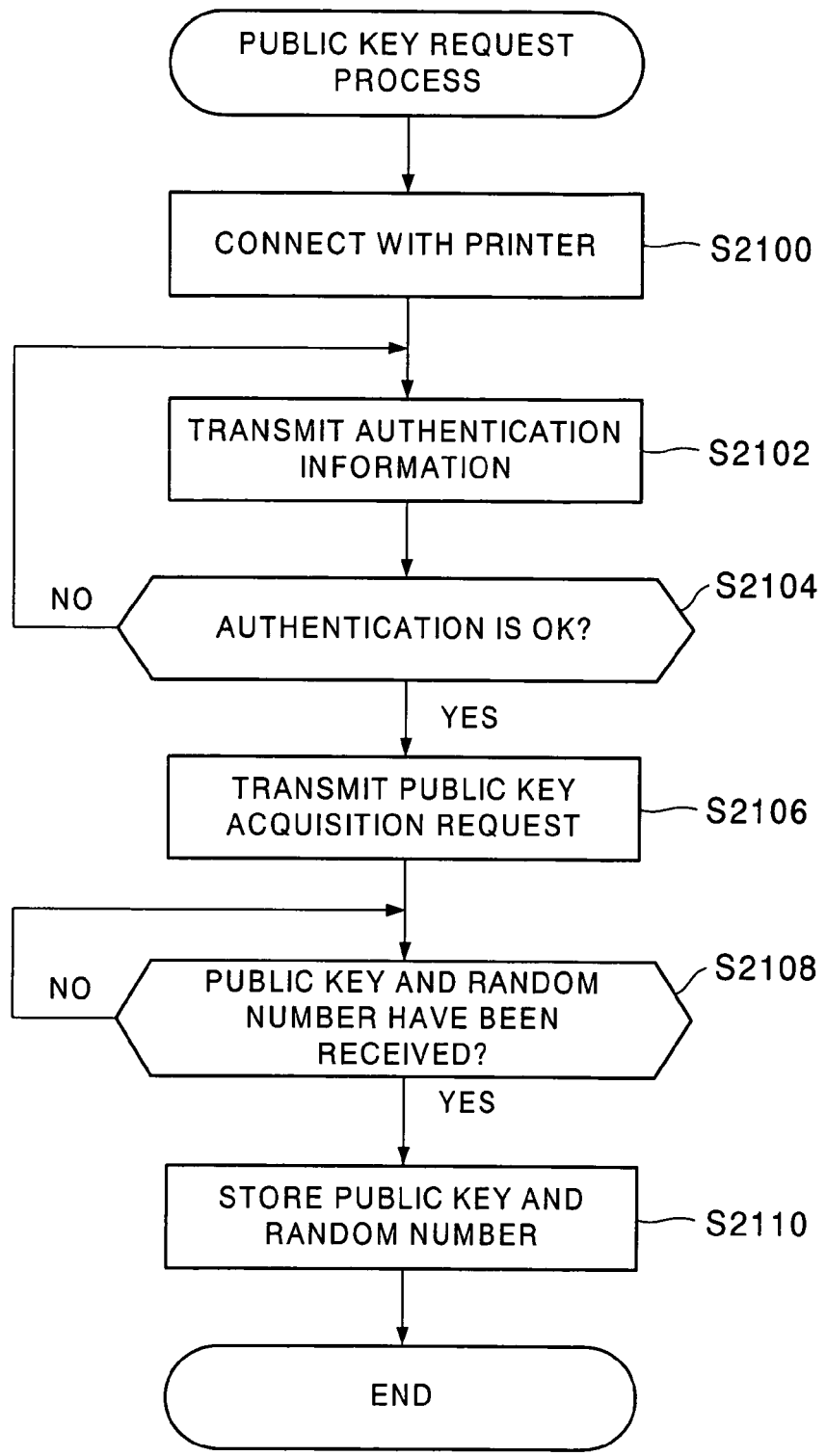
FIG. 30 is a flowchart explaining a public key request process executed by a print client according to the fifth embodiment of the present invention.

FIG. 30 is a flowchart explaining a public key request process executed in the print clients 20, 22. This public key request process is realized by making the CPU 64 read and execute a public key request program stored in the ROM 68 or the hard disk 76 of the print client. In this embodiment, this public key request process is started and executed when the user inputs an instruction to start a process for making a request for a public key to the print client.

Incidentally, hereinafter, assuming a case where the print client 20 makes a request for a public key to the printer 30, the process will be explained.

As shown in FIG. 30, in the public key request process, the print client 20 first connects with the printer 30 (step S2100). In this embodiment, the print client 20 establishes a connection between the print client 20 and the printer 30 by designating the network address of the printer 30. Moreover, in this embodiment, the connection between the print client 20 and the printer 30 is established after security is ensured by the SSL (Secure Socket Layer) communication or the like.

Thereafter, the print client 20 transmits authentication information to the printer 30 (step S2102). In this embodiment, a combination of a print client ID to specify the print client and a password is used as the authentication information. Accordingly, the print client 20 transmits the print client ID and the password to the printer 30.

Subsequently, the print client 20 receives an authentication result indicating whether authentication has been accepted from the printer 30, and judges whether the authentication has been accepted by the printer 30 based on the authentication result (step S2104). When the authentication has not been accepted (step S2104: No), the print client 20 repeats the aforementioned process from step S2102.

On the other hand, when the authentication has been accepted (step S2104: Yes), the print client 20 transmits a public key acquisition request to the printer 30 (step S2106). Then, the print client 20 judges whether a public key and a random number used when the public key is generated have been received from the printer 30 (step S2108). When the public key and the random number have not been received from the printer 30 (step S2108: No), the print client 20 stands by while repeating step S2108.

On the other hand, when the public key and the random number have been received from the printer 30 (step S2108: Yes), these public key and random number are stored (step S2110). In this embodiment, the print client 20 is provided with a public key table TB210 on the hard disk 76, and the acquired public key and random number are stored and held in this public key table TB210.

FIG. 31 is a diagram showing an example of the structure of the public key table TB210. As shown in FIG. 31, the public key table TB210 includes the item TD10 which stores information to specify printers, the item TD11 which stores acquired public keys in a one-to-one correspondence with the printers, and an item TD12 which stores acquired random numbers in a one-to-one correspondence with the printers. As just described, the public key table TB210 can hold public keys and random numbers concerning plural printers on a printer-by-printer basis. Moreover, by storing the public keys and the random numbers in the public key table TB210 on the hard disk 76 in this manner, even when the print client 20 is powered off and then powered on again, the public keys and random numbers acquired before the power-on can be read from the hard disk 76 and used as they are.

By storing the acquired public key and random number in the public key table TB210, the public key request process shown in FIG. 30 is completed.

Figure 32:
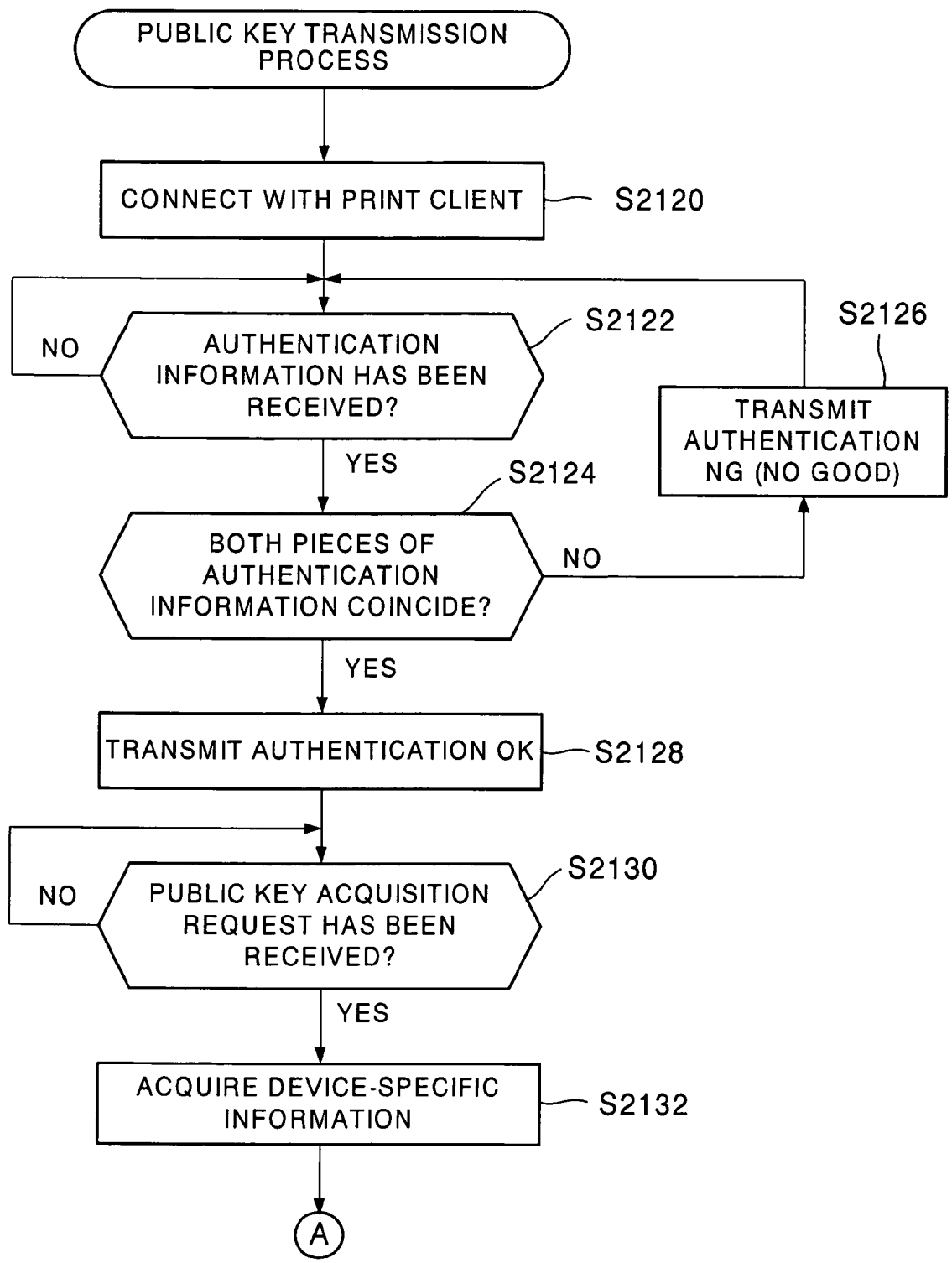
FIG. 32 is a part of a flowchart explaining a public key transmission process executed by a printer according to the fifth embodiment of the present invention (First part)
Figure 33:
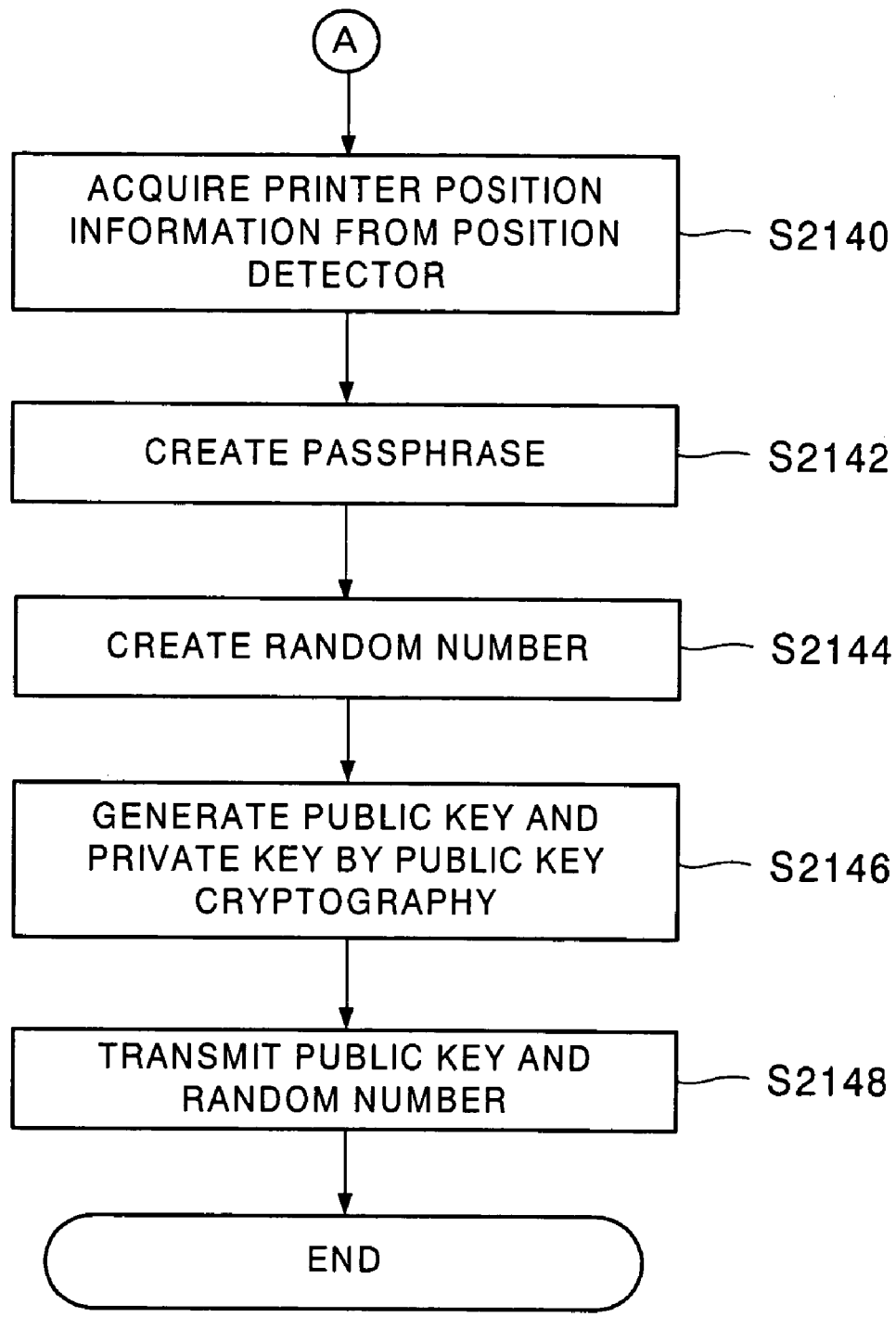
FIG. 33 is a part of the flowchart explaining the public key transmission process executed by the printer according to the fifth embodiment of the present invention (Second part)

Next, a public key transmission process executed in the printers 30, 32 corresponding to the public key request process in the print clients 20, 22 will be explained based on FIG. 32 and FIG. 33. FIG. 32 and FIG. 33 are flowcharts explaining the public key transmission process executed in the printers 30, 32. The public key transmission process is realized by making the CPU 40 read and execute a public key transmission program stored in the ROM 44 or the hard disk 58 of the printer. Moreover, this public key transmission process is started corresponding to the aforementioned public key request process.

Also here, similarly to the above, assuming the case where the print client 20 makes the request for the public key to the printer 30, the following explanation is given.

As shown in FIG. 32, first, the printer 30 establishes a connection with the print client 20 (step S2120). This corresponds to the aforementioned step S2100 on the print client 20 side. Namely, the connection is established after security is ensured by the SSL communication or the like. Subsequently, the printer 30 judges whether the authentication information has been received from the print client 20 (step S2122). When the authentication information has not been received (step S2122: No), the printer 30 stands by while repeating the process in step S2122.

On the other hand, when the authentication information has been received from the print client 20 (step S2122: Yes), the printer 30 judges whether this authentication information coincides with authentication information which is previously registered with the printer 30 (step S2124). More specifically, since the print client ID and the password are transmitted as the authentication information from the print client 20 as described above, the printer 30 judges whether these print client ID and password coincide with a print client ID and a password which are previously registered with the printer 30.

When these two pieces of authentication information do not coincide (step S2124: No), the printer 30 transmits the authentication result indicating that the authentication has not been accepted to the print client 20 (step S2126) and returns to the process in step S2122. On the other hand, when these two pieces of authentication information coincide (step S2124: Yes), the printer 30 transmits the authentication result indicating that the authentication has been accepted to the print client 20 (step S2128).

Thereafter, the printer 30 judges whether the public key acquisition request has been received from the print client 20 (step S2130). When the public key acquisition request has not been received (step S2130: No), the printer 30 stands by while repeating the process in step S2130.

On the other hand, when the public key acquisition request has been received from the print client 20 (step S2130: Yes), the printer 30 acquires device-specific information on the printer 30 (step S2132). Here, the device-specific information is identification information specifically assigned to the printer 30, and it is, for example, a manufacturer's serial number, a MAC address, or the like of the printer 30.

Then, as shown in FIG. 33, the printer 30 acquires printer position information on the printer 30 at this point in time from the position detector 54 (step S2140). The reason why the printer position information is acquired from the position detector 54 each time as just described is in order that, when the printer 30 has been moved to a different place, a public key is generated with position information after the movement.

Subsequently, the printer 30 creates a passphrase with the device-specific information and the printer position information (step S2142). There are various methods of creating the passphrase, and in this embodiment, the passphrase is created by simply joining the printer position information after the device-specific information. Incidentally, the passphrase may contain data other than these device-specific information and printer position information.

Thereafter, the printer 30 generates a random number (step S2144). Subsequently, the printer 30 generates a public key and a private key with the passphrase created in step S2142 and the random number generated in step S2144 by the public key cryptography (step S2146). The public key cryptography has the property that the same public key and private key are generated again if the same passphrase and random number are used. Then, the printer 30 transmits only the public key out of the generated public key and private key and the random number used when these public key and private key are generated to the print client 20 (step S2148). Incidentally, the private key is deleted without being saved. Thus, the public key transmission process according to this embodiment is completed.

Next, processes in the print clients 20, 22 and the printers 30, 32 when the print clients 20, 22 want to perform printing and transmit a print request to the printers 30, 32 will be explained in detail.

Figure 34:
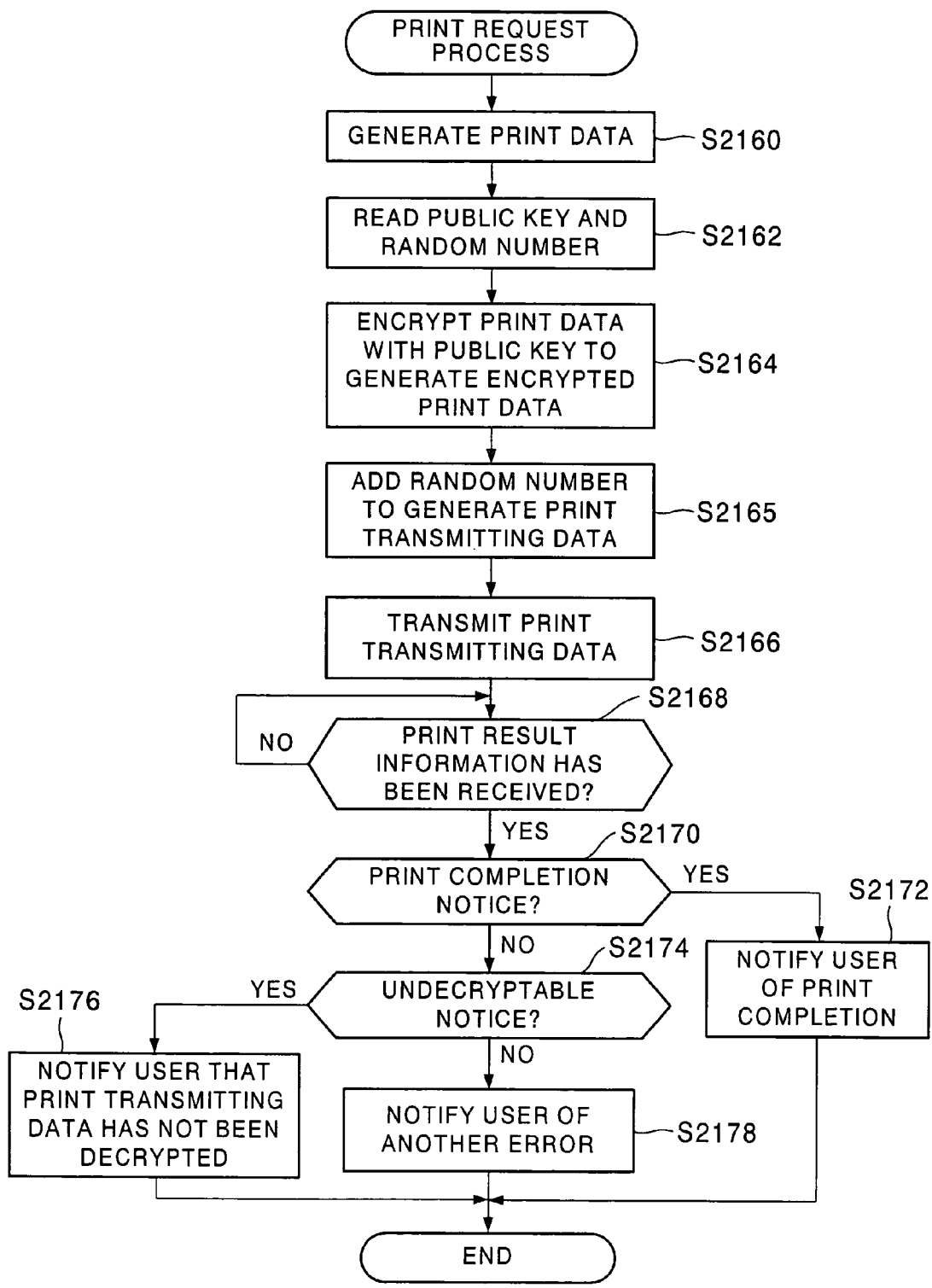
FIG. 34 is a flowchart explaining a print execution process executed by the print client according to the fifth embodiment of the present invention.

FIG. 34 is a flowchart explaining a print request process executed in the print clients 20, 22. This print request process is realized by making the CPU 64 read and execute a print request program stored in the ROM 68 or the hard disk 76 of the print client. In this embodiment, this print request process is started and executed when the user inputs a print instruction to the print client.

Here, assuming a case where the print client 20 makes a print request to the printer 30, the following explanation is given.

As shown in FIG. 34, the print client 20 generates the print data D05 based on a print request from the user (step S2160). This print data D05 is data necessary for an actual print operation when the printer 30 is an ordinary printer.

Then, the print client 20 reads the public key of the printer 30 and the random number used when this public key is generated from the public key table TB210 on the hard disk 76 (step S2162). Subsequently, the print client 20 encrypts the print data D05 with the public key of the printer 30 to generate encrypted print data (step S2164).

Thereafter, the print client 20 adds the random number read in step S2162 to the generated encrypted print data to generate the print transmitting data D10 (step S2165). Incidentally, the print transmitting data D10 may contain data other than these print data and random number.

Then, the print client 20 transmits the generated print transmitting data D10 to the printer 30 (step S2166). More specifically, the print client 20 designates the network address of the printer 30 and sends out the print transmitting data D10 to the network 10.

Subsequently, the print client 20 judges whether print result information has been received from the printer 30 (step S2168). When the print result information has not been received (step S2168: No), the print client 20 stands by while repeating the process in step S2168. On the other hand, when the print result information has been received (step S2168: Yes), the print client 20 judges whether the print result information is a print completion notice (step S2170).

When this print result information is the print completion notice (step S2170: Yes), it means that the printer 30 has properly completed the print operation, and hence the print client 20 notifies the user that the printer 30 has completed the print operation (step S2172). On the other hand, when the received print result information is not the print completion notice (step S2170: No), whether the print result information is an undecryptable notice is judged (step S2174).

When the print result information is the undecryptable notice (step S2174: Yes), the print client 20 notifies the user that since the print transmitting data D10 has not been decrypted by the printer 30, the print operation has not been executed (step S2176). On the other hand, when the print result information is not the undecryptable notice (step S2174: No), some other error is thought to occur, and hence the print client 20 gives notice according to the type of the error to the user (step S2178).

By the notice in step S2172, step S2176, or step S2178, the print request process in the print client 20 is completed.

Figure 35:
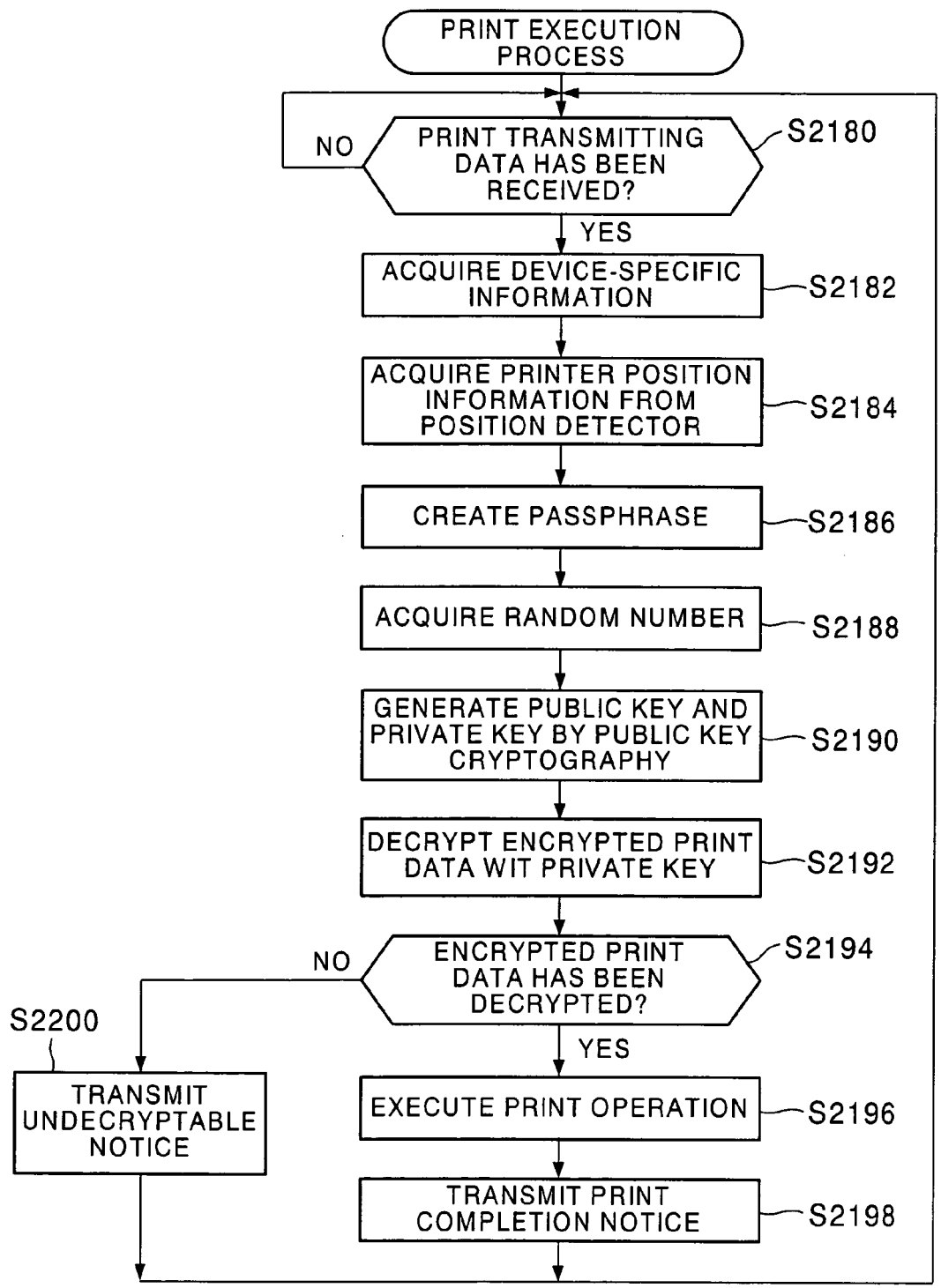
FIG. 35 is a flowchart explaining a print execution process executed by the printer according to the fifth embodiment of the present invention.

Next, a print execution process executed in the printers 30, 32 corresponding to the print request process in the print clients 20, 22 will be explained based on FIG. 35. FIG. 35 is a flowchart explaining the print execution process executed in the printers 30, 32. This print execution process is realized by making the CPU 40 read and execute a print execution program stored in the ROM 44 or the hard disk 58 of each of the printers 30, 32. In this embodiment, this print execution process is regularly executed at predetermined time intervals.

Also here, similarly to the above, assuming the case where the print client 20 makes the print request to the printer 30, the following explanation is given.

As shown in FIG. 35, the printer 30 judges whether the print transmitting data D10 has been received from the network 10 (step S2180). When no print transmitting data D10 has been received (step S2180: No), the printer 30 stands by while repeating the process in step S2180.

On the other hand, when the print transmitting data D10 has been received (step S2180: Yes), the printer 30 acquires its own device-specific information (step S2182). Subsequently, the printer 30 acquires printer position information on the printer 30 at this point in time from the position detector 54 (step S2184). The reason why the printer position information is acquired from the position detector 54 each time as just described is that, when the printer 30 has been moved to a different place, there is a possibility that the printer 30 is installed in a place where the user does not intend to perform printing, and in order that in such a case, the print operation is not executed by the printer 30.

Then, the printer 30 creates a passphrase based on the device-specific information and the printer position information (step S2186). The method of creating the passphrase needs to be the same method as in step 52142 in the aforementioned public key transmission process. This is because, if the passphrases are different, the encrypted print data encrypted with the public key transmitted to the print client cannot be decrypted with a private key.

Thereafter, the printer 30 acquires the random number contained in the print transmitting data D10 (step S2188). Then, the printer 30 generates a public key and a private key with the generated passphrase and the acquired random number by the public key cryptography (step S2190). The passphrase used in step S2190 is the same as that used in step S2146 in the aforementioned public key transmission process if the installation position of the printer 30 has not been moved. The random number used in step S2190 should be also the same as that used in step S2146. Hence, the same public key and private key as generated in step S2146 are generated. Subsequently, the printer 30 decrypts the encrypted print data contained in the print transmitting data D10 with the generated private key and acquires the print data D05 (step S2192).

Then, the printer 30 judges whether the encrypted print data has been decrypted with the private key (step S2194). When the encrypted print data has been decrypted (step S2194: Yes), the printer 30 executes a print operation by driving the print engine 52 based on the acquired print data D05 (step S2196). More specifically, the printer 30 performs a language interpretation of the print data D05 and generates print request data fitting the print engine 52. Then, by transmitting this print request data to the print engine 52, print sheets or the like are printed by the print engine 52.

As can be seen from the above, in this embodiment, the private key is generated with the passphrase containing at least the printer position information detected by the position detector 54 and the random number transmitted along with the encrypted print data, and when the encrypted print data has been decrypted with this private key, it is judged that the encrypted print data matches the printer position information.

At a point in time when the print operation has been properly completed, the printer 30 transmits the print completion notice that the print operation has been properly completed as the print result information to the print client 20 (step S2198). Then, the printer 30 returns to the aforementioned process in step S2180.

Contrary to this, when it is judged in step S2194 that the encrypted print data has not been decrypted (step S2194: No), the printer 30 transmits the undecryptable notice as the print result information to the print client 20 (step S2200). Namely, in this embodiment, when the private key is generated with the passphrase containing at least the printer position information detected by the position detector 54 and the random number transmitted along with the encrypted print data but the encrypted print data has not been decrypted with this private key, it is judged that the encrypted print data does not match the printer position information. Then, the printer 30 returns to the aforementioned process in step S2180.

As described above, according to the print system of this embodiment, the print clients 20, 22 can limit a printer able to print the encrypted print data, which is transmitted after encryption, based on printer position information, so that the execution of a print operation by a printer installed in a position where the users of the print clients 20, 22 do not intend to perform printing can be avoided. For example, even if the print transmitting data D10 containing the encrypted print data is transmitted by mistake to the printer 30 from the print client 20 when the printer 30 has been moved to a different place but the network address of the printer 30 in the network 10 remains unchanged, the printer position information is changed in the printer 30, whereby the passphrase created in step S2186 becomes different from that before the movement. Hence, the encrypted print data contained in the print transmitting data D10 cannot be decrypted with a private key generated with this passphrase, and thereby the print operation cannot be executed by the printer 30. Consequently, the security of the print data D05 can be enhanced.

On the other hand, also on the printers 30, 32 side, the transmission of print data to the printers 30, 32 by somebody who is not duly authorized to perform printing with the printers 30, 32 and the execution of a large print operation by the printers 30, 32 can be avoided. For example, even if a third party can know the network address of the printer 30 for some reason and tries to transmit the print data to the printer 30, the third party cannot acquire the public key of the printer 30. Even if this user encrypts the print data D05 with a different public key and generates the print transmitting data D10 containing the encrypted print data or generates the print transmitting data D10 containing the unencrypted print data and transmits the print transmitting data D10 to the printer 30, it is judged in step S2194 of the print execution process that the print data has not been decrypted, and hence it becomes impossible to make the printer 30 execute the print operation. Consequently, the security of the printer 30 itself can be enhanced.

Moreover, in this embodiment, the passphrase contains the device-specific information, and hence even if the third party can know the position of the printer 30 for some reason, the passphrase used in the printer 30 cannot be specified unless the device-specific information on the printer 30 is known. This makes it extremely difficult for the third party to disguise itself as the printer to receive the print transmitting data D10 and decrypt the encrypted print data contained in this print transmitting data D10.

Further, the random number is generated for each of the print clients 20, 22, and each of the print clients 20, 22 holds this random number together with the public key in a rewritable nonvolatile memory device such as a hard disk. The print clients 20, 22 each transmit this random number along with the encrypted print data obtained by encrypting the print data, whereby the printers 30, 32 can use the same random number as used when the public key is generated when generating the private key. Therefore, the private key capable of decrypting the encrypted print data which is encrypted with the public key generated using this random number can be generated again.

Sixth Embodiment

In the sixth embodiment of the present invention, the print clients 20, 22 each hold a public key and a random number used when this public key is generated for each of printers and each of users. This makes it more difficult for a third party to guess the random number. Further details will be given below.

It should be mentioned that the configuration of a print system according to this embodiment is the same as that in FIG. 1 in the aforementioned first embodiment, the configurations of the printers 30, 32 are the same as that in FIG. 2 described above, and the configurations of the print clients 20, 22 are the same as that in FIG. 3 described above. Moreover, a public key transmission process and a print execution process executed in the printers 30, 32 according to this embodiment are the same as those in the aforementioned fifth embodiment.

Figure 36:
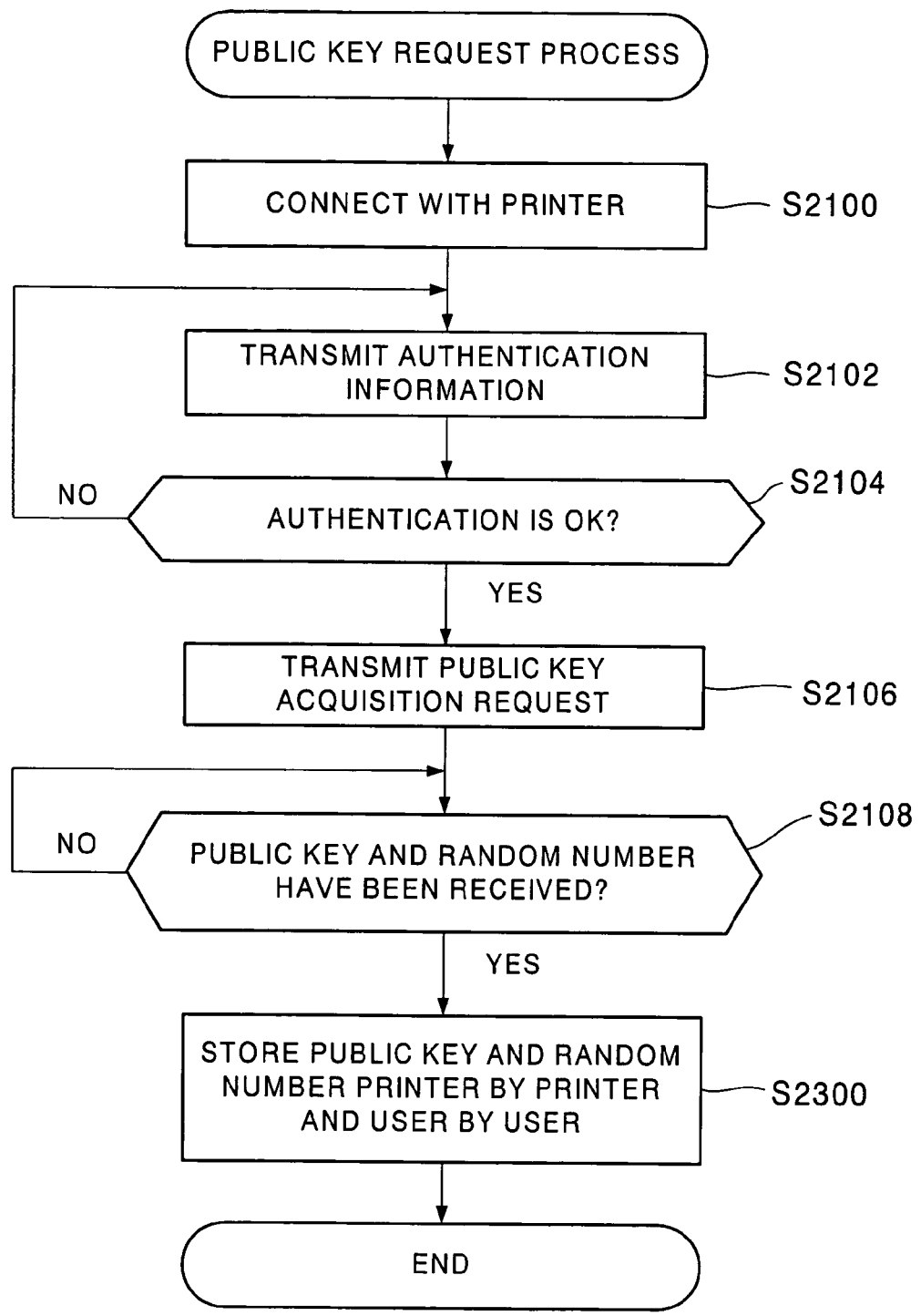
FIG. 36 is a flowchart explaining a public key request process executed by a print client according to a sixth embodiment of the present invention.

FIG. 36 is a flowchart explaining a part of a public key request process executed in the print clients 20, 22 according to this embodiment and corresponds to FIG. 30 in the aforementioned fifth embodiment.

As shown in FIG. 36, the public key request process according to this embodiment is the same as that according to the aforementioned fifth embodiment until the process of receiving the public key and the random number shown in step S2108, but different therefrom in the process in the next step S2300. Namely, when the public key and the random number have been received (step S2108: Yes), the print client 20 according to this embodiment stores these public key and random number in a public key table TB220 on a printer-by-printer basis and on a user-by-user basis.

Figure 37:
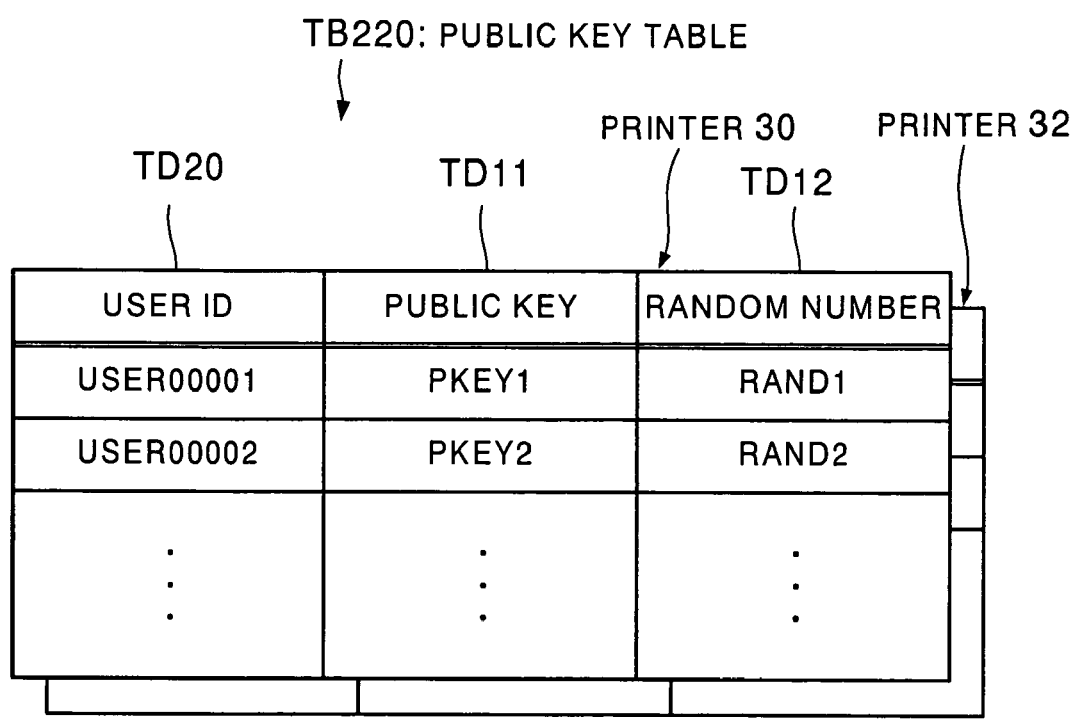
FIG. 37 is a diagram showing an example of the structure of a public key table included in the print client according to the sixth embodiment of the present invention.

FIG. 37 is a diagram showing an example of the structure of the public key table TB220 according to this embodiment. As shown in FIG. 37, the public key table TB220 in this embodiment includes an item TD20 which stores user IDs as an data item in addition to the public key table TB210 in the aforementioned fifth embodiment. Namely, in this embodiment, the print client 20 stores a public key and a random number for each user ID. Moreover, in the public key table TB220 in this embodiment, a table is formed for each of the printers. Therefore, even in the case of the same user ID, different public keys and random numbers can be held if printers are different.

By storing these public key and random number in the public key table TB220, the public key request process according to this embodiment is completed.

Figure 38:
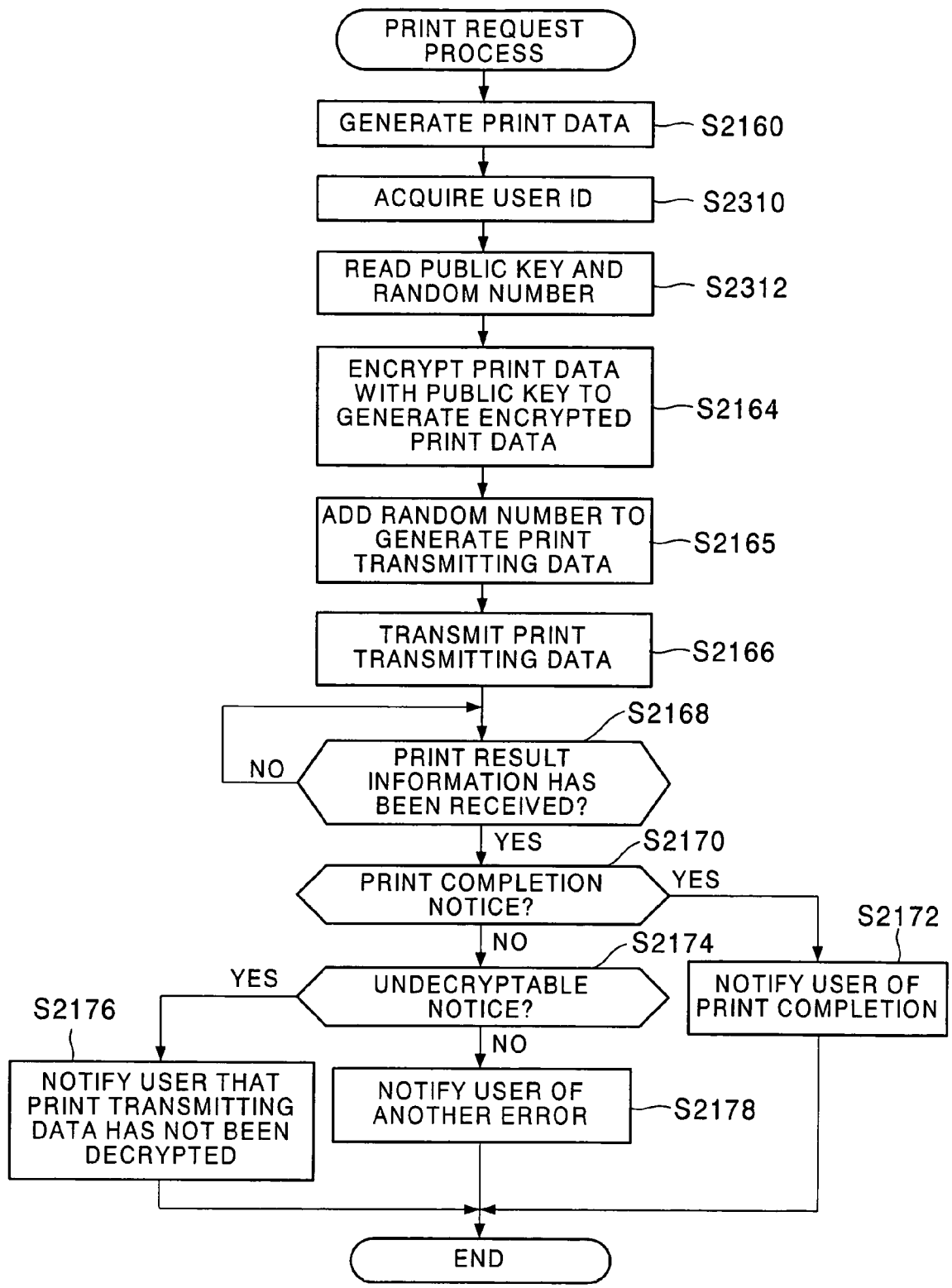
FIG. 38 is a flowchart explaining a print request process executed by the print client according to the sixth embodiment of the present invention.

Next, a print request process executed in the print clients 20, 22 according to this embodiment will be explained based on FIG. 38. FIG. 38 is a flowchart explaining the print request process executed in the print clients 20, 22 according to this embodiment.

As shown in FIG. 38, the print request process according to this embodiment is different from that according to the aforementioned fifth embodiment in the process of reading a public key and a random number. Namely, after generating the print data D05 in step S2160, the print client 20 acquires an user ID (step S2310). In other words, the print client 20 acquires a user ID of a user who gives the printer 30 a print instruction. The user may be requested to input this user ID when inputting the print instruction to the print client 20 or the user may be requested to input this user ID as authentication when using the print client 20.

Then, the print client 20 reads a public key and a random number stored with respect to this user ID in a table of a printer to which a print request is made from the public key table TB220 in FIG. 37 (step S2312). More specifically, in the public key table TB220 in this embodiment, tables are formed for respective printers, whereby the public key and the random number registered with respect to this user ID are read from the table of the printer which prints the print data D05 generated in step S2160. The process thereafter is the same as in the aforementioned fifth embodiment.

As described above, the same effect as in the aforementioned fifth embodiment can be obtained also by the print system according to this embodiment. Moreover, according to the print system of this embodiment, the print clients 20, 22 each hold a public key and a random number for each of printers and each of users, which can make it extremely difficult for the third party to guess the random number.

Seventh Embodiment

In a print system according to the seventh embodiment of the present invention, a random number is generated for each print job, a public key is generated with the generated random number and a passphrase containing at least printer position information indicating a position where a printer is installed, and these public key and random number are transmitted from the printer to a print client. The print client encrypts print job data with this public key to generate encrypted print job data, and adds the random number transmitted from the printer to the encrypted print job data to generate print transmitting data. The print client then transmits this print transmitting data to the printer. The printer which has received this print transmitting data generates a private key again with a passphrase containing at least printer position information at this point in time and the random number contained in the print transmitting data at the time of reception, and executes a print operation only when the encrypted print job data has been decrypted with this private key. Further details will be given below.

It should be mentioned that the configuration of the print system according to this embodiment is the same as that in FIG. 1 in the aforementioned first embodiment, the configurations of the printers 30, 32 are the same as that in FIG. 2 described above, and the configurations of the print clients 20, 22 are the same as that in FIG. 3 described above.

Next, a brief explanation of a process, for example, when the print client 20 performs printing with the printer 30 in the print system according to this embodiment will be given.

In this case, the print client 20 first acquires a public key and a random number used when this public key is generated from the printer 30. In this embodiment, a public key and a random number are acquired for each print job via the network 10. Namely, the printer 30 confirms whether the print client 20 which requests the transmission of a public key has rightful authority, and only when the print client has rightful authority, the printer 30 transmits a newly generated public key and a random number used when this public key is generated to the print client 20. The printer 30 generates the public key with a passphrase at least containing printer position information indicating a position where the printer 30 is installed and a random number generated for each print job by the printer 30 by the public key cryptography. The printer 30 deletes the random number used when the public key is generated since the random number need not be held.

Moreover, at this time, a generated private key is also deleted. Namely, in the general public key cryptography, a public key and a private key are generated at the same time. Therefore, in this embodiment, even if a private key is generated concomitantly with the generation of a public key, the private key is deleted. Consequently, the possibility of a leak of the private key generated by the printer 30 can be reduced to a minimum.

Then, as shown in FIG. 29, the user of the print client 20 generates data to be printed, designates the printer 30 for the print client 20, and instructs a print operation. The print client 20 generates the print job data D05 based on the data to be printed. Here, the print job data D05 means original print data needed for a print operation executed by driving the print engine 52 in the printer 30.

The print client 20 encrypts the print job data D05 with the previously acquired public key of the printer 30 to generate encrypted print job data. Then, the print client 20 adds the random number also acquired from the printer 30 to the encrypted print job data to generate the print transmitting data D10. Incidentally, the print transmitting data D10 may contain data other than the encrypted print data and the random number shown in FIG. 29.

The printer 30 which has received the print transmitting data D10 temporarily stores the received print transmitting data D10 in the RAM 42 as shown in FIG. 2. The printer 30 then decrypts the encrypted print job data contained in the print transmitting data D10 with a private key. Namely, the printer 30 generates the private key using a passphrase containing at least printer position information and the random number contained in the print transmitting data D10 by the public key cryptography. Then, the printer 30 decrypts the encrypted print job data contained in the print transmitting data D10 with this private key.

Subsequently, the printer 30 judges whether the encrypted print job data has been decrypted. The printer 30 executes a print operation based on the print job data D05 acquired by decrypting the encrypted print job data when the encrypted print job data has been decrypted, and does not execute the print operation when the encrypted print job data has not been decrypted.

Next, the contents of the aforementioned process will be explained in detail using flowcharts. First, a print request process which is a process when the print clients 20, 22 each make a print request to the printers 30, 32 will be explained.

Figure 39:
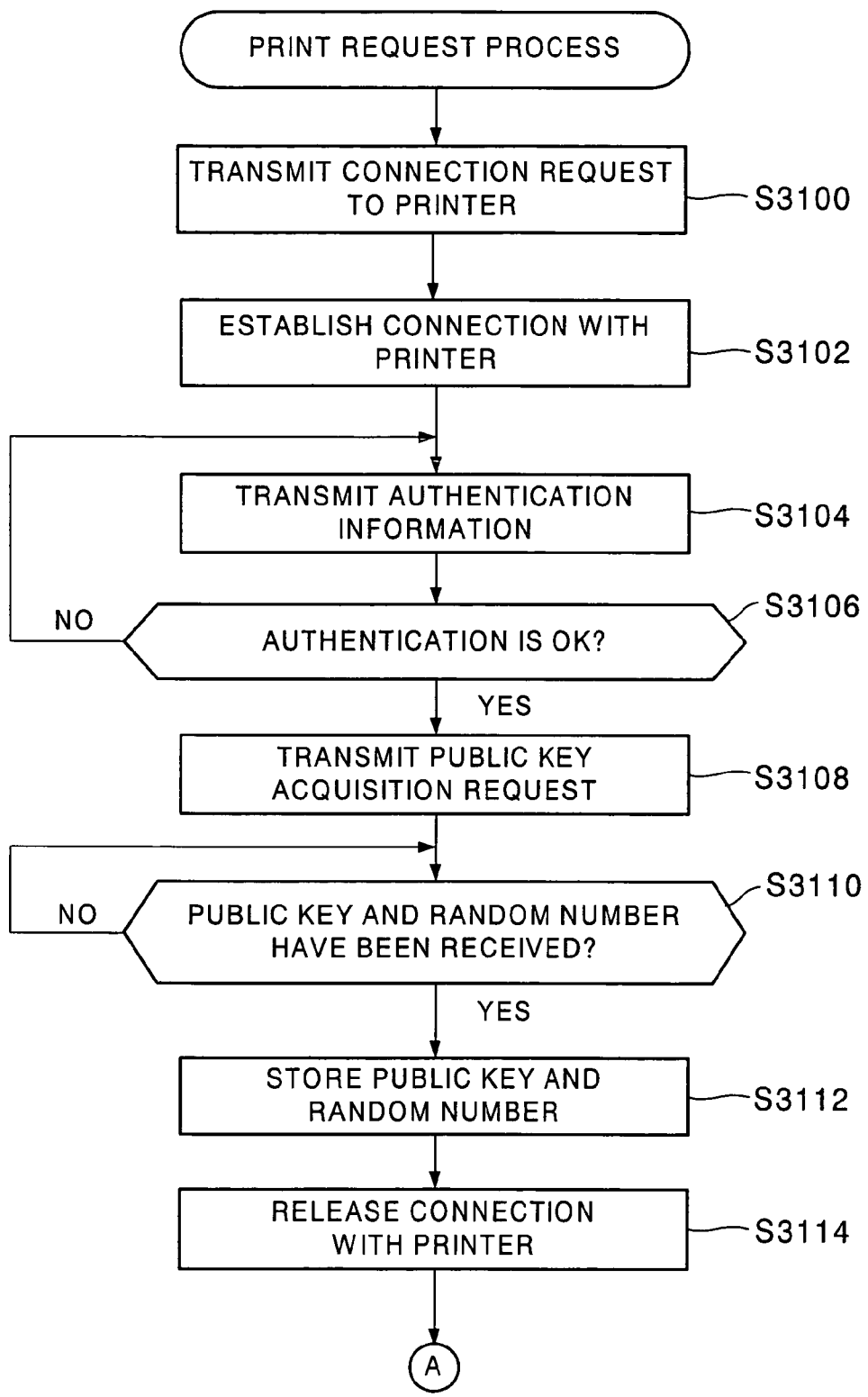
FIG. 39 is a part of a flowchart explaining a print request process executed by a print client according to a seventh embodiment (First part)
Figure 40:
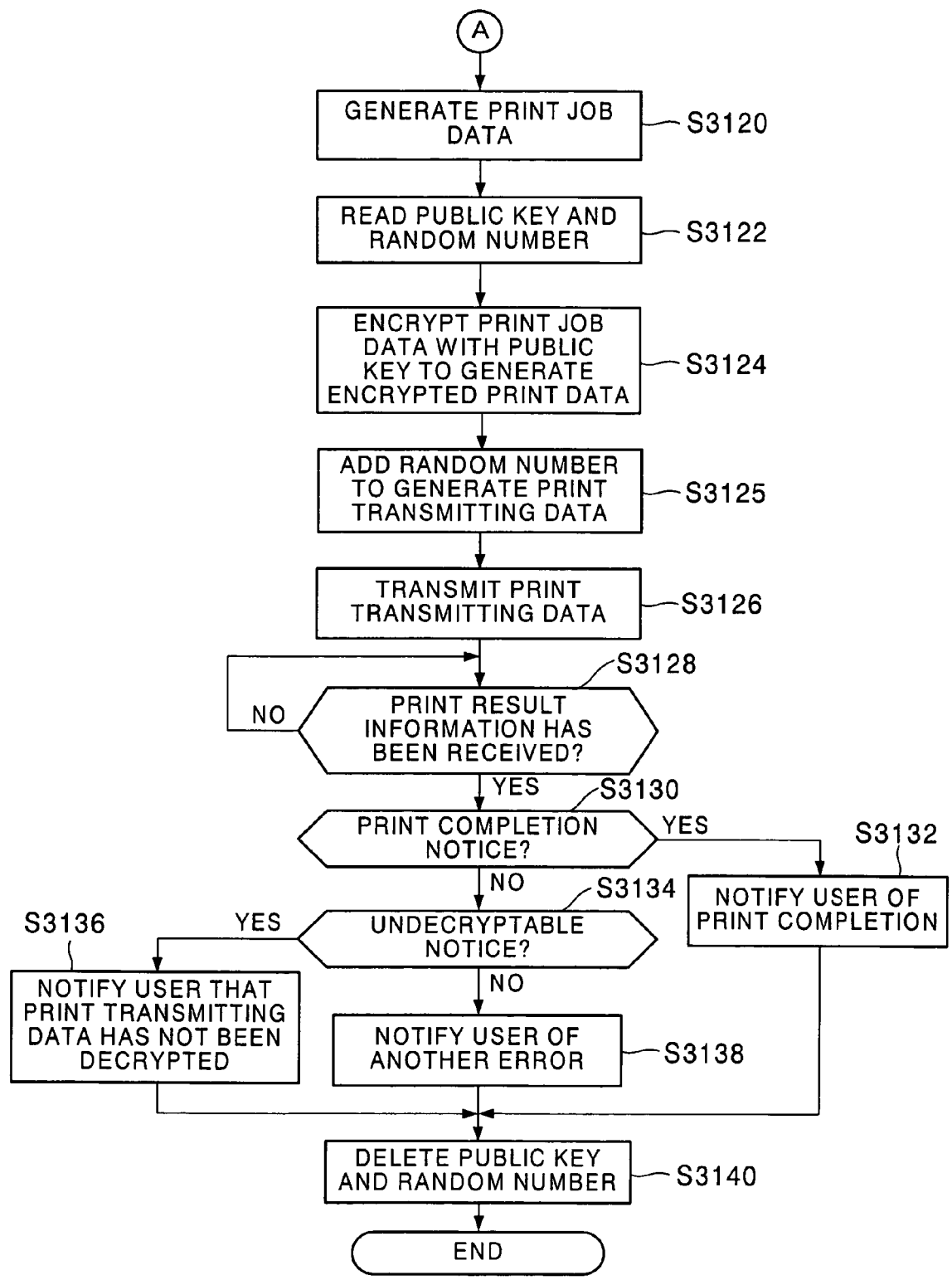
FIG. 40 is a part of the flowchart explaining the print request process executed by the print client according to the seventh embodiment (Second part)

FIG. 39 and FIG. 40 are flowcharts explaining the print request process executed in the print clients 20, 22. This print request process is realized by making the CPU 64 read and execute a print request program stored in the ROM 68 or the hard disk 76 of the print client. In this embodiment, this print request process is started and executed when the user inputs an instruction to execute a print operation to the print clients 20, 22.

Incidentally, hereinafter, assuming a case where the print client 20 makes a print request to the printer 30, the process will be explained.

As shown in FIG. 39, in this print request process, the print client 20 first transmits a connection request to the printer 30 via the network (step S3100). Then, a connection between the print client 20 and the printer 30 is established (step S3102). In this embodiment, the connection between the print client 20 and the printer 30 is established after security is ensured by the SSL (Secure Socket Layer) communication or the like.

Thereafter, the print client 20 transmits authentication information to the printer 30 (step S3104). In this embodiment, a combination of a print client ID to specify the print client and a password is used as the authentication information. Accordingly, the print client 20 transmits the print client ID and the password to the printer 30.

Subsequently, the print client 20 receives an authentication result indicating whether authentication has been accepted from the printer 30, and judges whether the authentication has been accepted by the printer 30 based on the authentication result (step S3106). When the authentication has not been accepted (step S3106: No), the print client 20 repeats the aforementioned process from step S3104.

On the other hand, when the authentication has been accepted (step S3106: Yes), the print client 20 transmits a public key acquisition request to the printer 30 (step S3108). Then, the print client 20 judges whether a public key and a random number used when this public key is generated have been received from the printer 30 (step S3110). When the public key and the random number have not been received from the printer 30 (step S3110: No), the print client 20 stands by while repeating step S3110.

On the other hand, when the public key and the random number have been received from the printer 30 (step S3110: Yes), these public key and random number are stored (step S3112). In this embodiment, the print client 20 temporarily stores and holds these public key and random number in the RAM 66 (See FIG. 3). By storing the public key and the random number in the RAM 66 as just described, the public key and the random number are automatically erased when the print client 20 is powered off, which can increase the secrecy of the public key and the random number.

Then, the print client 20 releases the connection with the printer (step S3114). Namely, the connection established between the print client 20 and the printer 30 while the security is ensured by the SSL communication or the like is released. The release of the connection is not always a necessary process, but the connection is released in this embodiment, since the print job data D05 to be transmitted in step S3126 described later is separately encrypted with the public key, and hence the need for ensure the security of the connection itself is small in the process thereafter.

Thereafter, as shown in FIG. 40, the print client 20 generates the print job data D05 based on a print request from the user (step S3120). This print job data D05 is an unencrypted data which becomes necessary for the execution of a print operation by the printer 30.

Then, the print client 20 reads the public key and the random number stored in step S3112 from the RAM 66 (step S3122). Subsequently, the print client 20 encrypts the print job data D05 with this public key to generate encrypted print job data (step S3124).

Thereafter, the print client 20 adds the random number read in step S3122 to the encrypted print job data generated in step S3124 to generate the print transmitting data D10 (step S3125). Incidentally, the print transmitting data D10 may contain data other than these encrypted print job data and random number.

Then, the print client 20 transmits the print transmitting data D10 to the printer 30 (step S3126). More specifically, the print client 20 designates the network address of the printer 30 and sends out the print transmitting data D10 to the network 10.

Subsequently, the print client 20 judges whether print result information has been received from the printer 30 (step S3128). When the print result information has not been received (step S3128: No), the print client 20 stands by while repeating the process in step S3128. On the other hand, when the print result information has been received (step S3128: Yes), the print client 20 judges whether the print result information is a print completion notice (step S3130).

When this print result information is the print completion notice (step S3130: Yes), it means that the printer 30 has properly completed the print operation, and hence the print client 20 notifies the user that the printer 30 has completed the print operation (step S3132). On the other hand, when the received print result information is not the print completion notice (step S3130: No), whether the print result information is an undecryptable notice is judged (step S3134).

When the print result information is the undecryptable notice (step S3134: Yes), the print client 20 notifies the user that since the print transmitting data D10 has not been decrypted by the printer 30, the print operation has not been executed (step S3136). On the other hand, when the print result information is not the undecryptable notice (step S3134: No), some other error is thought to occur, and hence the print client 20 gives notice according to the type of the error to the user (step S3138).

After the notice in step S3132, step S3136, or step S3138, the print client 20 deletes the public key and the random number stored in the RAM 66 in step S3112 (step S3140). This process in step S3140 is not always a necessary process, but in this embodiment, to improve the secrecy of the public key and the random number, the acquired public key and random number are deleted every time the process of one print job is completed. Thus, the print request process in the print client 20 is completed.

Figure 41:
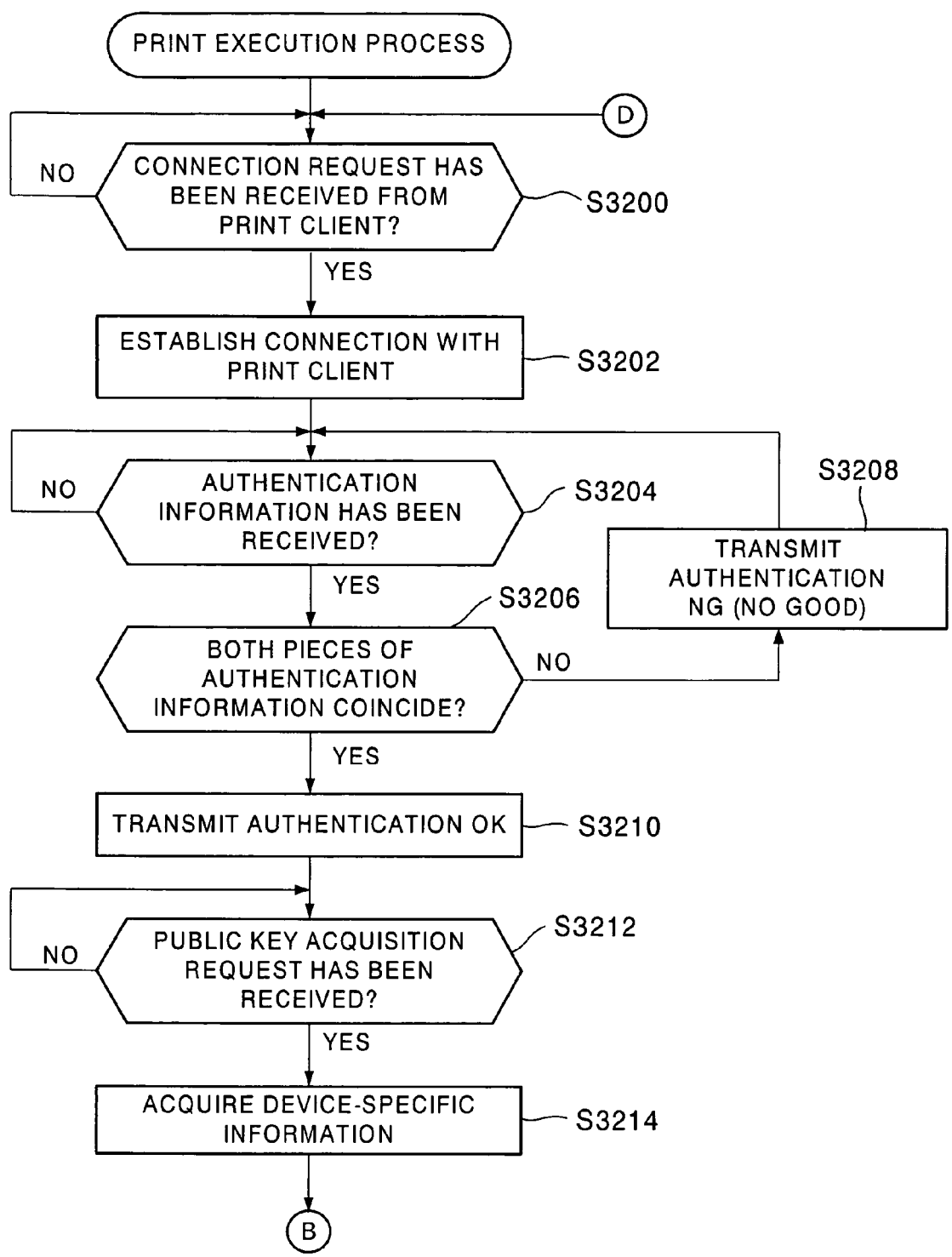
FIG. 41 is a part of a flowchart explaining a print execution process executed by a printer according to the seventh embodiment (First part)
Figure 42:
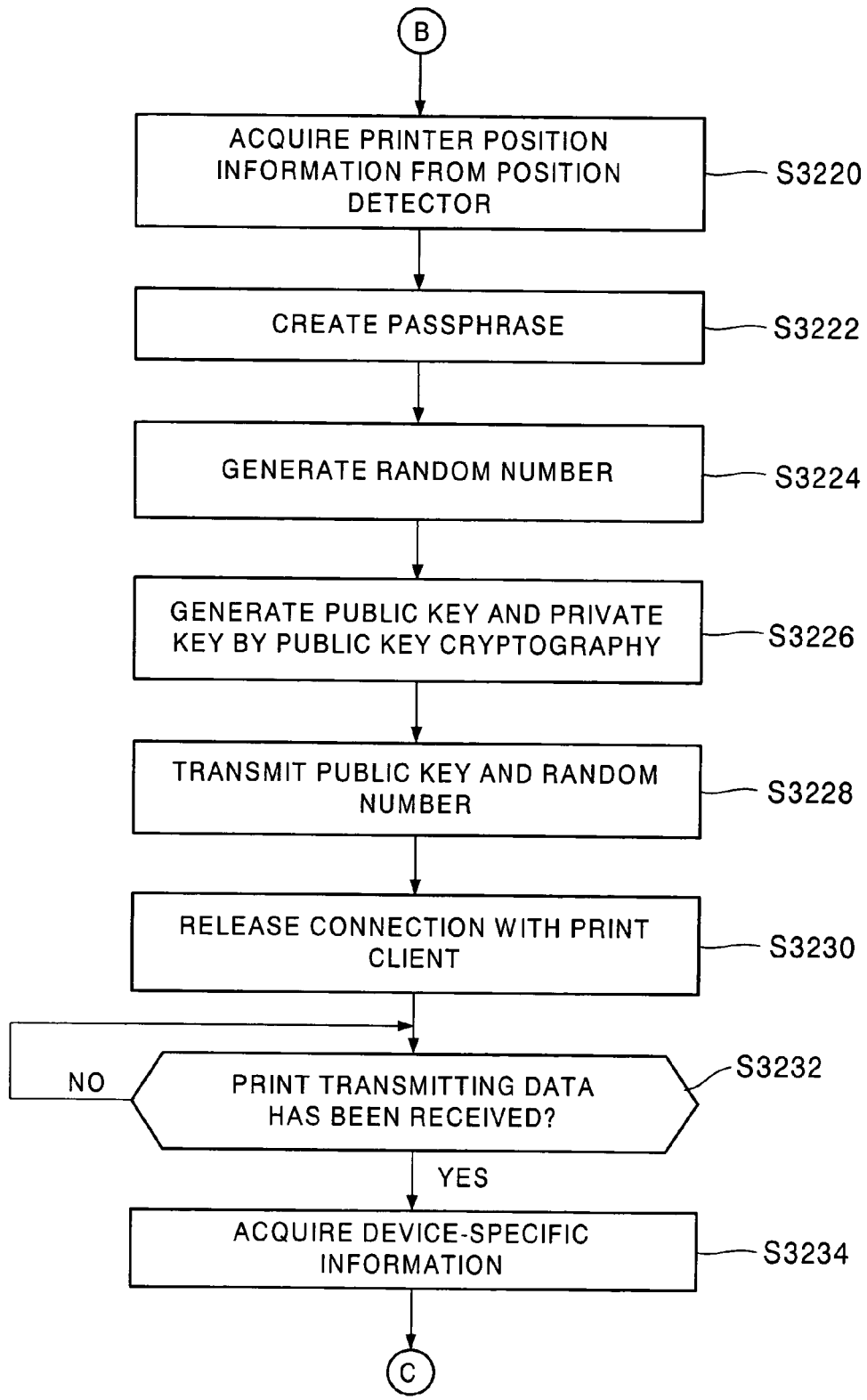
FIG. 42 is a part of the flowchart explaining the print execution process executed by the printer according to the seventh embodiment (Second part)
Figure 43:
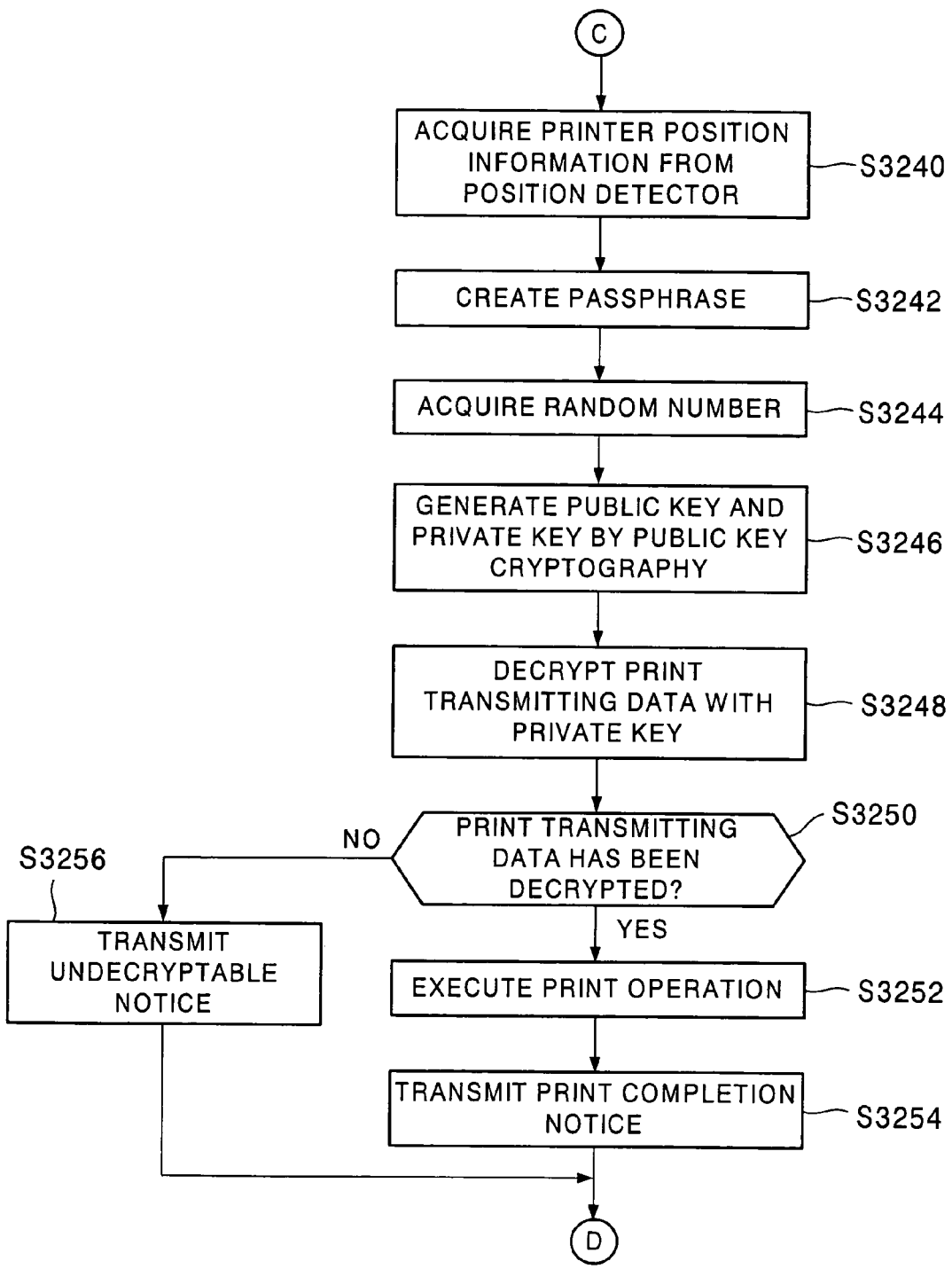
FIG. 43 is a part of the flowchart explaining the print execution process executed by the printer according to the seventh embodiment (Third part)

Next, a print execution process executed in the printers 30, 32 corresponding to the print request process in the print clients 20, 22 will be explained based on FIG. 41 to FIG. 43. FIG. 41 to FIG. 43 are flowcharts explaining the print execution process executed in the printers 30, 32. This print execution process is realized by making the CPU 40 read and execute a print execution program stored in the ROM 44 or the hard disk 58 of the printer. This print execution process is regularly executed at predetermined time intervals.

Also here, similarly to the above, assuming the case where the print client 20 makes the print request to the printer 30, the following explanation is given.

As shown in FIG. 41, the printer 30 first judges whether the connection request has been received from the print client 20 via the network 10 (step S3200). When the connection request has not been received from the print client 20 (step S3200: No), the printer 30 stands by while repeating the process in step S3200. Then, as described above, after security has been ensured by the SSL communication or the like, a connection between the printer 30 and the print client 20 is established (step S3202).

Then, the printer 30 judges whether the authentication information has been received from the print client 20 (step S3204). When the authentication information has not been received (step S3204: No), the printer 30 stands by while repeating the process in step S3204.

On the other hand, when the authentication information has been received from the print client 20 (step S3204: Yes), the printer 30 judges whether this authentication information coincides with authentication information which is previously registered with the printer 30 (step S3206). More specifically, since the print client ID and the password are transmitted as the authentication information from the print client 20 as described above, the printer 30 judges whether these print client ID and password coincide with a print client ID and a password which are previously registered on the hard disk 58 or the like of the printer 30.

When these two pieces of authentication information do not coincide (step S3206: No), the printer 30 transmits the authentication result indicating that the authentication has not been accepted to the print client 20 (step S3208) and returns to the process in step S3204. On the other hand, when these two pieces of authentication information coincide (step S3206: Yes), the printer 30 transmits the authentication result indicating that the authentication has been accepted to the print client 20 (step S3210).

Thereafter, the printer 30 judges whether the public key acquisition request has been received from the print client 20 (step S3212). When the public key acquisition request has not been received (step S3212: No), the printer 30 stands by while repeating the process in step S3212.

On the other hand, when the public key acquisition request has been received from the print client 20 (step S3212: Yes), the printer 30 acquires device-specific information on the printer 30 (step S3214). Here, the device-specific information is identification information specifically assigned to the printer 30, and it is, for example, a manufacturer's serial number, a MAC address, or the like of the printer 30.

Then, as shown in FIG. 42, the printer 30 acquires printer position information on the printer 30 at this point in time from the position detector 54 (step S3220). The reason why the printer position information is acquired from the position detector 54 each time as just described is in order that, when the printer 30 has been moved to a different place, a public key is generated with position information after the movement.

Subsequently, the printer 30 creates a passphrase with the device-specific information and the printer position information (step S3222). There are various methods of creating the passphrase, and in this embodiment, the passphrase is created by simply joining the printer position information after the device-specific information. Incidentally, the passphrase may contain data other than these device-specific information and printer position information.

Then, the printer 30 generates one random number (step S3224). Thereafter, the printer 30 generates a public key and a private key with the passphrase created in step S3222 and the random number generated in step S3224 by the public key cryptography (step S3226). The public key cryptography has the property that the same public key and private key are generated again if the same passphrase and random number are used. Then, the printer 30 transmits the public key and the random number used when this public key is generated to the print client 20 (step S3228). Incidentally, the private key and the random number are deleted without being saved after the public key and the random number are transmitted to the print client 20.

Subsequently, the printer 30 releases the connection with the print client 20 (step S3230). This process is a process corresponding to step S3114 in the aforementioned print request process. Moreover, the process in step S3230 is not always a necessary process as described above.

Then, the printer 30 judges whether the print transmitting data D10 has been received from the network 10 (step S3232). When no print transmitting data D10 has been received (step S3232: No), the printer 30 stands by while repeating the process in step S3232. On the other hand, when the print transmitting data D10 has been received (step S3232: Yes), the printer 30 acquires its own device-specific information (step S3234).

Subsequently, as shown in FIG. 43, the printer 30 acquires printer position information on the printer 30 at this point in time from the position detector 54 (step S3240). The reason why the printer position information is acquired from the position detector 54 each time as just described is in order that, when the printer 30 has been moved to a different place, a private key is generated with position information after the movement.

Then, the printer 30 creates a passphrase based on the device-specific information and the printer position information (step S3242). The method of creating the passphrase needs to be the same method as in step S3222 described above. This is because, if the passphrases are different, the print transmitting data D10 encrypted with the public key transmitted to the print client cannot be decrypted with a private key.

Thereafter, the printer 30 acquires the random number contained in the received print transmitting data D10 (step S3244). Then, the printer 30 generates a public key and a private key with the generated passphrase and the acquired random number by the public key cryptography (step S3246). The passphrase used in step S3246 is the same as that used in step S3226 described above if the installation position of the printer 30 has not been moved between these two steps. The random number also ought to be the same as that in step S3226 described above if the print transmitting data D10 is transmitted by the duly authorized print client 20. Hence, the same public key and private key as generated in step S3226 are generated in step S3246. Subsequently, the printer 30 decrypts the encrypted print job data contained in the received print transmitting data D10 with the generated private key (step S3248).

Then, the printer 30 judges whether the encrypted print job data has been decrypted with the private key (step S3250). When the encrypted print job data has been decrypted (step S3250: Yes), the printer 30 executes a print operation by driving the print engine 52 based on the print job data D05 obtained by decrypting the encrypted print job data (step S3252). More specifically, the printer 30 performs a language interpretation of the print job data D05 and generates print request data fitting the print engine 52. Then, by transmitting this print request data to the print engine 52, print sheets or the like are printed by the print engine 52.

As can be seen from the above, in this embodiment, the private key is generated with the passphrase containing at least the printer position information detected by the position detector 54 and the random number contained in the print transmitting data D10, and when the encrypted print job data has been decrypted with this private key, it is judged that the encrypted print job data matches the printer position information.

At a point in time when the print operation has been properly completed, the printer 30 transmits the print completion notice that the print operation has been properly completed as the print result information to the print client 20 (step S3254).

Contrary to this, when it is judged in step S3250 that the encrypted print job data has not been decrypted (step S3250: No), the printer 30 transmits the undecryptable notice as the print result information to the print client 20 (step S3256). Namely, in this embodiment, when the private key is generated with the passphrase containing at least the printer position information detected by the position detector 54 and the random number contained in the print transmitting data D10 but the encrypted print job data has not been decrypted with this private key, it is judged that that the encrypted print job data does not match the printer position information.

After the process in step S3254 or step S3256, the printer 30 returns to the aforementioned process in step S3200 in FIG. 41.

As described above, according to the print system of this embodiment, the printers 30, 32 each generate a public key and a private key with a different random number for each print job by the public key cryptography and transmit the public key and the random number to the print clients 20, 22, which can enhance the security of the public key, the private key, and the random number.

Moreover, the public key and the random number used when this public key is generated are transmitted to the print client 20, and on the printer 30 side, the private key and the random number are deleted, which can ensure the security of the private key. Further, the print clients 20, 22 temporarily hold the random number and return this random number together with encrypted print job data to the printers 30, 32. Hence, when the encrypted print job data encrypted with the public key is decrypted by the printers 30, 32, the same private key can be generated again with the random number transmitted together with the encrypted print job data by the public key cryptography, and the encrypted print job data can be decrypted.

Furthermore, on the printers 30, 32 side, when the encrypted print job data cannot be decrypted with this private key, a print operation of the received encrypted print job data is not executed, which can avoid the execution of the print operation with the printers 30, 32 by a third party with dishonest intention.

It should be mentioned that the present invention is not limited to the aforementioned embodiments, and various changes may be made therein. For example, in the aforementioned embodiments, the case where "a given number" used when a public key and a private key are generated is a random number is explained as an example, but the given number is not limited to the random number. For example, natural numbers in ascending order may be used as given numbers in such a manner that the given number is "1" in the first generation of a public key and a private key in the printer, the given number is "2" in the second generation of a public key and a private key, and that the given number is "3" in the third generation of a public key and a private key.

Alternatively, even numbers in ascending order or odd numbers in ascending order may be used as the given numbers. In other words, the given number may be generated using a predetermined algorithm.

Figure 44:
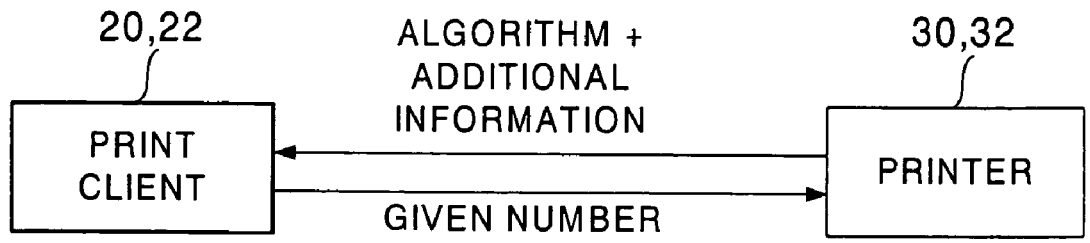
FIG. 44 is a diagram explaining an example in which in place of a random number, an algorithm and additional information are transmitted from the printer to the print client (a case where a given number is transmitted from the print client to the printer)
Figure 45:
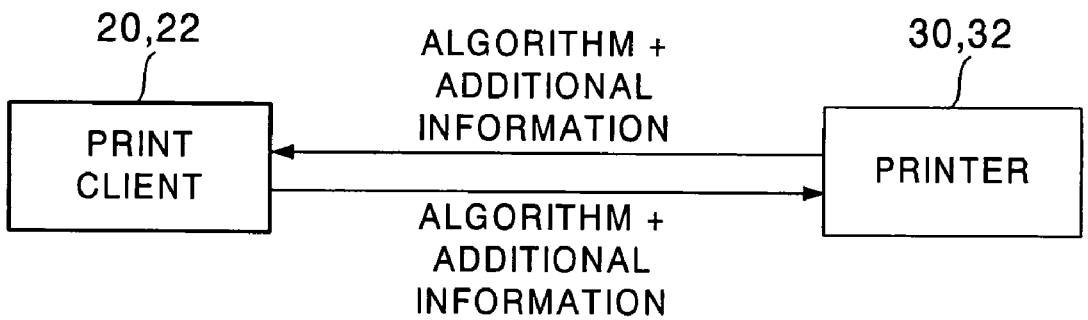
FIG. 45 is a diagram showing a modification of FIG. 44 (a case where an algorithm and additional information are transmitted from the print client to the printer)
Figure 46:
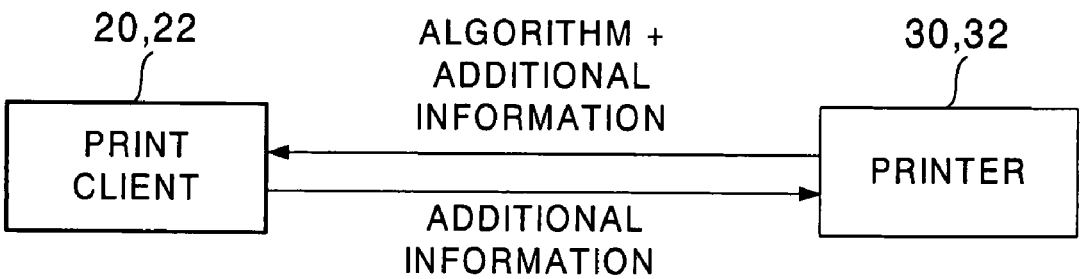
FIG. 46 is a diagram showing another modification of FIG. 44 (a case where additional information is transmitted from the print client to the printer without an algorithm being transmitted).

Moreover, as shown in FIG. 44 to FIG. 46, instead of a given number, an algorithm used when the given number is derived (for example, an even number in ascending order) and additional information necessary for deriving the given number using the algorithm (for example, a first time) may be transmitted from the printers 30, 32 to the print clients 20, 22.

In this case, as shown in FIG. 44, when making a print request, the print clients 20, 22 may transmit the given number itself to the printers 30, 32. In this case, the print clients 20, 22 may hold information which specifies the algorithm and the necessary information received from the printers 30, 32 or may generate the given number and hold the given number.

Further, as shown in FIG. 45, when making the print request, the print clients 20, 22 may transmit the algorithm and the additional information to the printers 30, 32. In this case, the print clients 20, 22 hold the information which specifies the algorithm and the necessary information.

Furthermore, as shown in FIG. 46, when making the print request, the print clients 20, 22 may transmit only the additional information to the printers 30, 32 without transmitting the algorithm. This is because the algorithm used when the public key and the private key are generated is fixedly determined in the printers 30, 32 in some cases.

The present invention is explained with the print client as an example of a data transmitting device which transmits data whose security is to be ensured and the printer as an example of a data receiving device which receives the data in the aforementioned embodiments, but a combination of the data transmitting device and the data receiving device in a data transmitting and receiving system is not limited to that in the aforementioned embodiments.

For example, in the data transmitting and receiving system, the data transmitting device may be a digital camera for taking images and the data receiving device may be a data server which stores data on the images taken by the digital camera. In this case, data to be transmitted from the digital camera is encrypted with a public key received from the data server, and the data server which has received this data generates a private key by the aforementioned method to decrypt the data. When this received data has been decrypted, the data is stored, and when the data has not been decrypted, the data is not stored.

Moreover, in the data transmitting and receiving system, the data transmitting device may be a personal computer and the data receiving device may be a projector which projects image data transmitted from the personal computer. In this case, data to be transmitted from the personal computer is encrypted with a public key received from the projector, and the projector which has received this data generates a private key by the aforementioned method to decrypt the data. When this received data has been decrypted, the data is projected, and when the data has not been decrypted, the data is not projected.

Further, in the data transmitting and receiving system, the data transmitting device may be a content server for music or the like and the data receiving device may be a playback device for content data such as music transmitted from the content server. In this case, data to be transmitted from the content server is encrypted with a public key received from the playback device, and the playback device which has received this data generates a private key by the aforementioned method to decrypt the data. When this received data has been decrypted, the data is played back, and when the data has not been decrypted, the data is not played back.

Furthermore, the aforementioned embodiments are explained with the case where a print medium for the printers 30, 32 is a print sheet as an example, but the print medium is not limited to this, and the present invention can be applied to other print media such as an OHP sheet and the like.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the print clients 20, 22 and/or the printers 30, 32 read the record medium on which this program is recorded and execute this program.

Additionally, the print clients 20, 22 and/or the printers 30, 32 sometimes have other programs such as an operating system, other application programs, and the like. In this case, by using these other programs in the print clients 20, 22 and/or the printers 30, 32, a command, which calls a program to realize a process equal to that in the aforementioned embodiments out of programs in the print clients 20, 22 and/or the printers 30, 32, may be recorded on the record medium.

Moreover, such a program can be distributed not in the form of the record medium but in the form of a carrier wave via a network. The program transmitted in the form of the carrier wave over the network is incorporated in the print clients 20, 22 and/or the printers 30, 32, and the aforementioned embodiments can be realized by executing this program.

Further, when being recorded on the record medium or transmitted as the carrier wave over the network, the program is sometimes encrypted or compressed. In this case, the print clients 20, 22 and/or the printers 30, 32 which have read the program from the record medium or the carrier wave need to execute the program after decrypting or expanding it.

The invention claimed is:

1. A The printer which processes print data, comprising:
   a printer position information acquisition unit which acquires printer position information to specify a place where the printer is installed;
   a first printer position information acquisition unit which acquires printer position information from the printer position information acquisition unit, this printer position information being regarded as first printer position information;
   a public key generator which generates a public key with a passphrase containing at least the first printer position information and a given number;
   a print data receiver which receives print data encrypted with the public key;
   a second printer position information acquisition unit which acquires printer position information from the printer position information acquisition unit when the print data has been received, this printer position information being regarded as second printer position information;
   a private key generator which generates a private key with a passphrase containing at least the second printer position information and the given number;
   a decrypter which decrypts the print data received by the print data receiver with the private key;
   a print executor which executes a print operation based on the print data when the print data has been decrypted with the private key and which does not execute the print operation based on the print data when the print data has not been decrypted with the private key; and
   a given number holder which holds the given number used in the public key generator,
   wherein even if a private key is generated when the public key generator generates the public key, the private key is deleted.

2. The printer according to claim 1, further comprising:
   a public key acquisition request receiver which receives a public key acquisition request from a print client; and a public key transmitter which transmits the public key generated by the public key generator to the print client which has transmitted the public key acquisition request.

3. The printer according to claim 2, wherein one given number is held in the given number holder in the printer.

4. The printer according to claim 2, wherein one given number for each of the print clients is held in the given number holder.

5. The printer according to claim 4, further comprising:
a print client identification information receiver which receives print client identification information which is not encrypted with the public key in addition to the print data encrypted with the public key; and
a given number acquisition which acquires the given number of the print client which has transmitted the print data based on the print client identification information from the given number holder.

6. The printer according to claim 2, wherein one given number for each user is held in the given number holder.

7. The printer according to claim 6, further comprising:
a user identification information receiver which receives user identification information which is not encrypted with the public key in addition to the print data encrypted with the public key; and
a given number acquisition which acquires the given number of a user who has transmitted the print data based on the user identification information from the given number holder.

8. The printer according to claim 1, wherein the public key generator generates the given number for generating the public key in response to a public key acquisition request transmitted from a print client for each print job.

9. The printer according to claim 8, further comprising a given number deleter which deletes the given number held in the given number holder after the private key is generated by the private key generator.

10. A The printer which processes print data, comprising:
a printer position information acquisition unit which acquires printer position information to specify a place where the printer is installed;
a first printer position information acquisition unit which acquires printer position information from the printer position information acquisition unit, this printer position information being regarded as first printer position information;
a public key generator which generates a public key with a passphrase containing at least the first printer position information and a given number;
a print data receiver which receives print data encrypted with the public key;
a second printer position information acquisition unit which acquires printer position information from the printer position information acquisition unit when the print data has been received, this printer position information being regarded as second printer position information;
a private key generator which generates a private key with a passphrase containing at least the second printer position information and the given number; and
a decrypter which decrypts the print data received by the print data receiver with the private key;
a print executor which executes a print operation based on the print data when the print data has been decrypted with the private key and which does not execute the print operation based on the print data when the print data has not been decrypted with the private key;

a public key and given number transmitter which transmits, to a print client, the public key generated by the public key generator and the given number used when the public key is generated; and
a given number receiver which receives the given number from the print client, wherein
the private key generator generates the private key with the passphrase containing at least the second printer position information and the given number received by the given number receiver, and
even if a private key is generated when the public key generator generates the public key, the private key is deleted.

11. The printer according to claim 10, wherein when receiving a public key acquisition request from the print client, the public key generator generates the public key and the given number, and the public key and given number transmitter transmits the public key and the given number to the print client which has transmitted the public key acquisition request.

12. The printer according to claim 10, wherein the public key generator generates the given number for generating the public key in response to a public key acquisition request transmitted from the print client for each print job.

13. The printer according to claim 12, wherein the given number used when the public key generator generates the public key is deleted after the public key and given number transmitter transmits the given number.

14. A printer which processes print data, comprising:
a printer position information acquisition unit which acquires printer position information to specify a place where the printer is installed;
a first printer position information acquisition unit which acquires printer position information from the printer position information acquisition unit, this printer position information being regarded as first printer position information;
a public key generator which generates a public key with a passphrase containing at least the first printer position information and a given number;
a print data receiver which receives print data encrypted with the public key;
a second printer position information acquisition unit which acquires printer position information from the printer position information acquisition unit when the print data has been received, this printer position information being regarded as second printer position information;
a private key generator which generates a private key with a passphrase containing at least the second printer position information and the given number;
a decrypter which decrypts the print data received by the print data receiver with the private key;
a print executor which executes a print operation based on the print data when the print data has been decrypted with the private key and which does not execute the print operation based on the print data when the print data has not been decrypted with the private key;
a public key information transmitter which transmits, to the print client, the public key generated by the public key generator and information necessary for deriving the given number used when the public key is generated; and
a given number receiver which receives the given number from the print client, wherein the private key generator generates the private key with the passphrase containing at least the second printer position information and the given number received by the given number receiver, and even if a private key is generated when the public key generator generates the public key, the private key is deleted.

15. The printer according to claim 14, wherein the information necessary for deriving the given number is an algorithm which derives the given number and additional information for the derivation.

16. The printer according to any one of claims 1 to 15, wherein the given number is a random number.

17. A control method of a printer which processes print data, comprising the steps of:

acquiring printer position information to specify a place where the printer is installed from a printer position information acquisition unit, this printer position information being regarded as first printer position information;

generating a public key with a passphrase containing at least the first printer position information and a given number, the given number being held in a given number holder;

receiving print data from a print client;

acquiring printer position information from the printer position information acquisition unit when the print data has been received, this printer position information being regarded as second printer position information;

generating a private key with a passphrase containing at least the second printer position information and the given number;

decrypting the received print data with the private key; and executing a print operation based on the print data when the print data has been decrypted with the private key and not executing the print operation based on the print data when the print data has not been decrypted with the private key, wherein even if a private key is generated when the public key is generated, the private key is deleted.

18. A print system including at least one printer and at least one print client connected to the printer via a network, wherein the printer comprises:

a printer position information acquisition unit which acquires printer position information to specify a place where the printer is installed;

a first printer position information acquisition unit which acquires printer position information from the printer position information acquisition unit, this printer position information being regarded as first printer position information; and a public key generator which generates a public key with a passphrase containing at least the first printer position information and a given number, the print client comprises:

a print data generator which generates print data to be printed by the printer; and a print data transmitter which encrypts the print data with the public key and transmits the encrypted print data to the printer, and the printer further comprises:

a print data receiver which receives the print data encrypted with the public key and transmitted from the print client;

a second printer position information acquisition unit which acquires printer position information from the printer position information acquisition unit when the print data has been received, this printer position information being regarded as second printer position information;

a private key generator which generates a private key with a passphrase containing at least the second printer position information and the given number;

a decrypter which decrypts the print data received by the print data receiver with the private key;

a print executor which executes a print operation based on the print data when the print data has been decrypted with the private key and which does not execute the print operation based on the print data when the print data has not been decrypted with the private key; and a given number holder which holds the given number used in the public key generator, wherein even if a private key is generated when the public key generator generates the public key, the private key is deleted.

* * * * *